United States Patent
Maeyama et al.

(10) Patent No.: US 7,042,627 B2
(45) Date of Patent: May 9, 2006

(54) IMAGE PRODUCTION APPARATUS, IMAGE DISPLAY APPARATUS, IMAGE DISPLAY METHOD AND OPTICAL MODULATION DEVICE ADJUSTMENT APPARATUS

(75) Inventors: Koichi Maeyama, Kanagawa (JP); Yoshiyuki Akiyama, Kanagawa (JP); Hitoshi Tamada, Kanagawa (JP); Hiroki Kikuchi, Kanagawa (JP)

(73) Assignee: Sony Corporation (JP)

( * ) Notice: Subject to any disclaimer, the term of this patent is extended or adjusted under 35 U.S.C. 154(b) by 164 days.

(21) Appl. No.: 10/684,526

(22) Filed: Oct. 15, 2003

(65) Prior Publication Data

US 2004/0145792 A1 Jul. 29, 2004

(30) Foreign Application Priority Data

Oct. 17, 2002 (JP) .................................. P2002-303661
Sep. 11, 2003 (JP) .................................. P2003-319971

(51) Int. Cl.
*G02B 26/00* (2006.01)
*G02F 1/29* (2006.01)

(52) U.S. Cl. ................. 359/298; 359/290; 359/291; 359/295; 359/242

(58) Field of Classification Search ............. 359/298, 359/290, 291, 295, 237, 242, 244, 239, 205
See application file for complete search history.

(56) References Cited

U.S. PATENT DOCUMENTS

| | | | |
|---|---|---|---|
| 4,926,247 A * | 5/1990 | Nagasaki et al. ......... 348/262 |
| 5,841,579 A | 11/1998 | Bloom et al. | |
| 5,982,553 A | 11/1999 | Bloom et al. | |
| 6,603,450 B1 * | 8/2003 | Yamazaki et al. ......... 345/75.2 |
| 6,804,037 B1 * | 10/2004 | Nito et al. ................. 359/253 |
| 2003/0179428 A1 * | 9/2003 | Suzuki et al. ............. 359/204 |
| 2004/0196523 A1 * | 10/2004 | Nito et al. ................. 359/239 |

FOREIGN PATENT DOCUMENTS

JP        3164824     3/2001

* cited by examiner

*Primary Examiner*—Ricky Mack
*Assistant Examiner*—Brandi Thomas
(74) *Attorney, Agent, or Firm*—Rader, Fishman & Grauer PLLC; Ronald P. Kananen

(57) ABSTRACT

An image production apparatus, an image display apparatus and an image display method are disclosed which can reduce the ununiformity in luminance and color which appears on a display screen and can be formed compact. Also an optical modulation device adjustment apparatus is disclosed which can detect and correct the ununiformity in modulation characteristic of a modulation device. The image display apparatus includes a light detection apparatus in addition to a light source section, an illumination optical system, an optical modulation section, a spatial filter, a light projection section and a screen. The light detection apparatus detects the dispersion of a modulation characteristic of each pixel element of GLV devices and the ununiformity in luminance and color displayed in accordance with an illumination condition. An optimum driving voltage for minimizing the ununiformity in color and luminance to be displayed is determined based on a signal detected by the light detection apparatus.

58 Claims, 45 Drawing Sheets

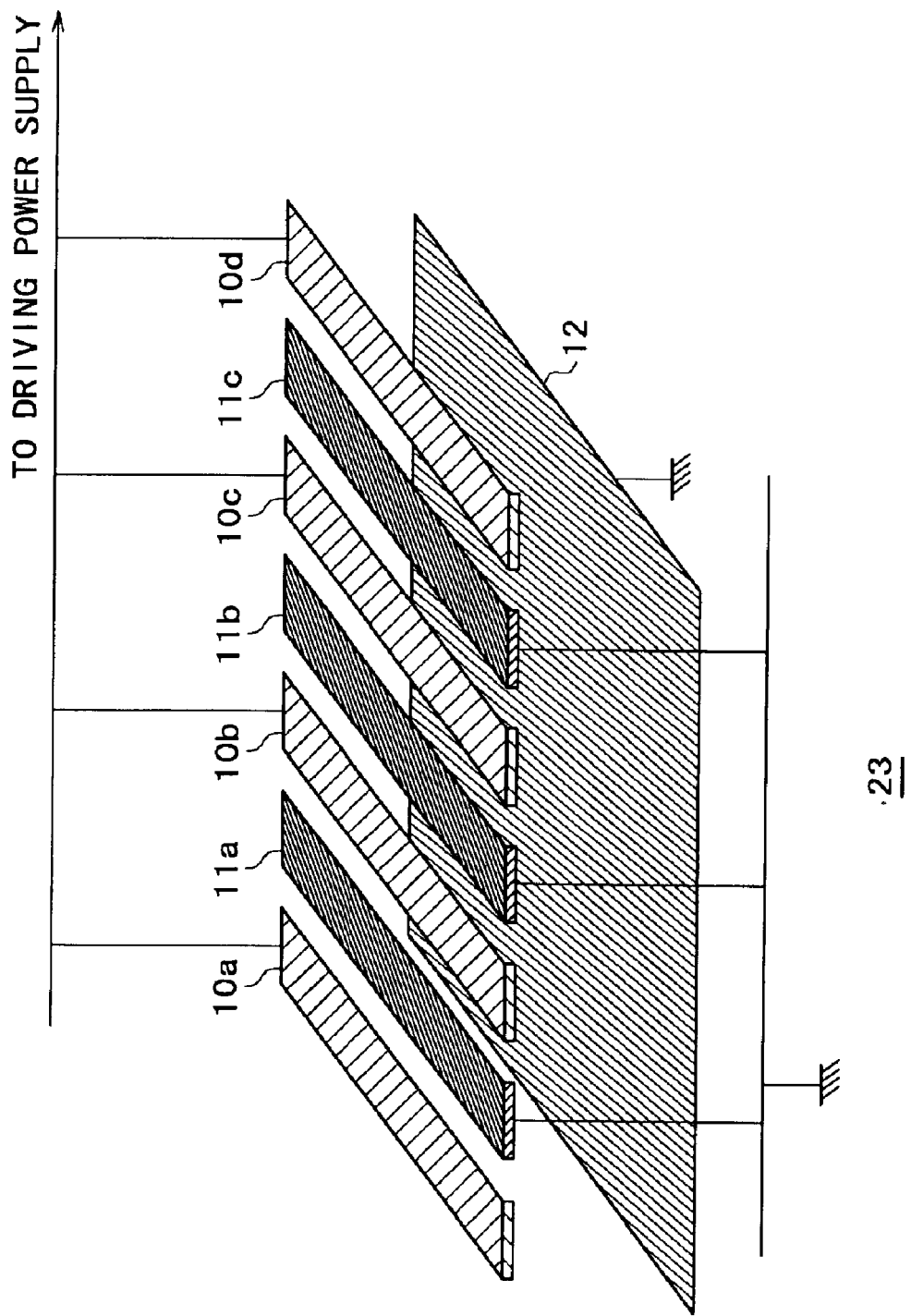

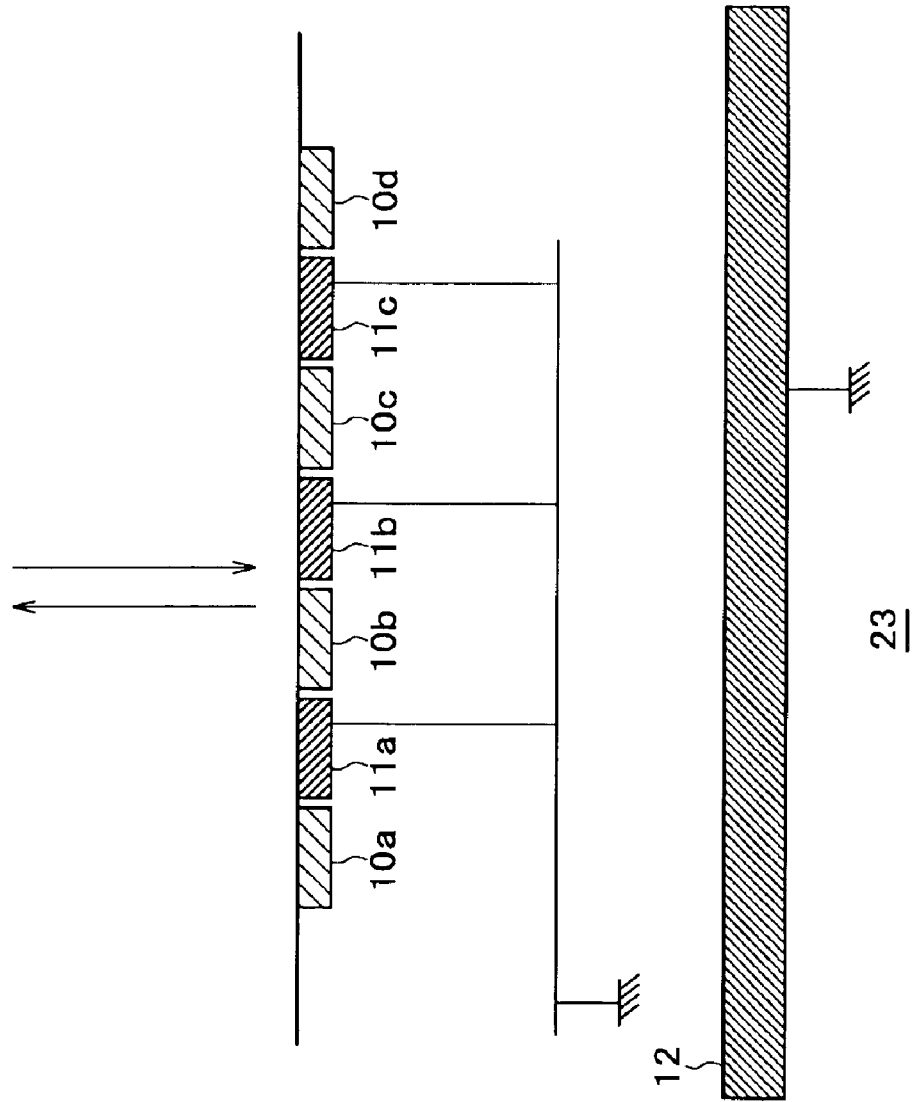

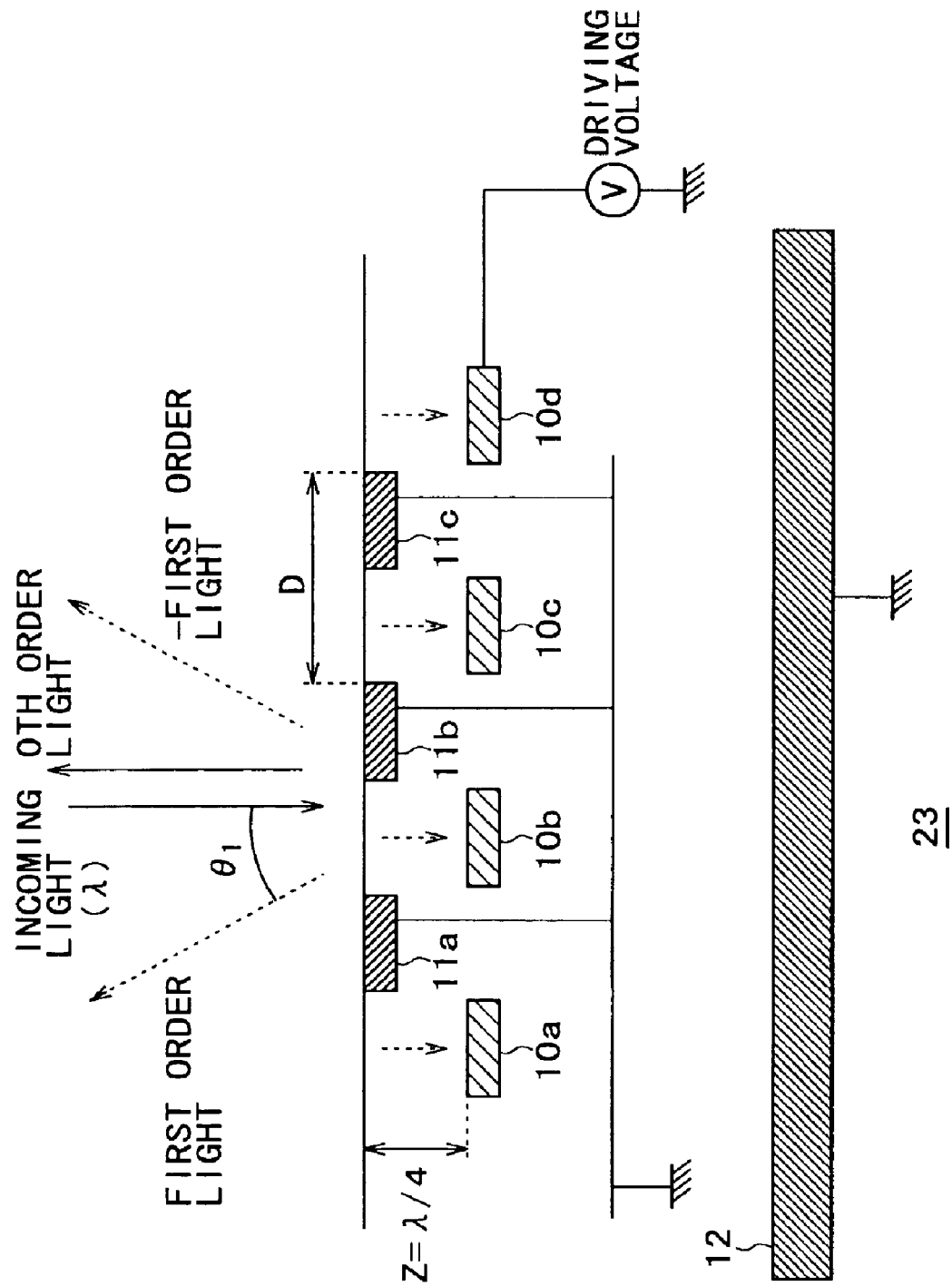

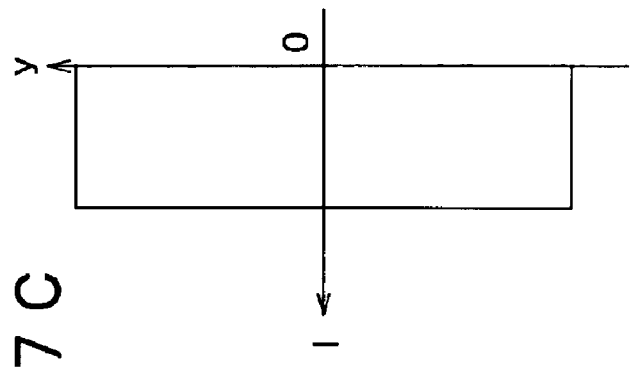
FIG. 7A
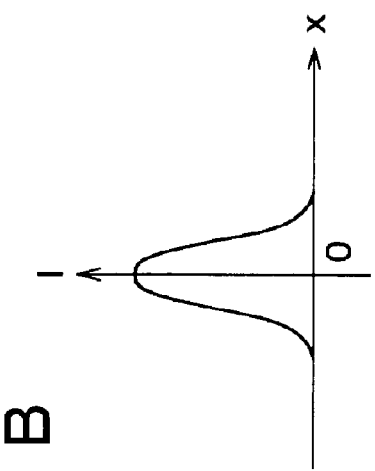
FIG. 7B
FIG. 7C

F I G. 1 0 A
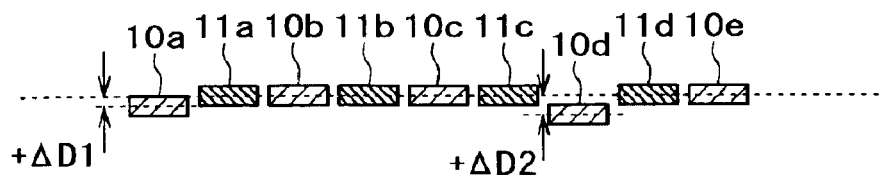
F I G. 1 0 B
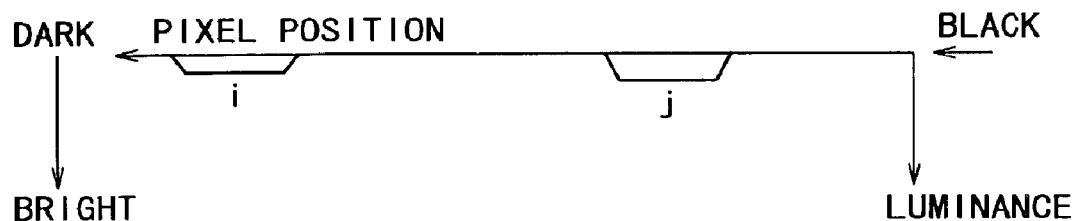
F I G. 1 0 C
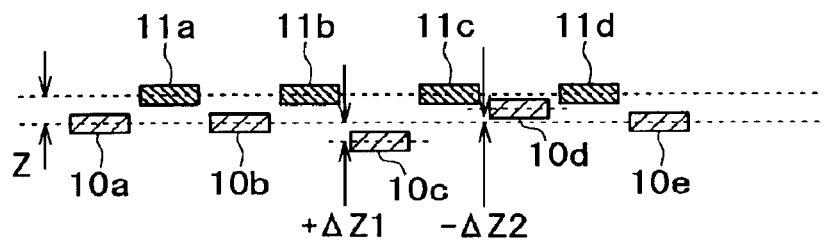
F I G. 1 0 D
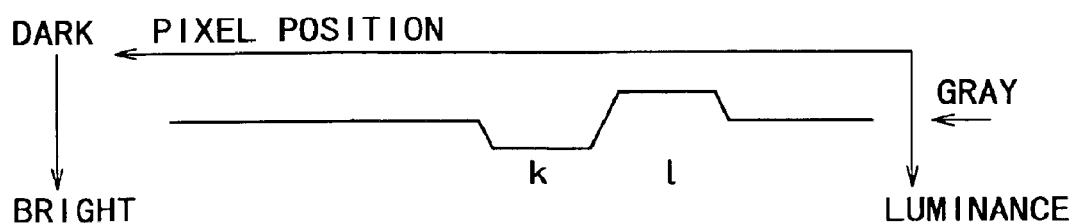

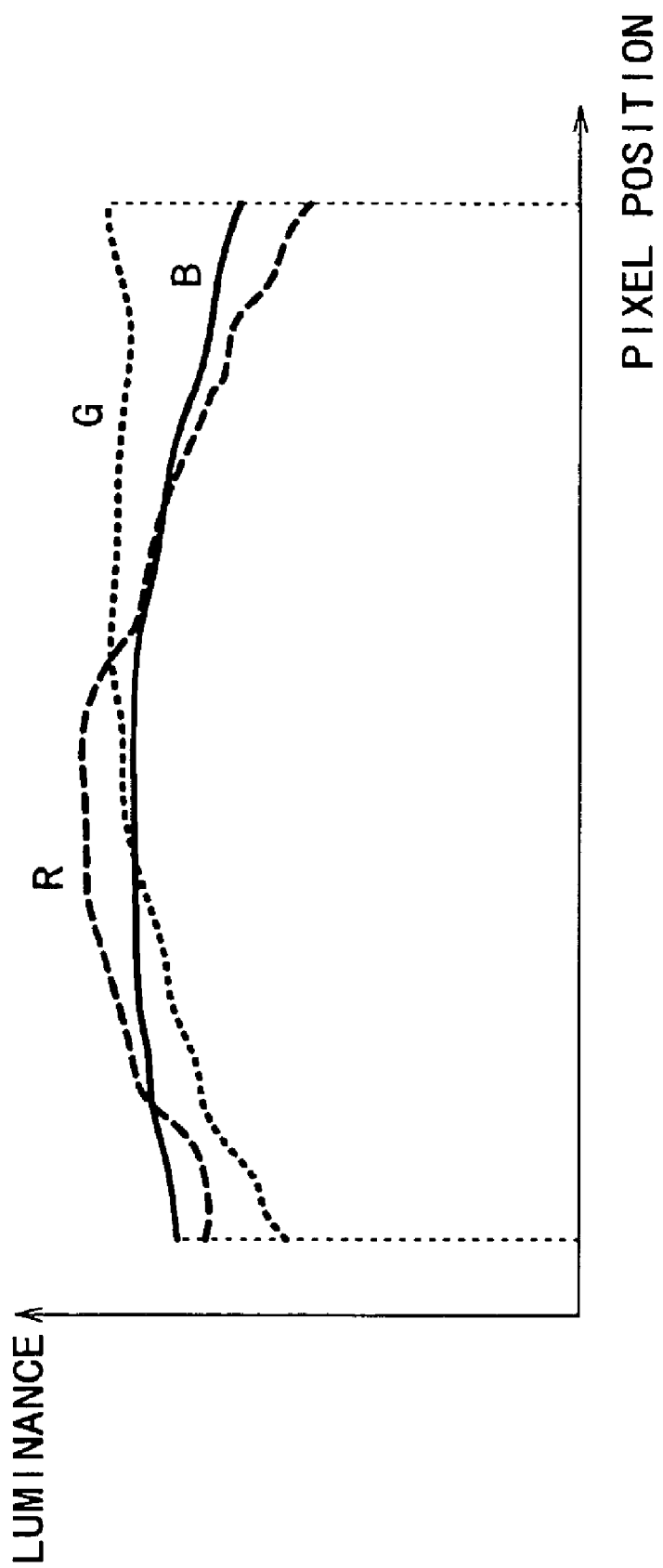

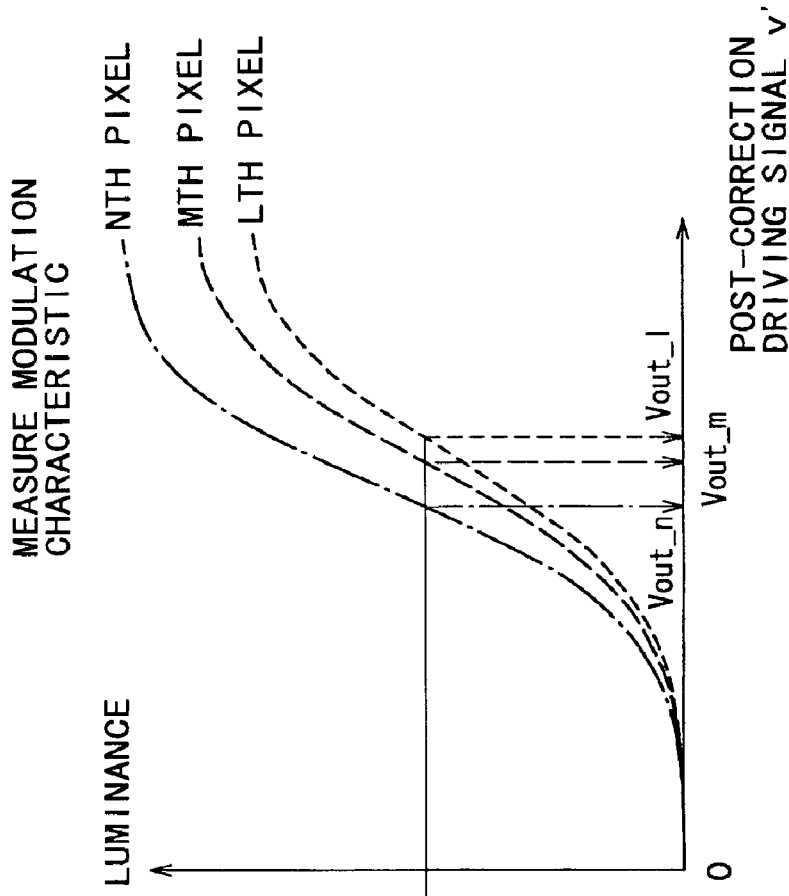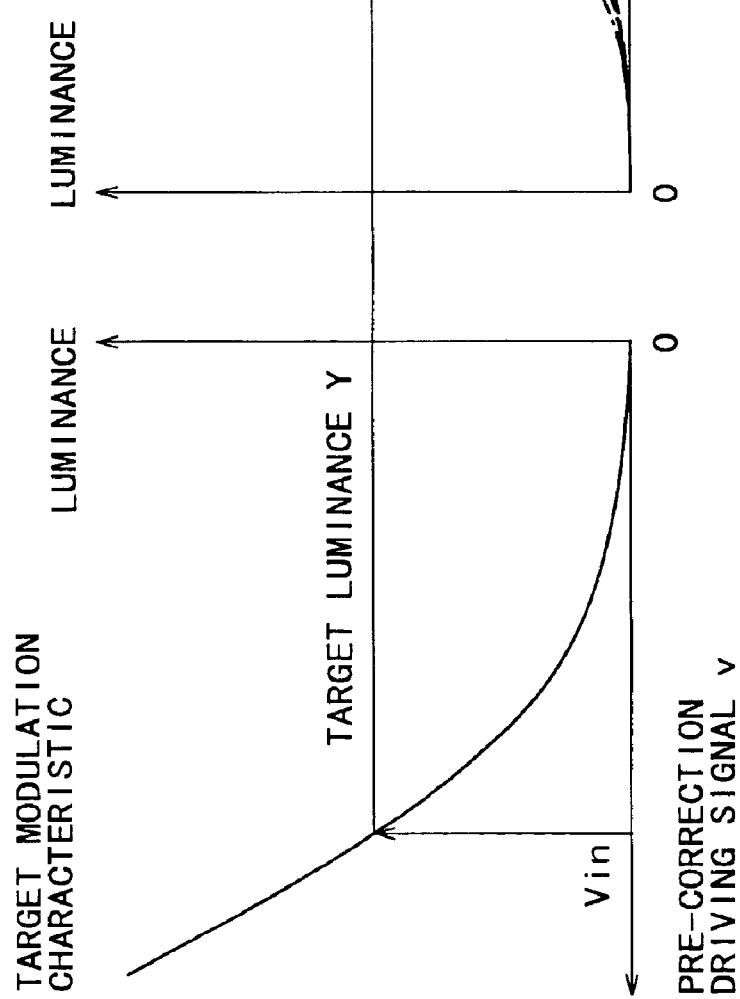
FIG. 24A — TARGET MODULATION CHARACTERISTIC
FIG. 24B — MEASURE MODULATION CHARACTERISTIC

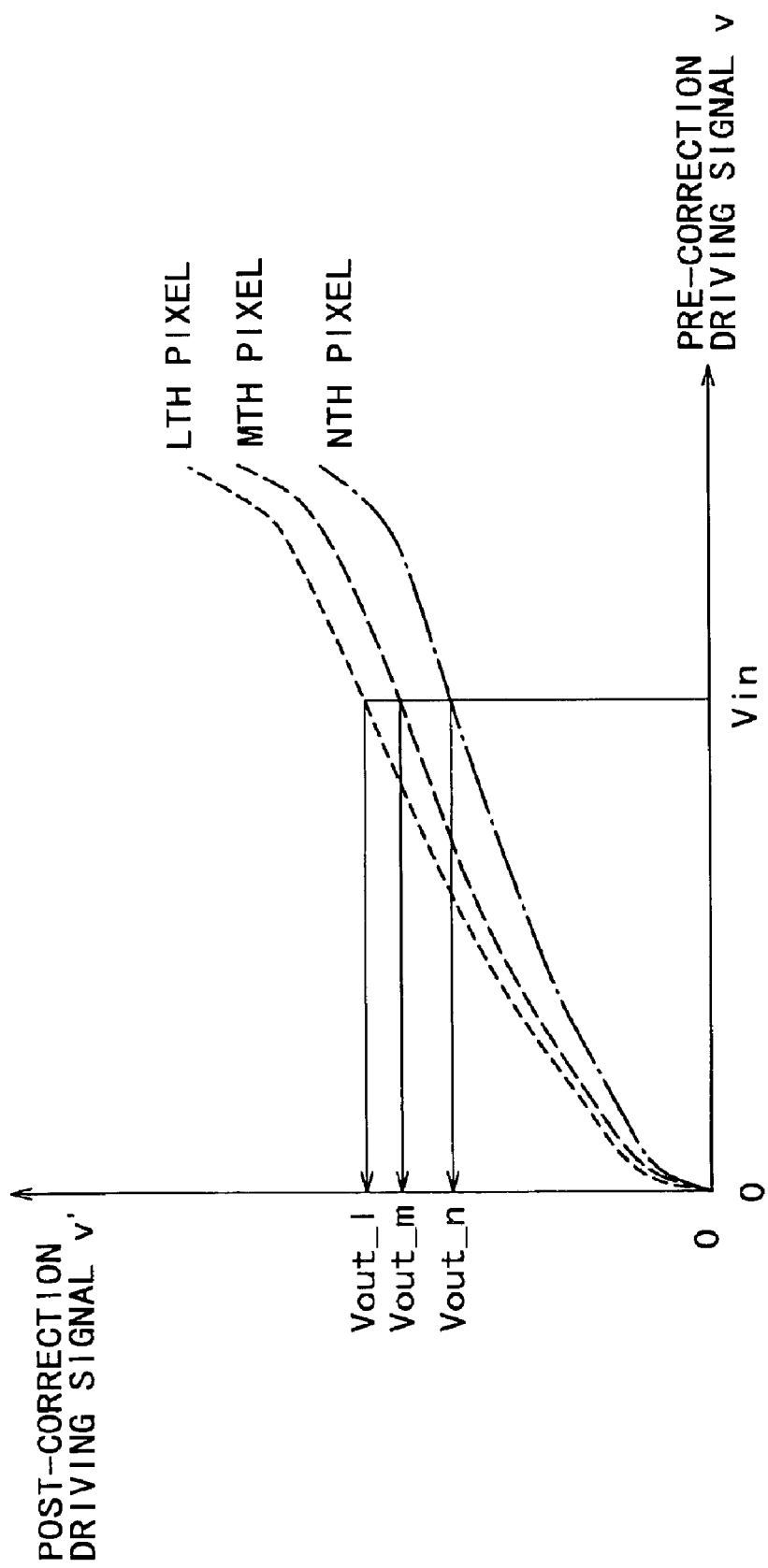

IMAGE PRODUCTION APPARATUS, IMAGE DISPLAY APPARATUS, IMAGE DISPLAY METHOD AND OPTICAL MODULATION DEVICE ADJUSTMENT APPARATUS

BACKGROUND OF THE INVENTION

The present invention relates to an image production apparatus, an image display apparatus, an image display method and an optical modulation device adjustment apparatus wherein a light diffraction modulation device such as, for example, a light valve device of the diffraction grating type which diffracts or reflects light is used to produce or display a two-dimensional image.

A method is known wherein, in order to assure a high resolution of an image on an image formation apparatus such as a projector or a printer, a light flux from a one-dimensional image display device is projected onto an image formation element while being scanned by an optical scanning means to form a two-dimensional image. The method is disclosed, for example, in U.S. Pat. No. 5,982,553 (hereinafter referred to as patent document 1). As one of one-dimensional image display devices, a grating light valve (GLV) device developed by Silicon Light Machine of USA is known and disclosed, for example, in Japanese Patent No. 3,164,824 (hereinafter referred to as patent document 2) and U.S. Pat. No. 5,841,579 (hereinafter referred to as patent document 3).

The GLV device is formed from a diffraction grating of the micromachine phase reflection type which makes use of diffraction of light. Where the GLV device is used, an image can be displayed by electrically controlling the gradation of the light.

Typically, in the GLV device, a pixel element which forms a pixel is formed from several ribbon electrodes of several μm in size, and several hundreds to several thousands such pixel elements are disposed in a one-dimensional direction. The GLV device in the form of a one-dimensional image device which includes a plurality of pixel elements functions as a one-dimensional spatial modulator, and illumination light condensed in a one-dimensional direction is first modulated by the GLV device and then scanned in horizontal directions by means of a galvano mirror (polygon mirror) to form a two-dimensional image.

When compared with an ordinary two-dimensional display device, where the GLV device is used, also the number of pixels in a vertical direction of a screen is equal to the number of pixels in the one-dimensional direction. However, since only a width at least equal to the width of one pixel is required in the transverse direction, the number of pixels necessary for display of a two-dimensional image is small. The GLV device can be formed such that it has an active region of a comparatively small size and can achieve display of a high resolution, a high switching rate and a great band width. Meanwhile, since the GLV device can operate with a low application voltage, it is anticipated that a display device of a significantly reduced size can be realized.

When compared with an ordinary two-dimensional display device, for example, a projector type display device using a liquid crystal panel, an image display apparatus which uses such a one-dimensional image display apparatus as described above, that is, a GLV device, can represent a very smooth and natural image since the GLV device itself does not include a boundary between pixels. Further, if lasers of the three primary colors of red, green and blue are used as light sources for such GLV devices and lights from them are mixed, then an image having a very wide and natural color reproduction range can be represented. In this manner, an image display apparatus which uses the GLV device exhibits a superior displaying performance which cannot be achieved by the other conventional image display apparatus.

Actually, however, it is not easy to realize a good image display with full pixels of an image display apparatus for 1,080×1,920 pixels obtained by scanning a GLV device including, for example, 1,080 pixel elements. The reason is that usually it is difficult in production of devices to produce ribbon electrodes for formation of pixel elements uniformly in terms of the shape and the surface state over an overall display region. Therefore, also in a state wherein the pixel elements are at rest, unevenness of approximately nm is exhibited between the pixel elements. Therefore, a GLV device as a modulator exhibits different modulation characteristics (driving voltage-modulated light luminance) among different pixel elements. As a result, some ununiformity in luminance appears on a screen, and there is a problem that, for example, a uniform black image cannot be obtained.

Further, since driving circuits provided for the individual pixels for adjusting the gradation of luminance have some dispersion, it is not easy to make the modulation characteristics of the pixel elements uniform. For example, an error of a driving signal for moving a ribbon electrode at the nm level disperses the amount of movement of a movable ribbon electrode of the GLV device and gives rise to a variation in pixel element modulation characteristic.

Such dispersions in modulation characteristic are recognized as transverse stripes in a unit of one to several pixels on a display screen and causes deterioration of the picture quality.

Further, in order to illuminate a GLV device which is a one-dimensional image device, illumination light is condensed in a one-dimensional direction and is illuminated on a line on the GLV device. In this instance, it is not easy to make the illumination light intensity uniform over the overall illumination region. Even if uniform illumination can be realized by optical designing and initial adjustment, it is difficult to realize normally uniform illumination light due to an influence of a variation of a light source or an optical system arising from a temperature variation or a secular change. Although such ununiformity in illumination is not comparatively conspicuous where a single color is involved, where different colors are involved as in the case of a color image, the ununiformity in illumination is recognized as a color fault and deteriorates the picture quality. Particularly where different illumination systems are used for different colors as in the case of a laser projector, such ununiformity in color is liable to appear.

Further, there is the possibility that the picture quality may be deteriorated by processing of a driving signal to be applied to a pixel element.

Usually, a digital driving signal inputted from a circuit in the preceding stage is converted into an analog signal by a D/A (digital to analog) conversion circuit and then inputted to a driving circuit, whereafter it is applied to a pixel element.

Where the D/A conversion circuit and the driving circuit have a smaller bit width than the preceding circuit, when a signal of the preceding stage having a greater bit width is inputted to the D/A conversion circuit and the driving circuit, low order bits of the signal are cut and thinned out. Consequently, the signal exhibits comparatively discontinuous values, or in other words, the signal is quantized or digitized.

The signal quantized in this manner exhibits rougher gradations and has an error when compared with the driving signal in the preceding circuit. This is called quantization error.

The quantization error produces some discontinuity between pixels on a screen. Since the eyes of the human being have a high sensitivity, such small discontinuity between pixels is recognized as an unnatural display to the human eyes. Particularly on a display apparatus wherein light from a GLV device is scanned to form a two-dimensional image, through scanning of a one-dimensional image on the screen, an abnormal point of the one-dimensional image makes a transverse stripe on the screen, which is further likely to be sensed.

Further, an image display apparatus which employs a GLV device necessitates structural improvements such as an improvement in arrangement of a light source and optical parts in order to display a color video image of a high quality while it is miniaturized. Particularly where different illumination systems are used for different colors as in the case of a laser projector, there is a technical problem of how to reduce the size of a display apparatus while it is realized to synthesize the illumination lights of the different colors with a high degree of quality and remove unnecessary illumination light components efficiently to reduce noise to the illumination lights to be used to display an image.

SUMMARY OF THE INVENTION

It is an object of the present invention to provide an image production apparatus, an image display apparatus and an image display method which can reduce the ununiformity in luminance and color which appears on a display screen.

It is another object of the present invention to provide an optical modulation device adjustment apparatus which can detect and correct the ununiformity in modulation characteristic of a modulation device.

It is a further object of the present invention to provide an image display apparatus which can be formed compact.

It is a still further object of the present invention to provide an image display apparatus which can suppress, while using a GLV device, the discontinuity of an image arising from a quantization error caused by a quantization process of a driving signal.

According to the first aspect of the present invention, there is provided an image production apparatus, including:

an optical modulation device for modulating light;

a driving circuit for driving the optical modulation device in response to an input signal;

an initial driving signal production circuit for producing an initial driving signal for deriving the optical modulation device in response to the input signal; and correction means for determining, from a target light intensity of modulated light to be emitted from the optical modulation device in response to the initial driving signal and an intensity of the modulated light emitted from the optical modulation device in response to the driving signal, a value of the driving signal for the optical modulation device corresponding to the target light intensity and inputting the determined driving signal to the driving circuit.

In the image production apparatus, the correction means which corrects an initial driving signal produced by the initial driving signal production circuit from an input signal is provided. The correction means sets a target light intensity for modulated light to be emitted from the optical modulation device in response to the initial driving signal in advance, determines, from a result of measurement of the light intensity of the modulated light in response to the diving signal, a value of the driving signal for the optical modulation device with which the optical modulation device emits modulated light having the target light intensity, and inputs the determined driving signal to the driving circuit.

According to the second aspect of the present invention, there is provided an image display apparatus, including:

a light source;

a plurality of optical modulation devices each including a plurality of fixed electrodes and a plurality of displaceable electrodes positioned adjacent the fixed electrodes and individually displaced or deformed in response to a driving signal applied thereto to form offsets from the fixed electrodes so that illumination light from the light source incoming to one of faces of the fixed and displaceable electrodes is modulated in accordance with the offsets such that the modulated lights from the optical modulation devices are arrayed linearly to form a one-dimensional image;

image display means for being illuminated with the modulated lights to form an image;

a driving circuit for applying the driving signals to the electrodes of the optical modulation devices in response to an input signal thereto;

an initial driving signal production circuit for producing an initial driving signal for driving the optical modulation devices from the input signal; and correction means interposed between the initial driving signal production circuit and the driving circuit for determining, from a target light intensity for the modulated lights to be emitted from the optical modulation devices in response to the initial driving signal and intensities of the modulated lights emitted from the optical modulation devices in response to the driving signals, values of the driving signals for the optical modulation devices corresponding to the target light intensity and inputting the driving signals of the determined values to the driving circuit.

In the image display apparatus, the correction means which corrects an initial driving signal produced by the initial driving signal production circuit from an input signal is provided. The correction means sets a target light intensity for modulated light to be emitted from the optical modulation device in response to the initial driving signal in advance, determines, from a result of measurement of the light intensity of the modulated light in response to the diving signal, a value of the driving signal for the optical modulation device with which the optical modulation device emits modulated light having the target light intensity, and inputs the determined driving signal to the driving circuit.

According to the third aspect of the present invention, there is provided an image display method for scanning modulated lights emitted from a plurality of optical modulation devices, each of which includes a plurality of fixed electrodes and a plurality of displaceable electrodes positioned adjacent the fixed electrodes and individually displaced or deformed in response to a driving signal applied thereto to form offsets from the fixed electrodes so that illumination light from a light source incoming to one of faces of the fixed and displaceable electrodes is modulated in accordance with the offsets such that the modulated lights from the optical modulation devices are arrayed linearly to form a one-dimensional image, on a plane to display a two-dimensional image, including:

a driving signal correction step of determining, before an image is displayed, from a target light intensity of the modulated lights emitted from the optical modulation devices in response to an initial driving signal produced from an input signal and intensities of the modulated lights emitted from the optical modulation devices in response to the driving signals, values of the driving signals for the optical modulation devices corresponding to the target light intensity; and a step of applying, when an image is to be displayed, the driving signals of the determined values to the optical modulation devices to drive the optical modulation elements.

In the image production method, before an image is displayed, a target light intensity is set in advance for the modulated light to be emitted from the optical modulation devices in response to an initial driving signal, and a value of the driving signal with which modulated light having the target light intensity of the optical modulation devices is emitted is determined from a result of measurement of the light intensity of the modulated light emitted in accordance with the driving signal. Then, when an image is to be displayed, the determined driving signal is applied to each of the optical modulation device to drive the optical modulation device. Consequently, an image of a high quality free from ununiformity in luminance and color can be displayed.

According to the fourth aspect of the present invention, there is provided an optical modulation device adjustment apparatus, including:

a light source;

a plurality of optical modulation devices each including a plurality of fixed electrodes and a plurality of displaceable electrodes positioned adjacent the fixed electrodes and individually displaced or deformed in response to a driving signal applied thereto to form offsets from the fixed electrodes so that illumination light from the light source incoming to one of faces of the fixed and displaceable electrodes is modulated in accordance with the offsets such that the modulated lights from the optical modulation devices are arrayed linearly to form a one-dimensional image;

a driving circuit for applying the driving signals to the electrodes of the optical modulation devices in response to an input signal thereto;

an initial driving signal production circuit for producing an initial driving signal for driving the optical modulation devices from the input signal;

measurement means removably placed at a position at which the measurement means can measure the modulated lights emitted from the optical modulation devices for measuring the intensities of the modulated lights emitted from the optical modulation devices and determining a modulation characteristic of each of the optical modulation devices representative of a relationship between the driving signal applied to the optical modulation device and the intensity of the modulated light emitted from the optical modulation device; and correction means interposed between the initial driving signal production circuit and the driving circuit for determining, from the measured modulation characteristics of the optical modulation devices and a target light intensity for the modulated lights to be emitted from the optical modulation devices in response to the initial driving signal, values of the driving signals for the optical modulation devices corresponding to the target light intensity and inputting the driving signals of the determined values to the driving circuit.

In the optical modulation device adjustment apparatus, the measurement means and the correction means are provided. The measurement means measures modulated lights from the modulation devices to determine the modulation characteristics (driving voltage-modulated light intensity (or luminance)) of the modulation elements. The correction means sets a target light intensity in advance for the modulated lights to be emitted from the optical modulation devices in response to an initial driving signal. Then, the correction means determines, from the measured modulation characteristics of the optical modulation devices, values of the driving signals for the optical modulation devices with which they emit modulated lights having the target light intensity.

According to the fifth aspect of the present invention, there is provided an image display apparatus for successively displaying a plurality of frames in which a plurality of pixels are disposed in a matrix, including:

a plurality of pixel elements for individually forming the pixels;

a driving circuit for applying a driving signal to the pixel elements; and driving signal supply means for allocating, when a predetermined object one of the pixels is to be displayed, a quantization error appearing, when driving signal data is inputted to the driving circuit, in the driving signal of an object pixel element which corresponds to the object pixel to plural ones of the pixels in the proximity of the object pixel in a current frame being displayed and plural ones of the pixels within a predetermined range in a frame displayed next to the current frame, adding the allocated quantization error components to the driving signal data for the plural ones of the pixel elements and inputting the resulting driving signal data to the driving circuit.

According to the sixth aspect of the present invention, there is provided driving signal supply means including:

data division means for dividing driving signal data having a bit width of m into a high order bit part having a bit number of n smaller than m and a low order bit part having another bit number of m−n;

first addition means for adding the low order bit part and a preceding error allocated in the immediately preceding error allocation process and outputting a sum total of the errors;

error rounding process means having a predetermined threshold value for comparing the sum total of the errors outputted from the first addition means with the threshold value and outputting first data or second data from a result of the comparison;

second addition means for adding the high order bit part and the first data or the second data outputted from the error rounding process means to produce driving signal data having a bit width of n and inputting the driving signal data to the driving circuit;

subtraction means for subtracting the first data or the second data outputted from the error rounding process means from the sum total of the errors outputted from the first addition means and outputting the difference as a current error; and error allocation means for multiplying the current error outputted from the subtraction means by predetermined weighting coefficients, allocating the weighted errors to the plural ones of the pixels in the proximity of the object pixel in the current frame and the plural ones of the pixels within the predetermined range in the frame displayed next to the current frame and inputting the allocated current error to the first addition means.

In the image display apparatus, a quantization error which appears when driving signal data having a comparatively great bit width, that is, having a high degree of accuracy, is inputted to the driving circuit which has a comparatively small bit width is subject to a three-dimensional error diffusion (intraframe and interframe) process by the driving signal supply means to reduce the discontinuity of image displays. In this manner, an image of a picture quality equivalent to that of a comparatively high bit driving circuit is displayed using a comparatively low bit driving circuit.

According to the seventh aspect of the present invention, there is provided an image display apparatus for successively displaying a plurality of frames each including a two-dimensional image, including:

a light source;

a plurality of optical modulation devices each including a plurality of fixed electrodes and a plurality of displaceable electrodes positioned adjacent the fixed electrodes and individually displaced or deformed in response to a driving signal applied thereto to form offsets from the fixed electrodes so that illumination light from the light source incoming to one of faces of the fixed and displaceable electrodes is modulated in accordance with the offsets such that the modulated lights from the optical modulation devices are arrayed linearly to form a one-dimensional image formed from a string of pixels;

a driving circuit for applying the driving signals to the electrodes of the optical modulation devices;

image display means for being illuminated with the modulated lights to form the two-dimensional image in which strings of the pixels are developed;

first driving signal supply means for outputting driving signal data for the optical modulation devices; and second driving signal supply means for allocating, when a predetermined object one of the pixels is to be displayed, a quantization error appearing, when the driving signal data is inputted to the driving circuit, in the driving signal for the optical modulation devices to plural ones of the pixels in the proximity of the object pixel in a current frame being displayed and plural ones of the pixels within a predetermined range in a frame displayed next to the current frame, adding the allocated quantization error components to the driving signal data for the plural ones of the pixel elements and inputting the resulting driving signal data to the driving circuit.

In the image display apparatus, a quantization error which appears when driving signal data having a comparatively great bit width, that is, having a high degree of accuracy, is inputted to the driving circuit which has a comparatively small bit width is subject to a three-dimensional error diffusion (intraframe and interframe) process by the driving signal supply means to reduce the discontinuity of image displays. In this manner, an image of a picture quality equivalent to that of a comparatively high bit driving circuit is displayed using a comparatively low bit driving circuit.

With the image production apparatus, image display apparatus, image display method and optical modulation device adjustment apparatus according to the present invention, the optical modulation elements are driven with corrected driving signals which are corrected in terms of the ununiformity in illumination condition and the dispersion in pixel element characteristic for each pixel. Consequently, a video image of a high quality free from ununiformity in luminance and color can be provided on the screen.

Further, since only the ununiformity in illumination condition which is liable to be influenced by an environmental variation and a secular change is detected and corrected, a stable video image of a high picture quality free from ununiformity in color can be provided. Further, since only an illumination condition is measured, the measurement time can be reduced significantly, which is advantageous in practical use. Furthermore, a maximum luminance function is set for each of divisional illumination regions, the luminance of illumination light can be utilized effectively without being wasted.

Further, since a quantization error which appears upon production of a correction table is diffused uniformly into and added to image information, a correction error or a defect in picture quality which may appear secondarily can be reduced. Through the process described, even where a driving circuit of a comparatively small bit width is used, correction of unevenness in display in the form of a strike equivalent to that of a driving circuit of a comparatively great bit width can be achieved. Consequently, reduction in cost of the driving circuits can be anticipated.

Furthermore, since the ununiformity correction function is incorporated, moderation of the tolerance in design of the illumination optical system and reduction of man-hours for adjustment of the optical system can be anticipated. Consequently, the cost of the entire system can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 3 to 5 are schematic views illustrating operation of a light diffraction modulation device used in the image display apparatus according to the first embodiment;

FIGS. 7A to 7C are diagrammatic views illustrating a function of the illumination optical system of the image display apparatus according to the first embodiment;

FIGS. 10A to 10D are diagrammatic views illustrating appearance of a horizontal stripe on a screen due to the dispersion in characteristic of an optical modulation device in a second embodiment of the present invention;

FIG. 11 is a diagram illustrating the ununiformity in luminance and color appearing on a screen due to the ununiformity of a light source illumination condition in the second embodiment of the present invention;

FIGS. 24A and 24B are diagrams illustrating a method of correcting a driving voltage with a measured modulation characteristic of a modulation device and the target modulation characteristic of the image display apparatus according to the second embodiment;

FIG. 25 is a diagram illustrating a result of the correction by the method illustrated in FIGS. 24A and 24B;

DETAILED DESCRIPTION OF THE PREFERRED EMBODIMENTS

First Embodiment

Figure 1:
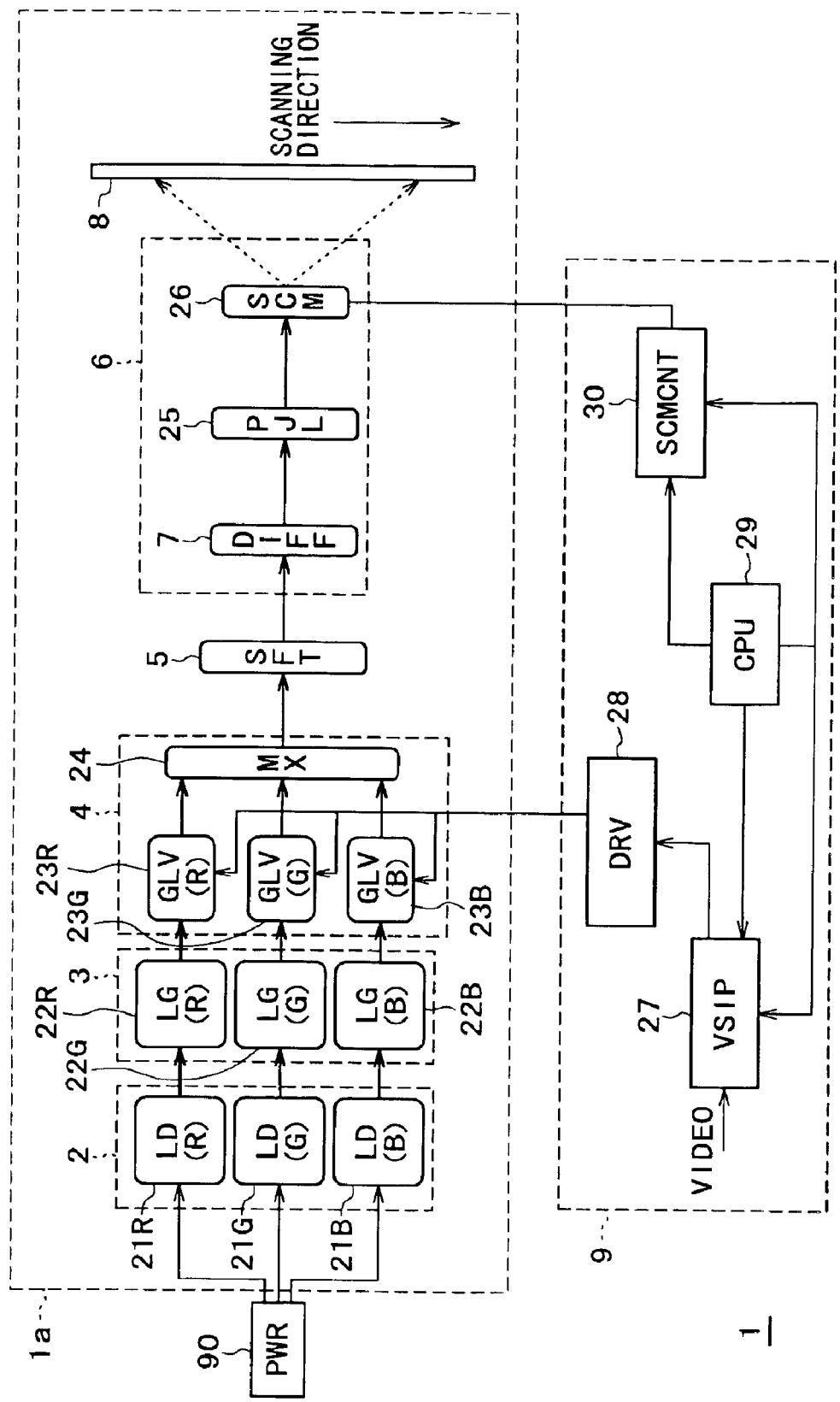
FIG. 1 is a block diagram showing a configuration of an image display apparatus according to a first embodiment of the present invention.

Referring first to FIG. 1, there is shown an example of a configuration of an image display apparatus according to a first embodiment of the present invention. The image display apparatus shown is generally denoted by 1 and formed as a projector which employs a plurality of modulation devices in the form of GLV (Grating Light Valve).

The image display apparatus 1 includes an optical system 1a, a signal processing section 9, and a power supply 90.

The optical system 1a includes a light source section 2, an illumination optical system 3, an optical modulation section 4, a spatial filter (SFT) 5, a light projection section 6, and a screen 8.

The signal processing section 9 includes a video signal input processing section (VSIP) 27, an element driving circuit section (DRV) 28, a system control section (CPU) 29, and a scan control section (SCMCNT) 30.

The video signal input processing section (VSIP) 27 serves as an initial driving signal production circuit.

The element driving circuit section (DRV) 28 serves as a driving circuit.

In the following, functions of the components mentioned above are first described simply, and then a configuration and operation of each of the components are described in detail with reference to FIG. 2 which shows arrangement of the components in the image display apparatus 1.

The light source section 2 includes, for example, laser diodes for red (R), green (G) and blue (B). In particular, the light source section 2 includes a red laser (LD(R)) 21R, a green laser (LD(G)) 21G and a blue laser (LD(B)) 21B for emitting red, green and blue laser beams, respectively. The laser diodes 21R, 21G and 21B receive supply of power from the power supply (PWR) 90 and emit laser beams of the respective colors.

The illumination optical system 3 includes a red illumination optical system (LG(R)) 22R, a green illumination optical system (LG(G)) 22G and a blue illumination optical system (LG(B)) 22B. The illumination optical system 3 further includes shape changing means for changing the shape of the cross sections of the laser beams emitted from the red laser 21R, green laser 21G and blue laser 21B in accordance with the shape of GLV devices arranged one-dimensionally, a converging lens for converging each of the laser beams from the shape changing means and a direction changing mirror for condensing the converged laser beams on an optical modulation device.

The optical modulation section 4 includes a red GLV device (GLV(R)) 23R, a green GLV device (GLV(G)) 23G and a blue GLV device (GLV(B)) 23B, and a color synthesis section (MX) 24. Each of the GLV devices 23R, 23G and 23B includes an array of pixels arranged one-dimensionally and is used to display a one-dimensional image.

More particularly, each of the GLV devices 23R, 23G and 23B includes, for example, 1,080 pixel elements arranged one-dimensionally for displaying 1,080 pixels and operates when a driving voltage corresponding to an image signal is applied thereto to reflect or diffract illumination light emitted from the illumination optical system 3, introduced into the GLV device and converging in a one-dimensional direction to emit reflected light or diffracted light including a 0th order light, ±first order lights and ±second order lights. In other words, each of the GLV devices 23R, 23G and 23B functions as a modulation means for modulating a laser beam in accordance with an image signal.

The color synthesis section (MX) 24 includes color synthesis filters for synthesizing or multiplexing red, green and blue modulated lights modulated by the GLV devices 23R, 23G and 23B, respectively, to produce modulated lights of various colors to display a color image. Here, the color synthesis section 24 serves as a color synthesis means.

The spatial filter (SFT) 5 includes, for example, a concave mirror and a convex mirror to select, from among the modulated lights produced by the GLV devices 23R, 23G and 23B, the ±first order diffracted lights which have the highest intensity and are to be used to display an image so as to pass through the optical system while intercepting the other components which are not to be used for image display. Here, the spatial filter serves as a display separation means.

The light projection section 6 includes a light diffusion section (diffuser) (DIFF) 7, a projection lens (PJL) 25 and a scanning mirror (SCM) 26.

The light diffusion section 7 diffuses the ±first order diffracted lights so as to increase the cross section of them in a one-dimensional direction to convert them into linear diffused light. The projection lens 25 projects the resulting first order diffused light onto the scanning mirror 26. The scanning mirror 26 is formed from, for example, a galvano mirror and rotates in synchronism with a video signal to project the first order diffused light onto the screen 8 and scan the first order diffused light in a predetermined direction to form a projected display image on the screen 8.

In the signal processing section 9, the video signal input processing section 27 converts a video image signal VIDEO inputted, for example, from a video reproduction apparatus for a DVD (Digital Versatile Disk) from color difference signals YCbCr (YPbPr) into RGB signals. Since the video image signal VIDEO has a non-linear characteristic ($\gamma$ characteristic) applied thereto, the video signal input processing section 27 performs an inverse gamma correction process for the RGB signals to convert the non-linear characteristic of them into a linear characteristic. Then, in order for the RGB signals to correspond to the color reproduction range of the illumination light sources, the video signal input processing section 27 performs a color space conversion process for the RGB signals. Then, the video signal input processing section 27 inputs the resulting video signals to the element driving circuit section 28.

The element driving circuit section 28 receives the signals outputted from the video signal input processing section 27 and applies them to the GLV devices 23R, 23G and 23B at a predetermined timing to drive the GLV devices 23R, 23G and 23B so that the laser lights emitted from the red laser 21R, green laser 21G and blue laser 21B may be modulated, respectively.

The scan control section 30 outputs a signal for driving and controlling rotation of the scanning mirror 26 to the scanning mirror 26.

The system control section (CPU) 29 controls the video signal input processing section (VSIP) 27, element driving circuit section (DRV) 28 and scan control section (SCMCNT) 30 to establish synchronism among the driving voltage signals to be applied from the element driving circuit section 28 to the GLV devices 23R, 23G and 23B, the output signal of the scan control section (SCMCNT) 30, the operation timings of the GLV devices 23R, 23G and 23B, and the rotation timing of the scanning mirror 26.

Accordingly, the image display apparatus 1 operates in the following manner to display a two-dimensional color image.

Lights of the three primary colors emitted from the light sources 21R, 21G and 21B are individually condensed in a one-dimensional direction by the illumination optical system 3 and illuminated on the GLV devices 23R, 23G and 23B for the colors, respectively. Each of the pixel elements of the GLV devices 23R, 23G and 23B controls the diffraction state of the corresponding incoming light in accordance with the driving signal applied thereto from the element driving circuit section 28 to modulate the illumination light of the corresponding color.

The modulated lights of R, G and B are condensed by the color synthesis section 24 to synthesize a modulated light of a desired color.

Thereafter, unnecessary modulated lights other than the ±first order diffracted lights are removed from the modulated light by the spatial filter 5, and the resulting modulated light is converted into diffused light by the light diffusion section (DIFF) 7. The resulting first order modulated diffused light is introduced into the scanning mirror 26 past the projection lens 25. Based on the rotation driving signal inputted from the scan control section (SCMCNT) 30, the scanning mirror 26 scans the first order modulated diffused light on the screen 8 in synchronism with the video image signal VIDEO and the driving signals applied to the GLV devices 23R, 23G and 23B from the element driving circuit section 28 to form a two-dimensional color image on the screen 8.

Figure 2:
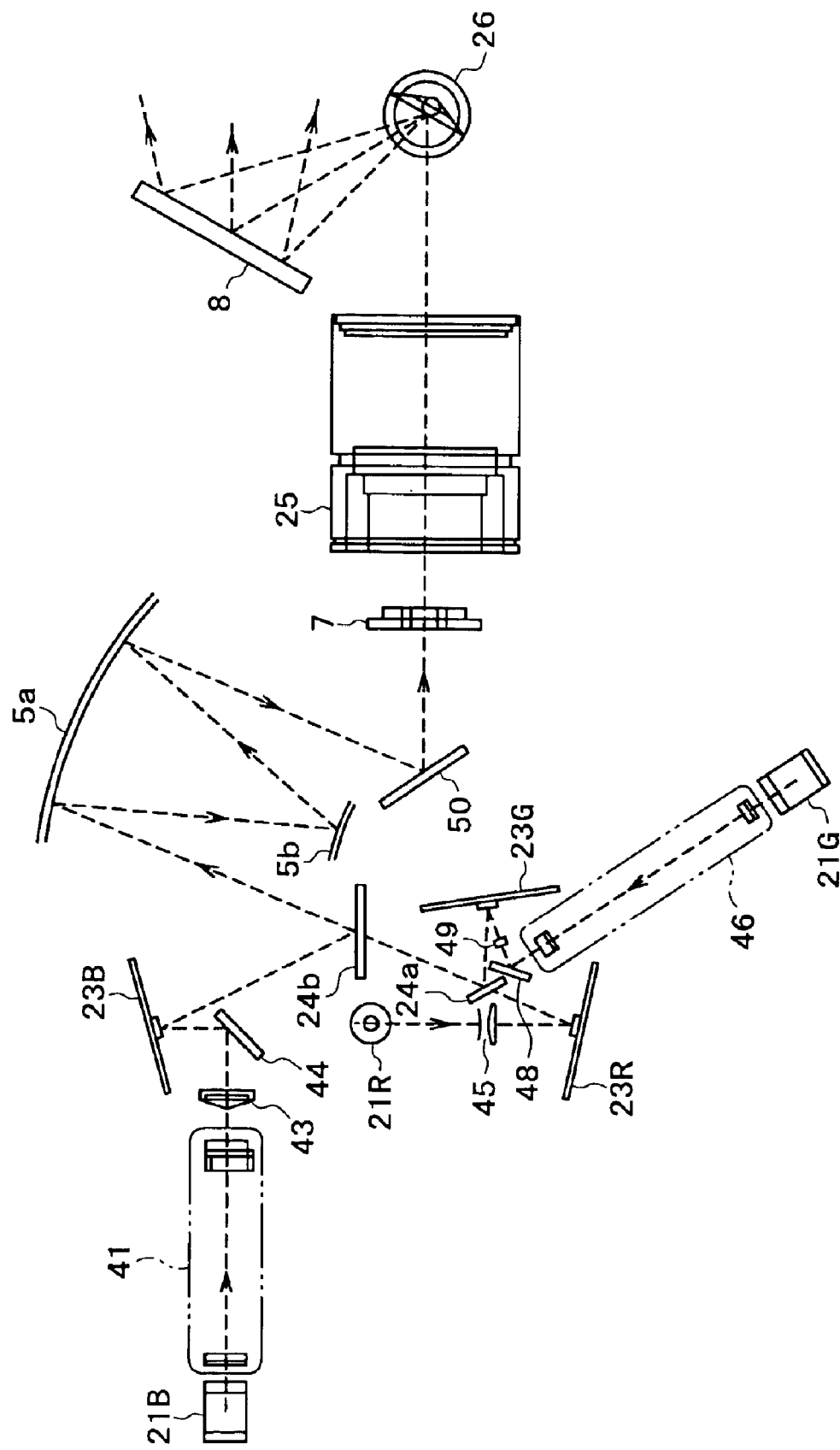
FIG. 2 is a schematic view showing an arrangement of components of the image display apparatus according to the first embodiment.

FIG. 2 shows an example of arrangement of the components described above of the image display apparatus 1.

Referring to FIG. 2, in the image display apparatus 1 shown, the green laser 21G and the blue laser 21B are arranged such that they emit laser lights in directions parallel to the plane of FIG. 2 while the red laser 21R is arranged such that it emits a red laser beam perpendicularly to the plane of FIG. 2.

Now, a configuration and a principle of operation of the GLV devices 23R, 23G and 23B which are major components of the image display apparatus 1 are described with reference to the FIGS. 3 to 5. In the following description, for the convenience of description, where there is no necessity to distinguish the GLV devices 23R, 23G and 23B from one another, any of them is represented as a GLV device 23.

FIG. 3 is a partial schematic perspective view of a GLV device 23 for displaying a one-dimensional image.

Referring to FIG. 3, the GLV device 23 shown includes a common electrode 12 formed from a polycrystalline silicon thin film on a silicon substrate not shown, and strip-like ribbon electrodes 10a, 11a, 10b, 11b, 10c, 11c and 10d formed in a spaced relationship by a predetermined distance above the common electrode 12. Each of the ribbon electrodes 10a, 11a, 10b, 11b, 10c, 11c and 10d has a reflection film (not shown) formed on an upper face thereof and thereby acts as a reflection member.

As shown in FIG. 3, if a driving voltage is applied to the ribbon electrodes 10a, 10b, 10c and 10d, then electrostatic force is generated between the ribbon electrodes 10a, 10b, 10c and 10d and the common electrode 12. Consequently, the electrostatic force moves or deforms the ribbon electrodes 10a, 10b, 10c and 10d in an upward or downward direction in FIG. 3 in accordance with the driving voltage thereto thereby to change the height of the reflection films of the ribbon electrodes 10a, 10b, 10c and 10d. Meanwhile, the ribbon electrodes 11a, 11b and 11c remain at fixed positions and do not move.

The ribbon electrodes 10a, 10b, 10c and 10d which can be moved or deformed may be hereinafter referred to as movable ribbon electrodes, and the ribbon electrodes 11a, 11b and 11c which do not move may be hereinafter referred to as fixed ribbon electrodes.

The ribbon electrodes may have, for example, the following representative dimensions. In particular, the width of the electrodes is 3 to 4 µm; the gap between adjacent electrodes is approximately 0.6 µm; and the length of the electrodes is 200 to 400 µm.

A plurality of ribbon electrodes can be used in a set for one pixel. For example, the six adjacent ribbon electrodes 10a, 11a, 10b, 11b, 10c and 11c shown in FIG. 3 can be used so as represent one pixel. In this instance, the width of one pixel is approximately 25 µm.

For example, a GLV device which displays 1,080 pixels and is being placed into practical use includes a large number of ribbon electrodes for 1,080 pixels along a transverse direction of FIG. 3.

A principle of operation of the GLV device 23 is described with reference to FIGS. 4 and 5.

FIGS. 4 and 5 are sectional views of the GLV device 23 in a transverse direction shown in FIG. 3. Referring to FIG. 4, the driving voltage to the movable ribbon electrodes 10a, 10b, 10c and 10d is OFF, and the fixed ribbon electrodes 11a, 11b and 11c are grounded. This state is referred to as an OFF state of the GLV device 23.

Since the driving voltage is zero, the movable ribbon electrodes 10a, 10b, 10c and 10d exhibit no movement, and all of the ribbon electrodes keep the fixed distance from the common electrode 12 and are positioned on the same plane.

If illumination light is illuminated on the ribbon electrodes in this state, then no difference appears among all of the light paths of the reflected lights reflected by the ribbon electrodes 10a, 11a, 10b, 11b, 10c, 11c and 10d, but only diffracted lights of even-numbered orders such as 0th order lights (in an ordinary reflection direction) and ±second order lights are produced.

Since the image display apparatus 1 is configured such that only the first order diffracted lights are condensed on the screen 8, when the GLV device 23 is in the OFF state as described above, the screen 8 displays black.

Referring now to FIG. 5, a predetermined driving voltage is applied to the movable ribbon electrodes 10a, 10b, 10c and 10d while the fixed ribbon electrodes 11a, 11b and 11c are grounded.

As seen in FIG. 5, the movable ribbon electrodes 10a, 10b, 10c and 10d to which the driving voltage is applied are displaced downward toward the common electrode 12 side by the electrostatic force.

For example, where the wavelength λ of the incoming light is 532 nm, if the movable ribbon electrodes 10a, 10b, 10c and 10d are displaced by λ/4 in response to the driving voltage applied thereto, then they move by λ/4=133 nm. When the amount of movement of the movable ribbon electrodes 10a, 10b, 10c and 10d is λ/4, the diffraction efficiency of first order light exhibits its maximum.

In this state, if illumination light is introduced to the ribbon electrodes, then the total light path difference between light fluxes reflected by the movable ribbon electrodes 10a, 10b, 10c and 10d and light fluxes reflected by the fixed ribbon electrodes 11a, 11b and 11c is equal to the half wavelength λ/2. Consequently, the GLV device 23 functions as a reflection type diffraction grating and produces diffracted lights including ±first order lights and ±third order lights because the reflected light fluxes (0th order lights) interfere with and cancel each other.

The diffracted lights of the different order numbers produced by the GLV devices 23R, 23G and 23B advance in directions determined by the spatial periods of the GLV devices 23R, 23G and 23B, that is, are modulated spatially. The diffracted lights are synthesized by the color synthesis section 24, which includes first color synthesis filter 24a and second color synthesis filter 24b, to form a light flux of a desired color. Then, the spatial filter 5, which includes an Offner relay mirror 5a and a Schlieren filter 5b, removes the diffracted lights other than the ±first order lights from the light flux of the desired color. The remaining ±first order lights are diffused by the light diffusion section (diffuser) 7 and projected onto the scanning mirror 26 through the projection lens 25. The scanning mirror 26 deflects the diffracted lights onto the screen 8 to form a one-dimensional image. Further, since the scanning mirror 26 is rotating in response to an image signal, it scans the diffracted lights and the one-dimensional image on the screen 8 to form a color image.

Now, the other components of the image display apparatus 1 shown in FIG. 2 are described.

As described hereinabove, the illumination optical system 3 includes the red illumination optical system 22R, green illumination optical system 22G and blue illumination optical system 22B. The illumination optical system 3 changes the cross sectional shape of the light beams from the red laser 21R, green laser 21G and blue laser 21B in accordance with the shape of the GLV devices 23R, 23G and 23B each in the form of a one-dimensional image element and illuminates the light beams of the changed cross sectional shapes upon the GLV devices 23R, 23G and 23B, respectively.

As seen in FIG. 2, the red illumination optical system 22R includes a line generator expander 45. The green illumination optical system 22G includes a line generator expander 46, a mirror 48 and a converging lens 49. The blue illumination optical system 22B includes a line generator expander 41, a converging lens 43 and a mirror 44.

Each of the line generator expanders 45, 46 and 41 includes two optical lenses and forms a linear laser light for being illuminated on a corresponding one of the GLV devices 23R, 23G and 23B arranged linearly.

Figure 6A:
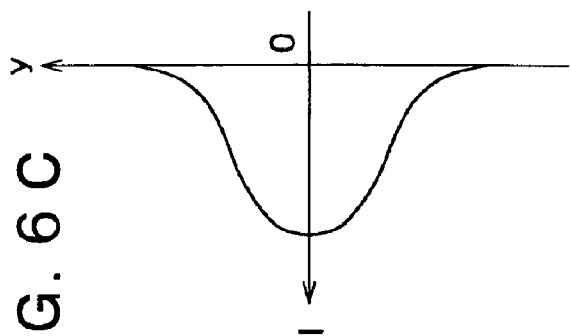
FIGS. 6A to 6C are diagrams illustrating a characteristic of light before it is introduced into an illumination optical system of the image display apparatus according to the first embodiment.
Figure 6C:
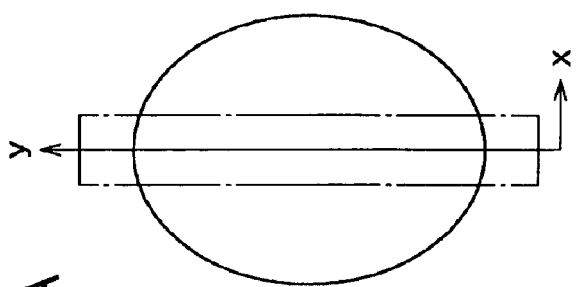
Figure 6B:
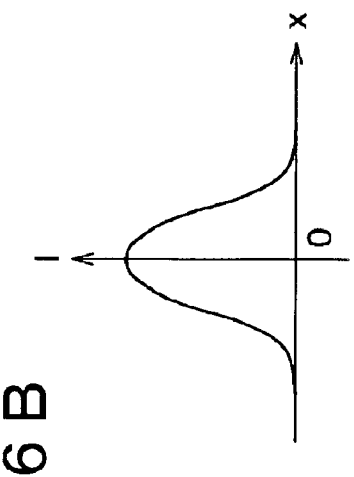

FIG. 6A and FIGS. 6B and 6C illustrate the cross sectional shape and the spatial intensity distribution of a laser beam immediately before it is introduced into one of the illumination optical systems 22R, 22G and 22B after it is emitted from a corresponding one of the laser light sources 21R, 21G and 21B. Referring to FIGS. 6A, 6B and 6C, the x axis indicates a direction parallel to the ribbon electrodes of each GLV device and hence is a direction perpendicular to the plane of FIG. 5. The y axis indicates the longitudinal direction of each GLV device and hence extends along the array direction of the ribbon electrodes and perpendicularly to the ribbon electrodes. In FIGS. 6B and 6C, the axis I indicates the light intensity.

The laser beam emitted from each of the laser light sources 21R, 21G and 21B has a spot-like cross section as indicated by a solid line in FIG. 6A. In FIG. 6A, the position of any of the GLV devices 23R, 23G and 23B is indicated by a broken line for comparison with the shape of the beam.

FIG. 6B indicates the illumination light intensity distribution of any of the GLV devices 23R, 23G and 23B in a direction perpendicular to the ribbon electrodes. Meanwhile, FIG. 6C indicates the illumination light intensity distribution of any of the GLV devices 23R, 23G and 23B in its longitudinal direction.

As seen from FIGS. 6A to 6C, the laser beam emitted from each of the laser light sources 21R, 21G and 21B but not shaped by the illumination optical system 3 can illuminate only part of a corresponding one of the GLV devices 23R, 23G and 23B, and the intensity distribution of the illumination light is not uniform.

FIG. 7A and FIGS. 7B and 7C illustrate the cross sectional shape and the spatial intensity distribution of a laser beam emitted after it is emitted from one of the laser light sources 21R, 21G and 21B and then shaped by a corresponding one of the illumination optical systems 22R, 22G and 22B. Referring to FIGS. 7A, 7B and 7C, the x axis, the y axis and the I axis are defined similarly as in the case of FIGS. 6A, 6B and 6C.

As seen from FIGS. 7A to 7C, the laser beams from the laser light sources 21R, 21G and 21B are shaped by and emitted from the illumination optical systems 22R, 22G and 22B, respectively. More particularly, each of the laser beams is shaped such that it is converged to a width substantially equal to the width of the ribbon electrodes in the direction of the ribbon electrodes and illuminates all of the ribbon electrodes in the array direction of the ribbon electrodes of the GLV device. Accordingly, each of the laser beams emitted from the illumination optical systems 22R, 22G and 22B has a linear cross sectional shape extending in the direction of the array of the ribbon electrodes of the GLV device and thus illuminates the overall area of the GLV device.

Since the ribbon electrodes of the GLV device have a small size, the light fluxes emitted from the illumination optical systems 22R, 22G and 22B must have a sufficiently small size in the direction of the x axis.

Referring back to FIG. 2, the linear blue laser beam emitted from the line generator expander 41 is converged by the converging lens 43, deflected by the mirror 44 and condensed on the GLV device 23B. The linear green laser beam emitted from the line generator expander 46 is deflected by the mirror 48, converged by the converging lens 49 and condensed on the GLV device 23G. The linear red laser beam emitted from the line generator expander 45 is converged and deflected by the converging lens and the mirror not shown and condensed on the GLV device 23R. Here, the line generator expanders 41, 45 and 46 serve as first shaping means and the converging lenses 43 and 49 serve as first converging lenses while the mirrors 44 and 48 serve as first deflecting mirrors.

In each of the GLV devices 23R, 23G and 23B each having a function of a spatial modulator, each of the ribbon electrodes of each pixel element is displaced in response to a driving voltage applied thereto to modulate incoming laser light and emit modulated light including diffracted lights of even-numbered orders such as a 0th order light and ±second order lights or diffracted lights of odd-numbered orders such as ±first order lights and ±third order lights. The diffracted lights of the individual numbered orders advance in directions determined by the spatial periods of the GLV devices 23R, 23G and 23B, that is, are spatially modulated by the GLV devices 23R, 23G and 23B.

The modulated lights of the different colors thus emitted are mixed by the color synthesis section 24 to form laser light of a desired color.

The color synthesis section 24 includes a first color synthesis filter 24a and a second color synthesis filter 24b.

The red laser light modulated by the GLV device 23R and the green laser light modulated by the GLV device 23G are first synthesized by the first color synthesis filter 24a.

Then, the blue laser light modulated by the GLV device 23B is synthesized with the laser light synthesized by the first color synthesis filter 24a by the second color synthesis filter 24b.

Consequently, the modulated lights of the three colors modulated by the three GLV devices are color-synthesized.

Since the luminance of the blue laser light is lower than those of the green and red laser lights, if the blue light is synthesized as it is with the green light or the red light, then the blue light component is weakened by the green or red light component due to the difference in luminance. Since the luminances of the red laser and the green laser are proximate to each other, the red and green lights can be color-synthesized without the necessity to perform adjustment of the luminance levels.

The spatial filter 5 shown in FIG. 1 includes an Offner relay mirror 5a having a concave face and a Schlieren filter 5b in the form of a convex mirror which are disposed in an opposing relationship to each other as seen in FIG. 2.

As seen in FIG. 2, the laser light synthesized by the second color synthesis filter 24b is illuminated on the Offner relay mirror 5a having a concave face. The concave Offner relay mirror 5a reflects the illuminated light to the Schlieren filter 5b having a convex face.

The Schlieren filter 5b in the form of a convex mirror is disposed on a Fourier plane of the concave Offner relay mirror 5a and has a radius of curvature having a ratio of 1:2 to that of the concave Offner relay mirror 5a. The 0th order light, +second order light, −second order light, or the +first order light, −first order light, and other diffracted lights of higher numbered orders reflected by the concave Offner relay mirror 5a are converged at individually different positions on the convex face of the Schlieren filter 5b. The Schlieren filter 5b removes the diffracted lights other than the ±first order lights and introduces only the ±first order lights to the light diffusion section 7.

Figure 8C:
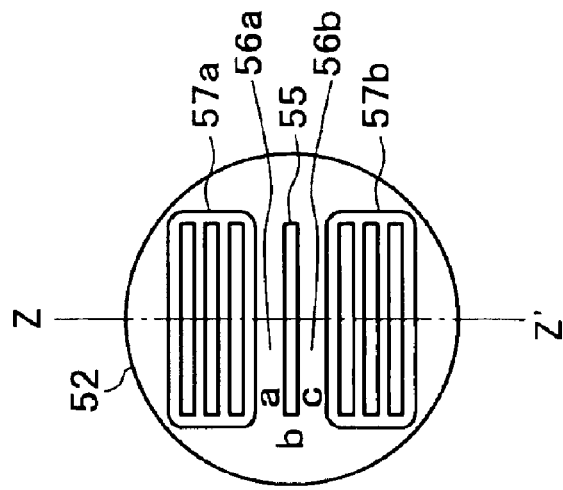
FIGS. 8A to 8C are diagrammatic views illustrating a principle of a spatial filter section of the image display apparatus according to the first embodiment.
Figure 8A:
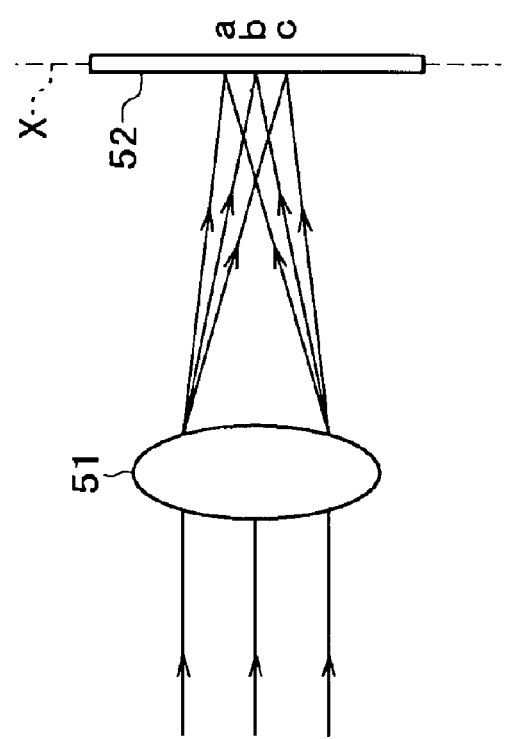
Figure 8B:
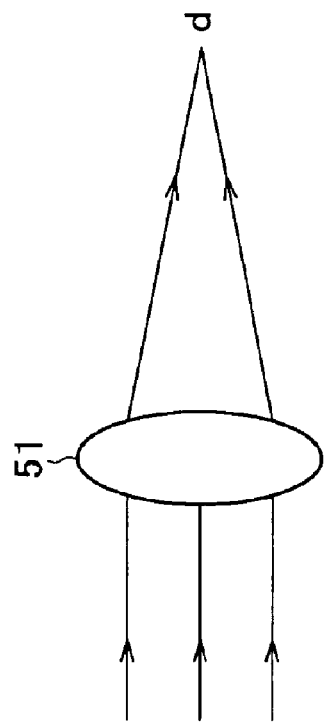

FIGS. 8A, 8B and 8C illustrate a principle of the spatial filter 5.

Referring first to FIG. 8A, the spatial filter 5 is represented as a lens 51 representative of a function of the Offner relay mirror 5a and has a reflecting surface 52 representative of a function of the Schlieren filter. Reference character X denotes the Fourier plane of the lens 51.

Diffracted lights of individual numbered orders illuminated on the lens 51 are converged on the reflecting surface 52 provided on the Fourier plane X. For example, the 0th order light is converged at a position b, and the +first order light and the −first order light are converged at positions a and c, respectively.

As seen in FIG. 8C, an opening 55 is provided at the position b on the reflecting surface 52 and passes the 0th order light therethrough. A region 56a and another region 56b of the reflecting surface 52 corresponding to the positions a and c reflect the +first order light and the −first order light, respectively.

The second order lights or the third order lights and the diffracted lights of the other higher numbered orders are converged at positions on the opposite outer side positions with respect to the positions a and c, that is, a region 57a or 57b. As seen in FIG. 8C, an opening is provided at each of the regions 57a and 57b and the openings pass such diffracted lights of the high numbered orders therethrough.

Since the convex reflecting surface of the Schlieren filter 5b is configured such that it reflects the necessary diffracted lights but passes therethrough the unnecessary diffracted lights through the openings provided at the converging positions of the unnecessary diffracted lights, the spatial filter 5 extracts only the ±first order lights. The thus extracted ±first order lights are reflected to the Offner relay mirror 5a. The spatial filter 5 thus serves as a display light separation means for separating displaying light and non-displaying light as described above.

Referring back to FIG. 2, the concave Offner relay mirror 5a reflects the laser light synthesized by the second color synthesis filter 24b at a reflection angle smaller than that of a reflecting mirror in the form of a flat plate to the Schlieren filter 5b. The convex Schlieren filter 5b reflects the ±first order lights at reflection angles greater than that of a reflecting mirror in the form of a flat plate to the Offner relay mirror 5a. The concave Offner relay mirror 5a reflects the ±first order lights at reflection angles smaller than that of a reflecting mirror in the form of a flat plate to a mirror 50.

The ±first order lights can be extracted without any aberration by the arrangement of the concave Offner relay mirror 5a and the convex Schlieren filter 5b.

FIG. 8B indicates focal positions of the diffracted lights as viewed in a ZZ' direction of FIG. 8C. As seen in FIG. 8C, although the converging points of the diffracted lights of the different numbered orders are offset from each other in the ZZ' direction, they are not offset from each other in a direction perpendicular to the ZZ' direction.

Figure 9A:
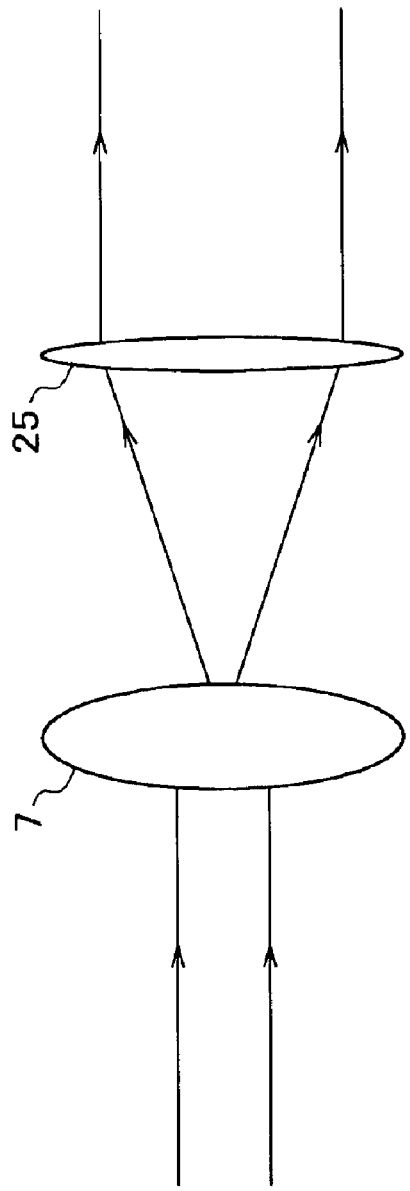
FIGS. 9A and 9B are diagrammatic views illustrating a function of a light diffusion section of the image display apparatus according to the first embodiment.
Figure 9B:
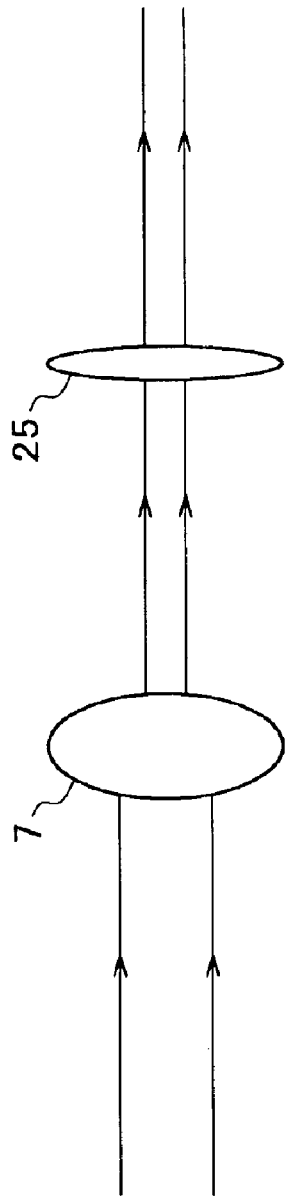

Referring back to FIG. 2, the mirror 50 deflects the modulated lights toward the light diffusion section 7. Referring to FIGS. 9A and 9B, the light diffusion section 7 diffuses the laser light introduced thereto from the mirror 50 into a parallel light having a great width in side elevation (FIG. 9A) and having a small width in top plan (FIG. 9B). The diffused linear laser light is introduced into the projection lens 25. Referring back to FIG. 2, the projection lens 25 projects the diffused linear laser light onto the scanning mirror 26. Here, the mirror 50 serves as a second deflecting mirror, and the light diffusion section 7 serves as a second shaping means while the projection lens 25 serves as a projection optical system.

The scanning mirror 26 is formed from, for example, a galvano mirror and projects the linear laser light forwardly onto the screen 8 to form a one-dimensional image formed from a train of pixel elements. Further, the scanning mirror 26 rotates in response to an image signal and scans such a one-dimensional image on the screen 8 to form a two-dimensional image. Thus, the scanning mirror 26 serves as a scanning means.

According to the present embodiment, the image display apparatus in the form of a projector which uses a GLV device can be formed compact. Further, the image display apparatus can form a display color of a high quality through color synthesis and remove unnecessary diffracted lights efficiently. Consequently, since the diffracted light to be used for image display includes minimized noise, the image display apparatus can display a color video image of a high quality.

Second Embodiment

An image display apparatus according to a second embodiment of the present invention has a basic configuration similar to that of the image display apparatus of the first embodiment described hereinabove with reference to FIGS. 1 and 2. Thus, the reference numerals used for the description of the image display apparatus of the first embodiment are similarly used for the present embodiment although the overlapping description is omitted.

Since illumination conditions of the laser light sources 21R, 21G and 21B have some ununiformity and modulation characteristics of the pixel elements of the GLV devices 23R, 23G and 23B have some dispersion, an image displayed has some ununiformity in color and luminance. The image display apparatus of the present embodiment can detect and correct such ununiformity to display a video image of a higher picture quality.

If the illumination conditions are uniform and the modulation characteristics of the pixel elements of the GLV devices 23R, 23G and 23B have no dispersion, then the image display apparatus described hereinabove can display an ideal video image if an image signal is inputted to the driving circuits for the GLV devices 23R, 23G and 23B to operate the GLV devices 23R, 23G and 23B.

Actually, however, the characteristics of the GLV devices 23R, 23G and 23B themselves and the characteristics of the driving circuits for them have some dispersion. Therefore, they do not operate uniformly in response to incoming light, and the luminance on the screen becomes ununiform and a horizontal stripe or stripes appear on the screen.

Further, as regards the illumination conditions, even if the illumination optical systems are optimized, it is difficult to make the illumination conditions uniform over all of the GLV devices, which gives rise to appearance in ununiformity in luminance and color display on the screen.

FIGS. 10A to 10D are sectional views in a transverse direction of the GLV device 23 shown in FIG. 3.

In FIGS. 10A and 10C, six ribbon electrodes 10a, 11a, 10b, 11b, 10c and 11c form one pixel element of the GLV device 23. Adjacent ribbon electrodes 10*d*, 11*d* and 10*e* form an adjacent pixel element. Similarly as in FIGS. 3 to 5, the ribbon electrodes 10*a*, 10*b*, 10*c*, 10*d* and 10*e* are movable ribbon electrodes while the ribbon electrodes 11*a*, 11*b*, 11*c* and 11*d* are fixed ribbon electrodes.

FIGS. 10B and 10D illustrate luminance distributions of one-dimensional images formed on the screen 8 and corresponding to operation conditions of the GLV device shown in FIGS. 10A and 10C, respectively.

FIG. 10A illustrates a dispersion in position of the ribbon electrodes of the GLV device when no driving voltage is applied. FIG. 10B illustrates a luminance distribution of a one-dimensional image on the screen 8 corresponding to the GLV device in the state of FIG. 10A when no driving voltage is applied to the movable ribbon electrodes.

As seen from FIG. 10A, even if no driving voltage is applied, the ribbon electrodes 10*a* and 10*d* are not positioned in the same plane as that of the other ribbon electrodes and have vertical offsets ΔD1 and ΔD2, respectively. Consequently, the pixel elements of the GLV device have a unique dispersion in modulation characteristic.

When no driving voltage is applied, if illumination light is introduced into the GLV device 23, then ideally no diffracted light is produced and black is displayed on the screen 8. However, due to the vertical offsets of the ribbons of the GLV device, some diffracted lights are produced, and unintended bright spots are displayed at positions i and j of the dark screen of the screen 8 corresponding to the ribbon electrodes 10*a* and 10*d*, respectively. Further, the scanning mirror 26 scans the one-dimensional image, and thereupon, horizontal stripes are formed on the screen 8 and decrease the contrast of the screen.

FIG. 10C illustrates a dispersion in position of the ribbon electrodes of the GLV device when a driving voltage is applied. FIG. 10D illustrates a luminance distribution of a one-dimensional image on the screen 8 corresponding to the GLV device in the state illustrated in FIG. 10C.

As seen in FIG. 10C, when a driving voltage is applied, the ribbon electrodes 10*c* and 10*d* are moved to unintended positions and have offsets of ΔZ1 and −ΔZ2 from their desired positions, respectively. On the screen 8, the luminances at positions k and l corresponding to the ribbon electrodes 10*c* and 10*d* do not coincide with desired luminances and have some dispersion in luminance. The scanning mirror 26 similarly scans the one-dimensional image, and thereupon, horizontal stripes are formed on the screen 8 and deteriorate the picture quality.

FIG. 11 illustrates the ununiformity in color and luminance of a one-dimensional image on the screen 8 caused by the ununiformity in illumination condition involved in the lasers 21R, 21G and 21B of red (R), green (G) and blue (B). Since the illumination conditions are ununiform among the GLV devices 23R, 23G and 23B, the ununiformity in luminance and color display appears on the screen, and horizontal stripes in color and luminance are produced by scanning of the scanning mirror.

In order to eliminate such ununiformity in luminance and color on the screen caused by a dispersion or instability in characteristic unique to the image elements and the light sources as described above, in the present embodiment, a light detection apparatus and a circuit for performing arithmetic operation for correction are provided. Thus, the ununiformity in luminance and color is measured and corrected in advance, and results of the optimization obtained through the measurement and correction are stored as a data table into a memory and used for later image display.

Figure 12:
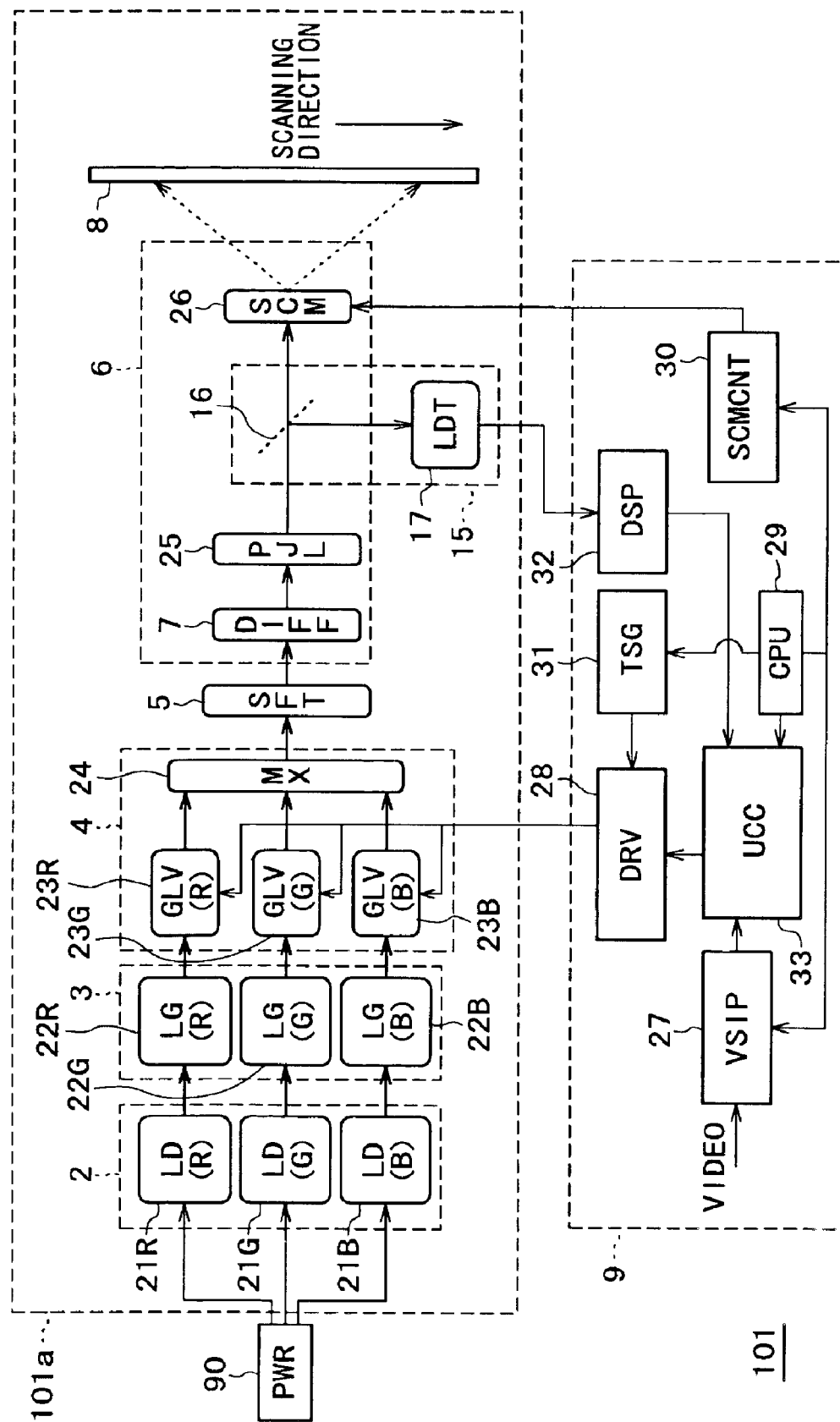
FIG. 12 is a block diagram showing a configuration of an image display apparatus according to the second embodiment.

FIG. 12 shows an example of a configuration of the image display apparatus 101 of the present embodiment.

FIG. 12 shows an example of arrangement of the components described above of the image display apparatus 101.

Figure 13:
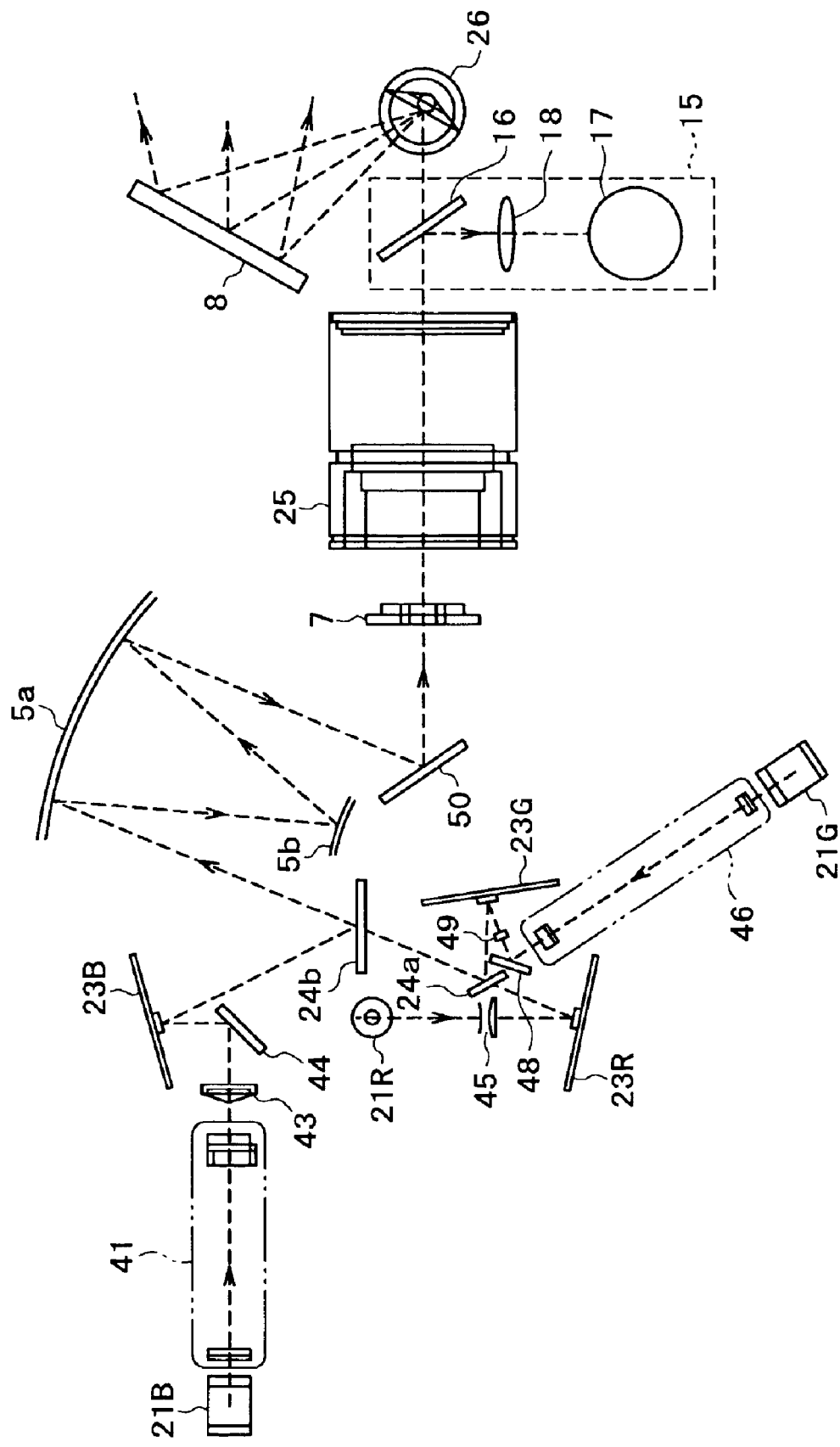
FIG. 13 is a schematic view showing arrangement of components of the image display apparatus according to the second embodiment.

Referring to FIG. 13, in the image display apparatus 101 shown, an optical system 101*a* includes a light detection apparatus 15 in addition to the light source section 2, illumination optical system 3, optical modulation section 4, spatial filter (SFT) 5, light projection section 6 and screen 8.

Referring to FIG. 12, the signal processing section 9 includes a test signal production section 31, a detection signal processing section (DSP) 32 and a correction circuit section 33 in addition to the video signal input processing section (VSIP) 27, element driving circuit section (DRV) 28, system control section (CPU) 29 and scan control section (SCMCNT) 30. The test signal production section 31 applies a test driving voltage to the GLV devices 23R, 23G and 23B to detect the ununiformity in color and luminance displayed. The detection signal processing section 32 processes a signal detected by the light detection apparatus 15. The correction circuit section 33 determines an optimum driving voltage with which the ununiformity in color and luminance to be displayed is to be corrected based on the detection signal.

The video signal input processing section (VSIP) 27 serves as an initial driving signal production circuit.

The element driving circuit section (DRV) 28 serves as a driving circuit.

The test signal production section 31, detection signal processing section (DSP) 32 and correction circuit section 33 serve as a correction section.

In the present embodiment, the light detection apparatus 15 measures modulated lights emitted from the pixel elements of the GLV devices to determine modulation characteristics. Further, the light detection apparatus 15 detects the ununiformity in luminance and color displayed caused by a dispersion in modulation characteristic and the luminance conditions. As seen in FIG. 12, the light detection apparatus 15 includes a reflecting mirror 16, and an optical sensor 17 which may be formed from, for example, an integrating sphere or a CCD unit. Further, a lens 18 for converging deflected laser light is interposed between the reflecting mirror 16 and the optical sensor 17 as seen in FIG. 13.

The reflecting mirror 16 deflects the modulated light emitted from the projection lens 25 toward the optical sensor 17.

Where, for example, an integrating sphere is used, the optical sensor 17 reflects the light inputted thereto in the inside of the integrating sphere so that it may not leak to the outside of the integrating sphere to collect all of the inputted light and measure the energy of the light, that is, the amount of the incoming light.

The reflecting mirror 16 is positioned at the position shown in FIG. 13, for example, only when the display ununiformity is to be measured in advance to change the light path. When an image is to be displayed actually, however, the reflecting mirror 16 is removed to restore the ordinary light path.

The light detection apparatus 15 serves as a measuring means.

Accordingly, the image display apparatus 101 operates in the following manner to display a two-dimensional color image.

First, the ununiformity in luminance and color displayed is measured and corrected in advance.

Figure 14:
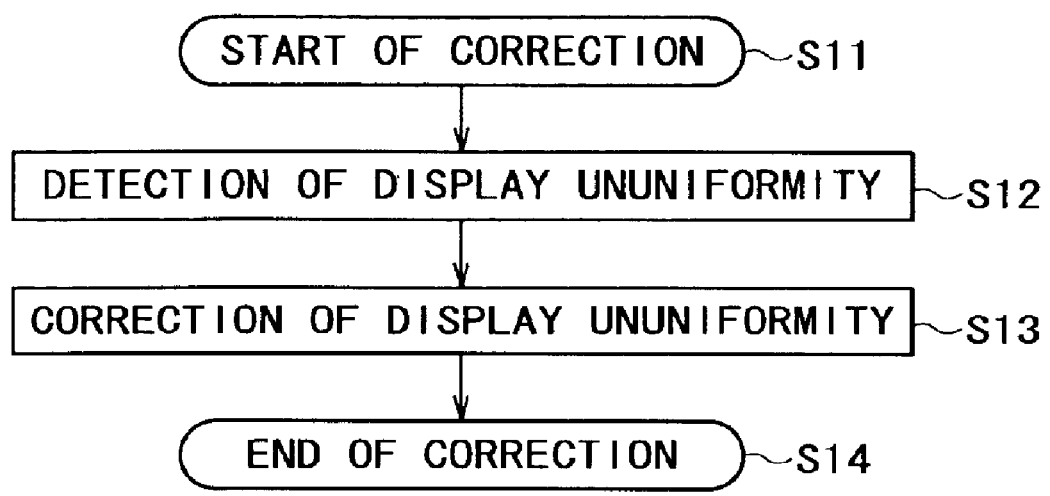
FIG. 14 is a flow chart illustrating a process of detecting and correcting the ununiformity in display by the image display apparatus according to the second embodiment.

FIG. 14 is a flow chart illustrating the operation for measurement and correction by the image display apparatus 101.

Step S11:

A measurement of the ununiformity in display luminance and color of the image display apparatus 101 is performed.

Step S12:

The laser light sources 21R, 21G and 21B successively illuminate laser light upon the GLV devices 23R, 23G and 23B while the test signal production section 31 applies a test signal successively changing, for example, from a predetermined minimum voltage to a predetermined maximum voltage as a driving signal to all of those pixel elements of the GLV devices on which the laser light is illuminated. The light detection apparatus 15 individually measures the amounts of modulated lights emitted from the individual pixel elements.

Step S13:

The detection signal processing section 32 performs initial processes such as gain adjustment and A/D conversion for the signal of modulated light from each of the pixel elements measured by the light detection apparatus 15. The correction circuit section 33 uses the amount of modulated light from each of the pixel elements measured by the light detection apparatus 15 to analyze and detect the ununiformity in luminance and color of image display by the pixel element to determine an optimum driving voltage to be applied to the pixel element of each color with respect to the predetermined initial driving voltage. The correction circuit section 33 produces a data table of such determined optimized driving voltage data and stores the data table into the memory of the image display apparatus 101.

When an image is to be displayed actually, the stored data table of the driving voltages is used to apply the driving voltages to the individual pixel elements of the GLV devices.

A succeeding flow of image display is similar to that in the first embodiment.

Now, a method of measuring and correcting the ununiformity in luminance and color to be displayed in the present embodiment is described.

Figure 15:
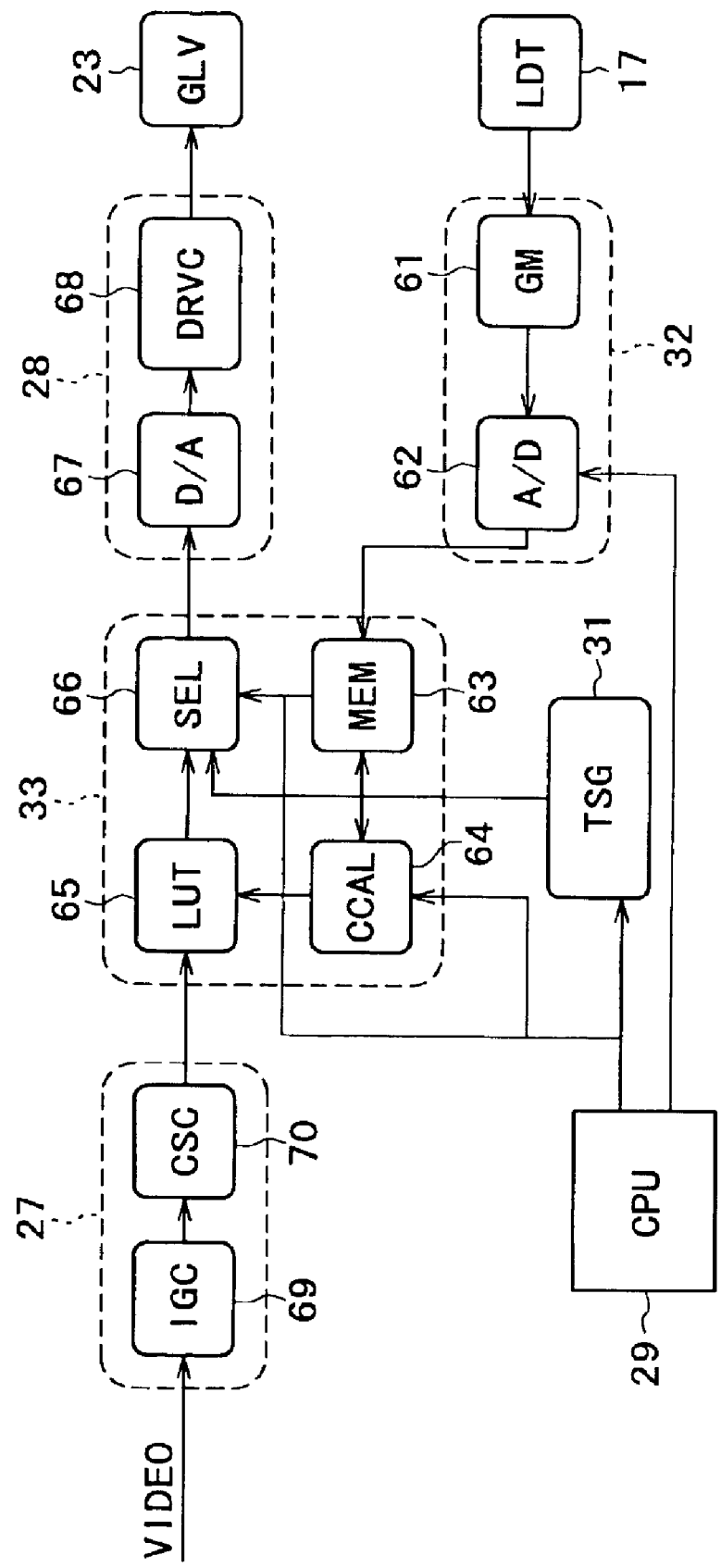
FIG. 15 is a block diagram showing a configuration of a signal processing system of the image display apparatus according to the second embodiment.

FIG. 15 shows a detailed configuration of the signal processing section 9.

Referring to FIG. 15, the video signal input processing section 27 includes an inverse γ correction circuit (IGC) 69 and a color space conversion circuit (CSC) 70 and processes a video image signal VIDEO in the form of RGB signals obtained, for example, by conversion from color difference signals YCbCr (YPbPr).

The inverse γ correction circuit 69 converts a non-linear characteristic (γ characteristic) applied to the RGB signals into a linear characteristic through an inverse gamma correction process.

The color space conversion circuit 70 performs a color space conversion process for the RGB signals in order for the RGB signals to correspond to the color reproduction range of the illumination light sources. The video image signal VIDEO processed in this manner is inputted to the correction circuit section 33.

The detection signal processing section 32 includes a gain adjustment circuit (GM) 61 and an A/D (analog to digital) conversion circuit 62 and performs an initial process for a signal of modulated light from each of the pixel elements measured by the optical sensor 17.

The gain adjustment circuit 61 corrects the difference in detection sensitivity of the optical sensor 17 to the laser lights of different wavelengths emitted from the laser light sources 21R, 21G and 21B based on the detected modulated light signals.

The A/D conversion circuit 62 converts each of the detection signals after the correction into a digital signal. The detection data obtained by the conversion is successively stored into a memory 63 in the correction circuit section 33.

The correction circuit section 33 includes a memory 63, a correction value calculator (CCAL) 64, a data table storage section (LUT) 65 and a selection circuit (SEL) 66.

A measurement of the modulated lights is performed for all of the pixel elements of the GLV devices 23R, 23G and 23B, and resulting data are cumulatively stored into the memory 63. Thereafter, the correction value calculator 64 uses the measurement data of each of the individual pixel elements to determine a modulation characteristic of the pixel element to derive an illumination profile of each of the GLV devices. Then, the correction value calculator 64 determines an optimum driving voltage to be applied to each of the pixel elements of the GLV devices so that the pixel element exhibit no ununiformity in luminance and color in the illumination profile of the GLV device with respect to a predetermined initial driving voltage. Then, the correction value calculator 64 prepares a data table for such optimized driving voltage data determined in this manner and stores the data table into the data table storage section 65.

When an image is to be displayed, the corrected driving signals stored in the data table storage section 65 are outputted to the element driving circuit section 28 to display an image.

When the display ununiformity is to be measured and corrected prior to display, the selection circuit 66 selects the test driving signals outputted from the test signal production section 31. However, when an image is to be displayed, the selection circuit 66 selects the corrected driving signals stored in the data table storage section 65.

Processing of the correction value calculator 64 is hereinafter described in detail.

The element driving circuit section 28 includes a D/A (digital to analog) conversion circuit 67 and a driving circuit (DRVC) 68. The D/A conversion circuit 67 converts digital driving signals outputted from the correction circuit section 33 into analog signals. The driving circuit 68 applies the analog signals to ribbon electrodes of predetermined pixel elements of the GLV devices 23R, 23G and 23B. The GLV devices 23R, 23G and 23B operate in response to the driving signals to modulate the laser lights emitted from the red laser 21R, green laser 21G and blue laser 21B, respectively.

The system control section 29 controls operation timings of the components of the signal processing section 9 described above.

Now, a method executed at step S12 of FIG. 14 for detecting the ununiformity in luminance and color displayed is described.

Figure 16:
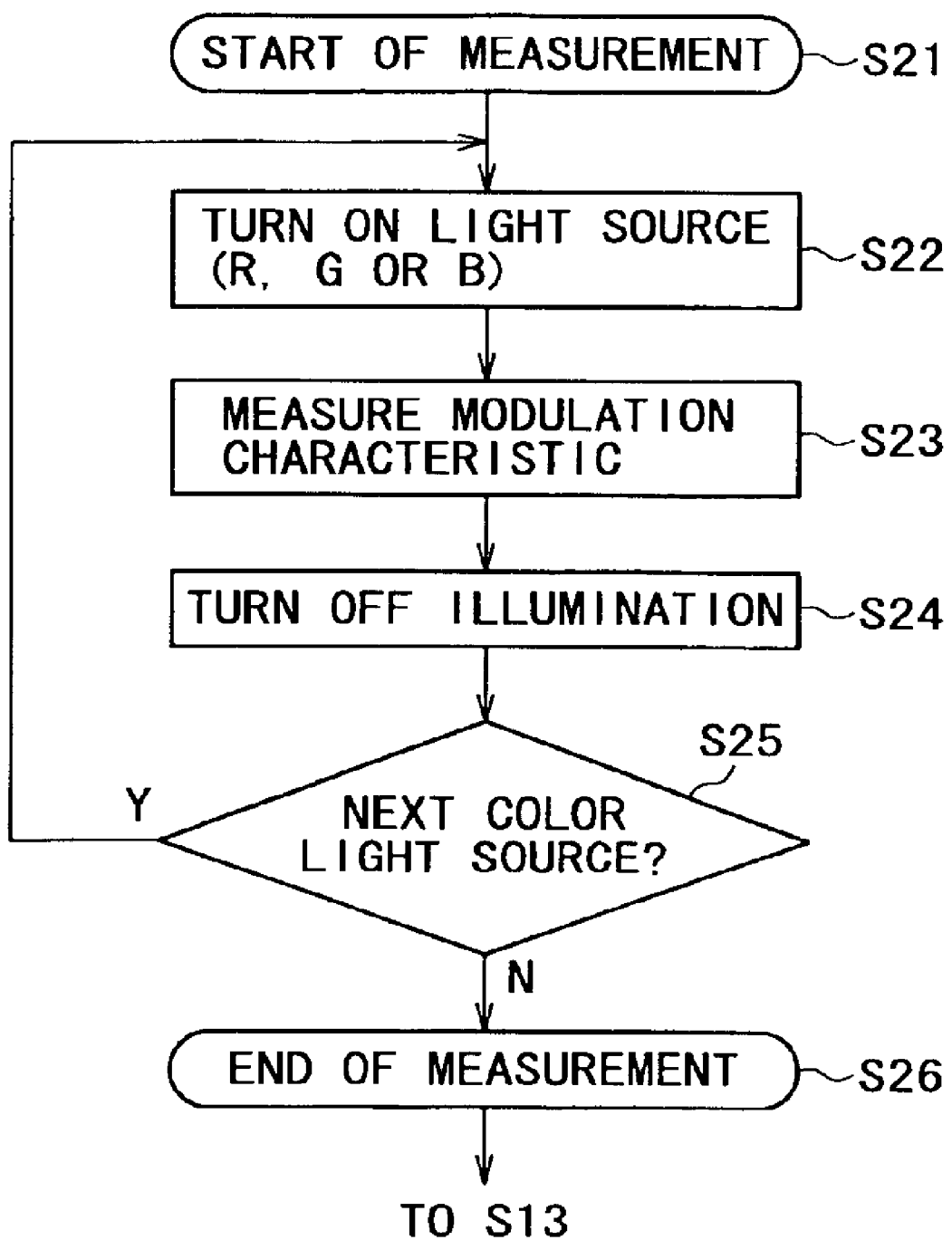
FIG. 16 is a flow chart illustrating a process of detecting the ununiformity in display by the image display apparatus according to the second embodiment.

FIG. 16 is a flow chart illustrating the process of measuring the ununiformity in luminance and color displayed.

Step S21:

Before an image is displayed, the reflecting mirror 16 and the optical sensor 17 are placed in position to measure the ununiformity in luminance and color in advance.

Step S22:

One of the laser light sources, for example, the red light source 21R, is turned on to emit a laser beam. The laser beam thus emitted is shaped into a linear shape by the illumination optical system 22R and illuminates the entire GLV device 23R.

Step S23:

The modulation characteristic, that is, the relationship between the driving voltage and the luminance of modulated light, of all of the pixel elements of the red GLV device 23R is successively measured.

In order to measure the modulation characteristic of a certain pixel element, test signals produced by the test signal production section 31 are inputted as driving voltage signals to the driving circuits for the pixel element of the object of measurement through the selection circuit 66 so as to be applied to the ribbon electrodes of the pixel element of the object of measurement.

FIG. 17A illustrates a waveform of a test signal produced by the test signal production section 31.

The test signal produced by the test signal production section 31 is a triangular signal whose signal level (relative value) gradually varies or increases like 0, 1, . . . , 254, 255 as time passes as seen in FIG. 17A.

Figure 17:
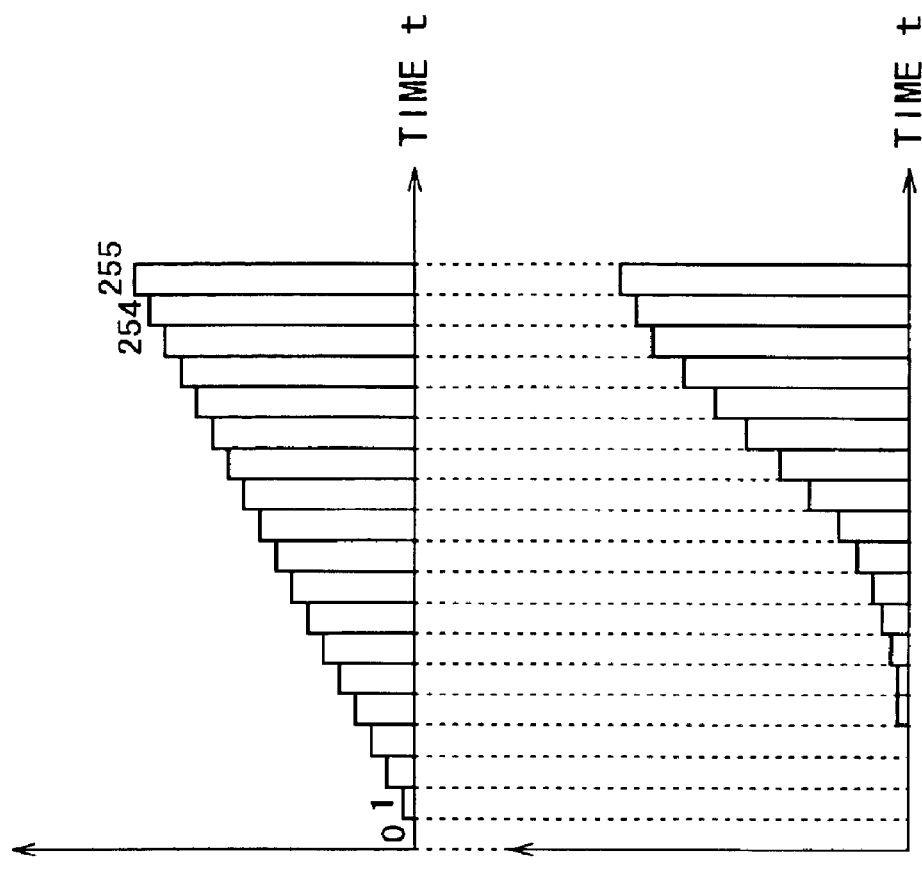
FIGS. 17A and 17B are diagrams illustrating a test signal to be applied to an optical modulation device in order to detect the ununiformity in display and an output signal of a photo-detector of the image display apparatus according to the second embodiment.

The pixel element of the object of measurement operates in response to the driving signal illustrated in FIG. 17 whose level (relative value) varies like 0, 1, . . . , 254, 255 to modulate the red laser light inputted thereto and emits the modulated light in the form of diffracted light having an intensity responsive to the level.

The test signal illustrated in FIG. 17A serves as a first test signal. The range of variation of the signal level from the minimum value of 0 to the maximum value of 255 is referred to as a first variation range.

Where the laser light source 21R illuminates the entire red GLV device 23R, it serves as a first illumination means.

The optical sensor 17 measures the intensity of modulated light inputted thereto, converts the measured intensity of the modulated light into an electric signal and outputs the electric signal.

The intensity of the modulate light depends upon the offset between ribbon electrodes per one pixel in the GLV device 23R. The offset arises from a dispersion of the unique surface position of each ribbon electrode and a dispersion of the surface position of each ribbon electrode which depends upon the accuracy of the driving voltage.

FIG. 17B illustrates the levels of the output signal which correspond to the intensities of modulated light measured by the optical sensor 17 with respect to the individual levels of the applied test signal, that is, a modulation characteristic.

As seen from FIG. 17B, while the voltage value of the test signal varies linearly, the intensity of the modulated light does not vary linearly. Where the level of the driving voltage is low, the intensity of the modulated light is zero, and after the level of the driving voltage exceeds a certain value, the intensity of the modulated light exhibits a sudden increase.

Figure 18:
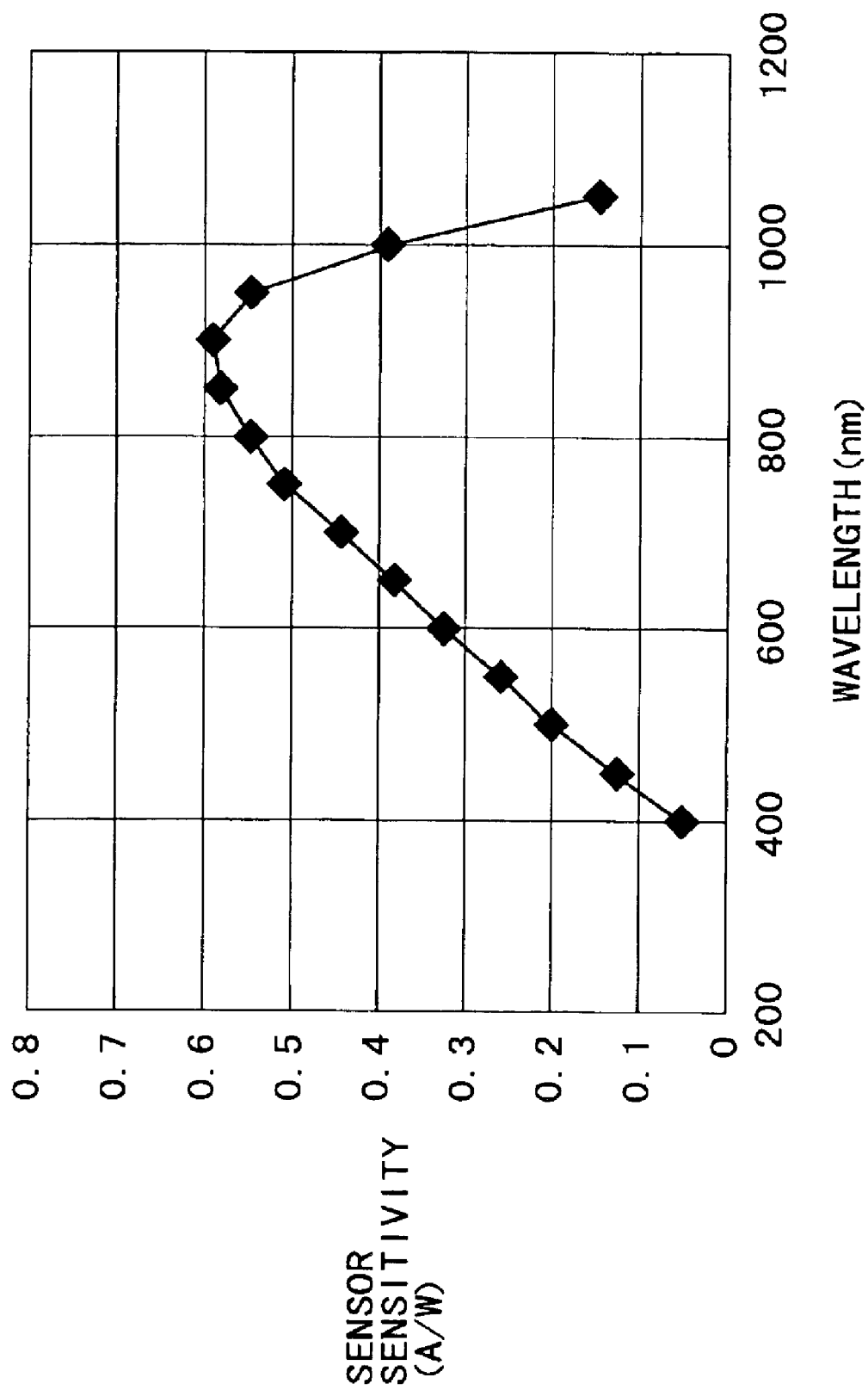
FIG. 18 is a diagram illustrating an example of the sensitivity of the light detector of the image display apparatus according to the second embodiment.

FIG. 18 illustrates a variation of the sensitivity of the optical sensor 17 with respect to the wavelength. As seen in FIG. 18, the optical sensor 17 exhibits a different measurement sensitivity to light of a different wavelength. In other words, the output level of the optical sensor 17 varies with respect to incoming light having an equal intensity but having a different wavelength. Accordingly, when the modulation characteristic of the pixel elements of the GLV devices is measured with respect to laser lights of the three colors of R, G and B, it is necessary to normalize the results of measurement.

In order to correct wavelength sensitivity differences of the sensor, the wavelength sensitivities of the sensor are measured in advance to determine normalization coefficients fr, fg and fb for the wavelengths of the lights to be emitted from the laser light sources 21R, 21G and 21B. Then, the outputs of the optical sensor 17 when the laser light sources 21R, 21G and 21B are lit are multiplied by the coefficients fr, fg and fb, respectively, to adjust the gains of the optical sensor 17 to each other for the individual light sources.

As a result, if a predetermined driving voltage is applied to a certain pixel element and illumination lights of the three colors of R, G, and B having an equal intensity are illuminated upon the pixel element, then the outputs (voltage values) of the optical sensor 17 exhibit an equal value.

The gain adjustment circuit 61 of the detection signal processing section 32 shown in FIG. 15 performs the gain adjustment process described above.

The A/D conversion circuit 62 converts an analog signal outputted from the gain adjustment circuit 61 into digital data and thus stores totaling 256 resulting data into the memory 63 of the correction circuit section 33. The 256 data represent a modulation characteristic of the pixel element of the object of measurement.

The levels of the output signal of the optical sensor 17 illustrated in FIG. 17B represent a result of measurement of the modulation characteristic of a pixel element. For example, when 1,080 pixels are to be displayed, the red GLV device 23R repetitively performs such a measurement as described above by 1,080 times to measure the modulation characteristic similarly for the 1,080 pixels of the GLV device 23R similarly and stores 1,080×256 data obtained by the measurement into the memory 63.

When a measurement is performed for a predetermined one pixel element, the other pixel elements are masked so that they may not be illuminated by the illumination light.

Step S24:

For example, after the modulation characteristic of all of the pixel elements of the red GLV device 23R is measured, the laser light source 21R is turned off.

Step S25:

Similar processing is successively performed for the laser light sources 21G and 21B to measure the modulation characteristic of all of the pixel elements of the GLV devices 23G and 23B.

Also measurement data of the modulation characteristic of all of the pixel elements of the GLV devices 23G and 23B are successively stored into the memory 63.

The modulation characteristic data of all of the pixel elements of the GLV devices 23R, 23G and 23B are represented collectively by functions Ir(v, x), Ig(v, x) and Ib(v, x). Here, the variable v represents the driving voltage, and the variable x represents the position of each pixel element and is used to identify the pixel element. The characters r, g and b represent three colors of red, green and blue, respectively.

Figure 19:
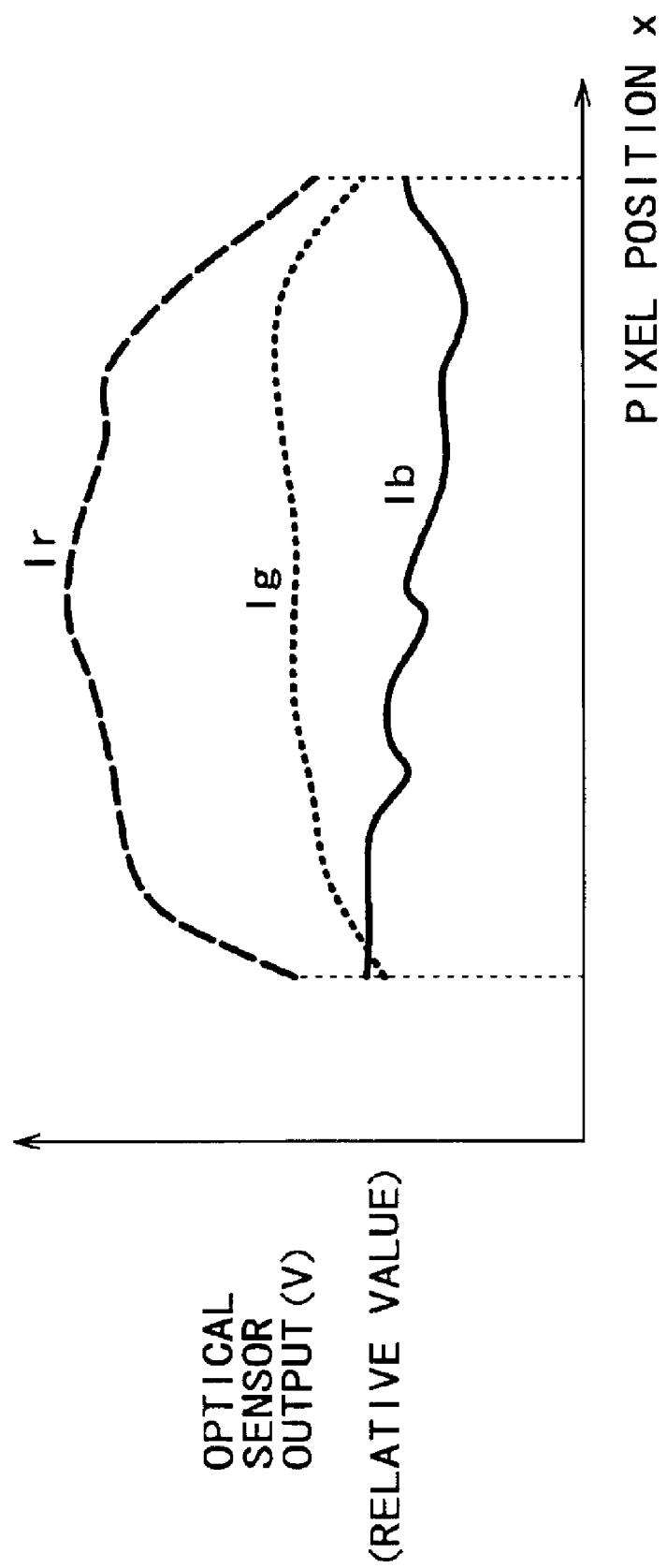
FIG. 19 is a diagram illustrating a position distribution of lights emitted from the optical modulation devices of the image display apparatus according to the second embodiment.

FIG. 19 illustrates an example of the modulation characteristics Ir(v1, x), Ig(v1, x), Ib(v1, x) of the GLV devices 23R, 23G and 23B at a certain level v1 of the test signal and illustrates the variations of the intensity of the modulated lights emitted from the individual pixel elements of the GLV devices.

As seen from FIG. 19, the intensities of the modulated lights vary significantly along the direction of arrangement of the pixel elements of the GLV devices 23R, 23G and 23B.

The intensities of the modulated lights emitted from the GLV devices 23R, 23G and 23B depend upon the dispersion in position of the ribbon electrodes of the pixel elements and the intensity of the laser light sources 21R, 21G and 21B. Particularly, the intensity of the illuminated light from each of the laser light sources varies among all of the pixels of each GLV device and is not uniform. Further, the intensity distributions of the illumination lights vary as time passes and with respect to the temperature.

The modulation characteristic data of all of the pixel elements of the GLV devices 23R, 23G and 23B stored in the memory 63 are analyzed by the correction value calculator 64 included in the correction circuit section 33 to eliminate the ununiformity in luminance and color displayed.

Figure 20:
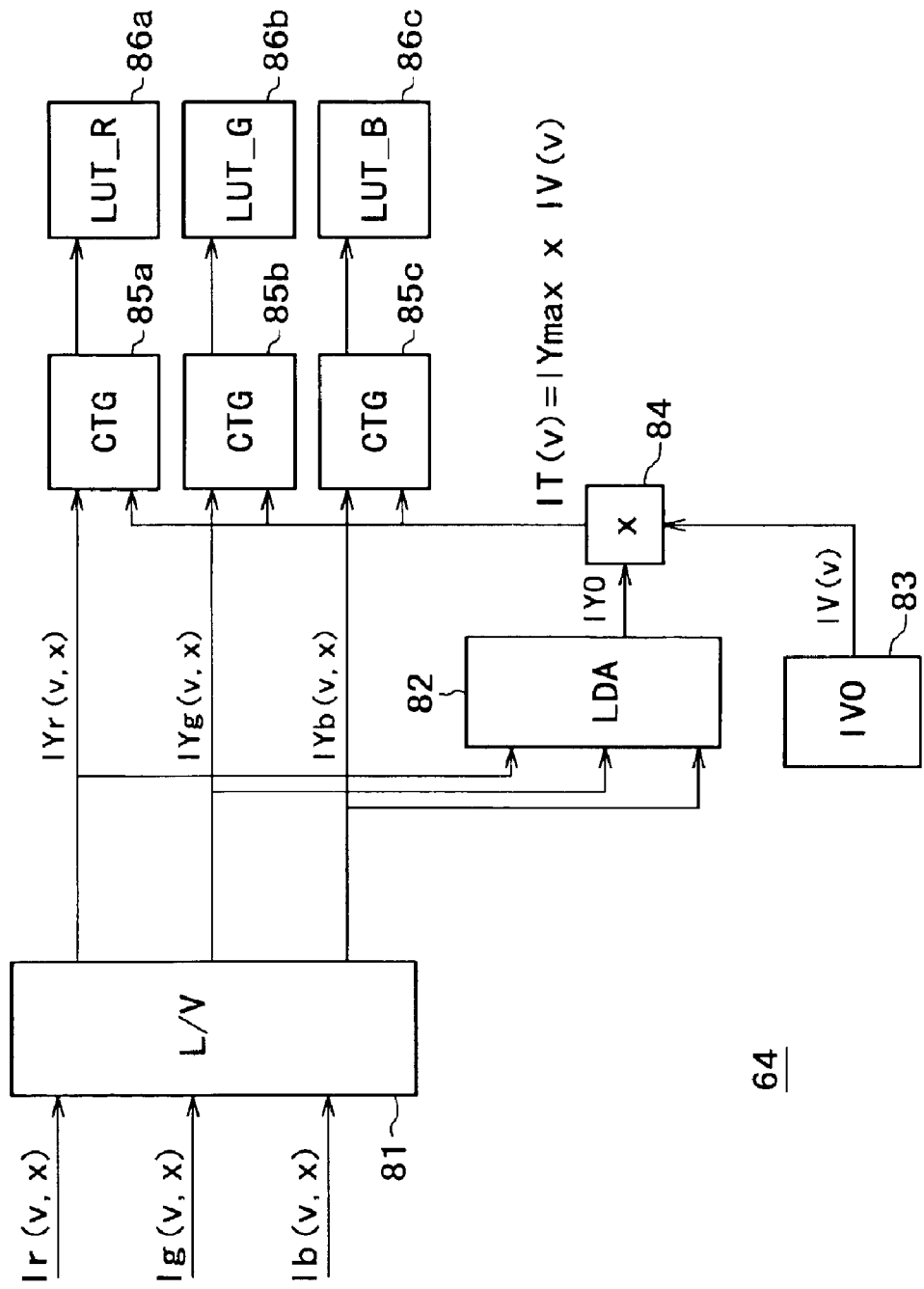
FIG. 20 is a block diagram showing a configuration of a correction arithmetic operation section of the image display apparatus according to the second embodiment.

FIG. 20 shows a configuration of the correction value calculator 64.

The correction value calculator 64 includes a voltage/luminance conversion section (L/V) 81, a luminance distribution analysis section (LDA) 82, an ideal modulation characteristic function production section (IVO) 83, a multiplier 84, correction table production sections (CTG) 85a, 85b and 85c, and data table storage sections (LUT_R, LUT_G, LUT_B) 86a, 86b and 86c. The voltage/luminance conversion section 81 converts the values of the modulation characteristics Ir(v, x), Ig(v, x), Ib(v, x) of the GLV devices 23R, 23G and 23B from voltage values into luminance values IYr(v, x), IYg(v, x), IYb(v, x). The luminance distribution analysis section 82 analyzes the luminance functions IYr(v, x), IYg(v, x), IYb(v, x). The ideal modulation characteristic function production section 83 produces a desired modulation characteristic function. The correction table production sections 85a, 85b and 85c perform correction of a driving signal to produce a correction data table. The correction data tables for the driving signals from the correction table production sections 85a, 85b and 85c are written into the data table storage sections 86a, 86b and 86c, respectively.

Figure 21:
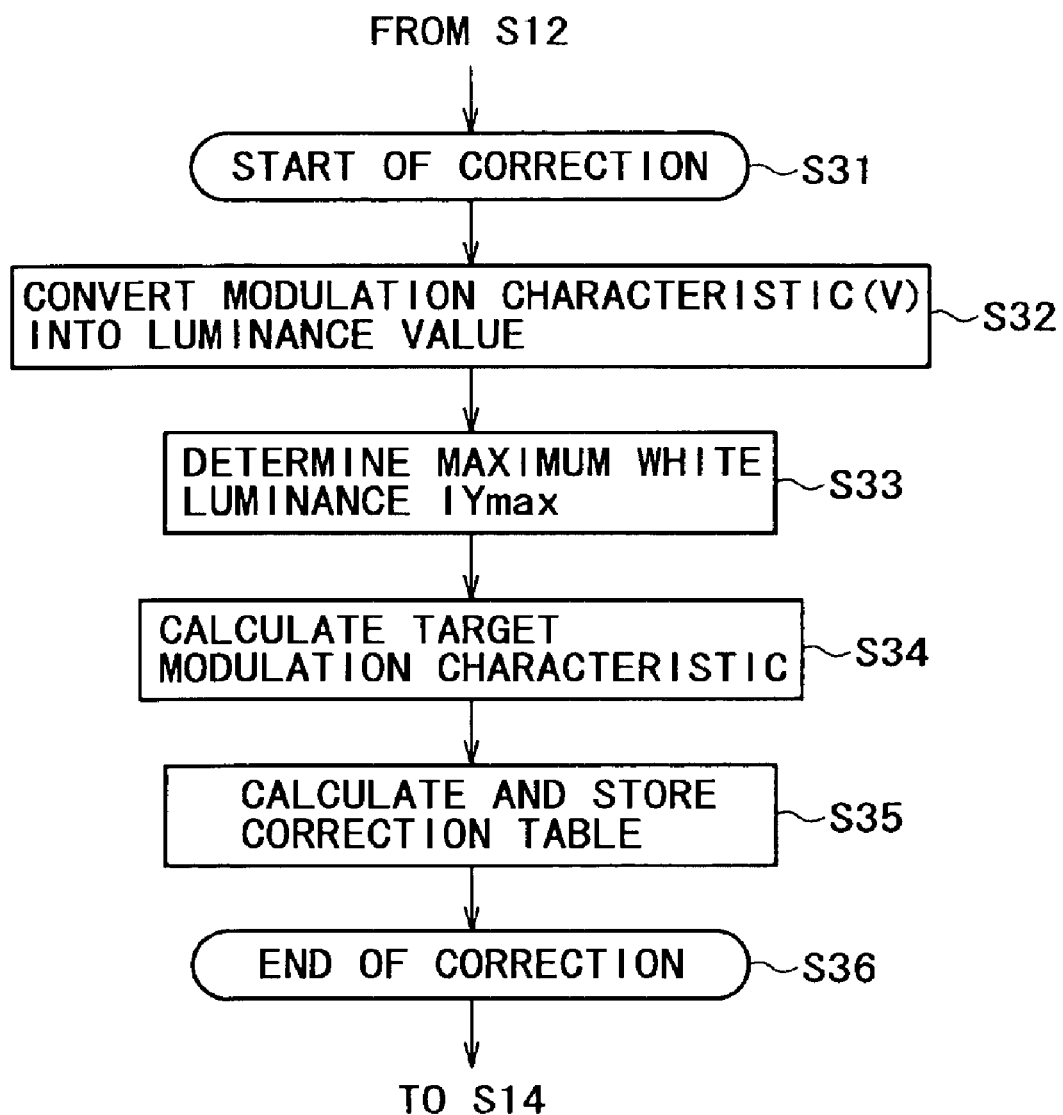
FIG. 21 is a flow chart illustrating a process of correcting the ununiformity in display by the image display apparatus according to the second embodiment.

Now, operation of the correction value calculator 64 is described with reference to a flow chart of FIG. 21.

Step S31:

The modulation characteristics Ir(v, x), Ig(v, x), Ib(v, x) of the GLV devices 23R, 23G and 23B are measured with respect to the R, G and B laser light sources and stored into the memory 63. Thereafter, the correction circuit section 33 processes and corrects the measurement data.

Step S32:

The measured modulation characteristics Ir(v, x), Ig(v, x), Ib(v, x) of the GLV devices 23R, 23G and 23B are voltage values, and the voltage/luminance conversion section 81 included in the correction value calculator 64 converts the voltage values into luminance values.

More particularly, in order to realize target white light, mixture ratio values Rc, Gc and Bc are determined first.

For example, three stimulus values of the three primary colors of R, G and B are represented by R(Xr, Yr, Zr), G(Xg, Yg, Zg) and B(Xb, Yb, Zb), respectively, and the three stimulus values of white are represented by (Xw, Yw, Zw). As a result, the relationship between the mixture amounts Rc, Gc, Bc of the three primary colors and the three stimulus values for realizing the white is defined by the following expression (1):

$$\begin{matrix} X_w \\ Y_w \\ Z_w \end{matrix} = \begin{matrix} X_r & X_g & X_b \\ Y_r & Y_g & Y_b \\ Z_r & Z_g & Z_b \end{matrix} \begin{matrix} R_c \\ G_c \\ B_c \end{matrix} \qquad (1)$$

The three stimulus values of the R, G, B laser light sources used in the present embodiment and the three stimulus values of the white (color temperature 6,500 K) have such values, for example, as given below:

R(0.4121, 0.1596, 0.0000),
G(0.1891, 0.8850, 0.0369),
B(0.3089, 0.0526, 1.7209), and
W(0.9505, 1.0000, 1.0890).

The mixture amounts of the three primary colors of R, G and B for realizing the white are determined as given by the following expression (2) by substituting the values above into the expression (1) given hereinabove:

$$\begin{bmatrix} 0.9505 \\ 1.0000 \\ 1.0890 \end{bmatrix} = \begin{bmatrix} 0.4121 & 0.1891 & 0.3089 \\ 0.1596 & 0.8850 & 0.0526 \\ 0.0000 & 0.0369 & 1.7209 \end{bmatrix} \begin{bmatrix} R_c \\ G_c \\ B_c \end{bmatrix} \qquad (2)$$

$$\begin{bmatrix} R_c \\ G_c \\ B_c \end{bmatrix} = \begin{bmatrix} 0.4121 & 0.1891 & 0.3089 \\ 0.1596 & 0.8850 & 0.0526 \\ 0.0000 & 0.0369 & 1.7209 \end{bmatrix}^{-1} \begin{bmatrix} 0.9505 \\ 1.0000 \\ 1.0890 \end{bmatrix} = \begin{bmatrix} 1.4648 \\ 0.8292 \\ 0.6510 \end{bmatrix} \qquad (3)$$

The mixture amounts above represent a ratio of laser powers necessary to realize the white of the color temperature of 6,500 K with the luminance Y=1 using the three primary colors having the three stimulus values given above. In particular, Rc:Gc:Bc=1.4648:0.8292:0.6510.

The results Ir(v, x), Ig(v, k), Ib(v, k) of the measurement of the modulated light amounts [W] of the colors by the optical sensor 17 are illustrated in FIG. 19.

The luminances of the white which can be realized where the modulated lights emitted from such GLV devices as described above are represented by Ywr, Ywg, and Ywb and can be detected in accordance with the following expressions (4):

$Ywr=Ir(v, x)/Rc$ $Ywg=Ig(v, x)/Gc$ $Ywb=Ib(v, x)/Bc$ \qquad (4)

As described hereinabove, the optical sensor 17 has such a wavelength sensitivity as seen in FIG. 18. Further, the optical sensor 17 does not exhibit a measurement efficiency of 100% because of a geometrical condition. Therefore, an effect of them must be canceled. More particularly, luminance conversion coefficients Kr, Kg, Kb which reflect a variation in measured amount by the light receiving area or the wavelength sensitivity of the optical sensor 17 are determined in advance, and the luminance functions Ywr, Ywg, Ywb are corrected by multiplying them by the luminance conversion coefficients Kr, Kg, Kb, respectively.

Accordingly, the luminances IY of the white which can be realized after the correction are given by the following expression (5):

$IYr=Kr \times Ywr=Kr \times Ir(v, x)/Rc$ (lumen)

$IYg=Kg \times Ywg=Kg \times Ig(v, x)/Gc$ (lumen)

$IYb=Kb \times Ywb=Kb \times Ib(v, x)/Bc$ (lumen) \qquad (5)

Figure 22:
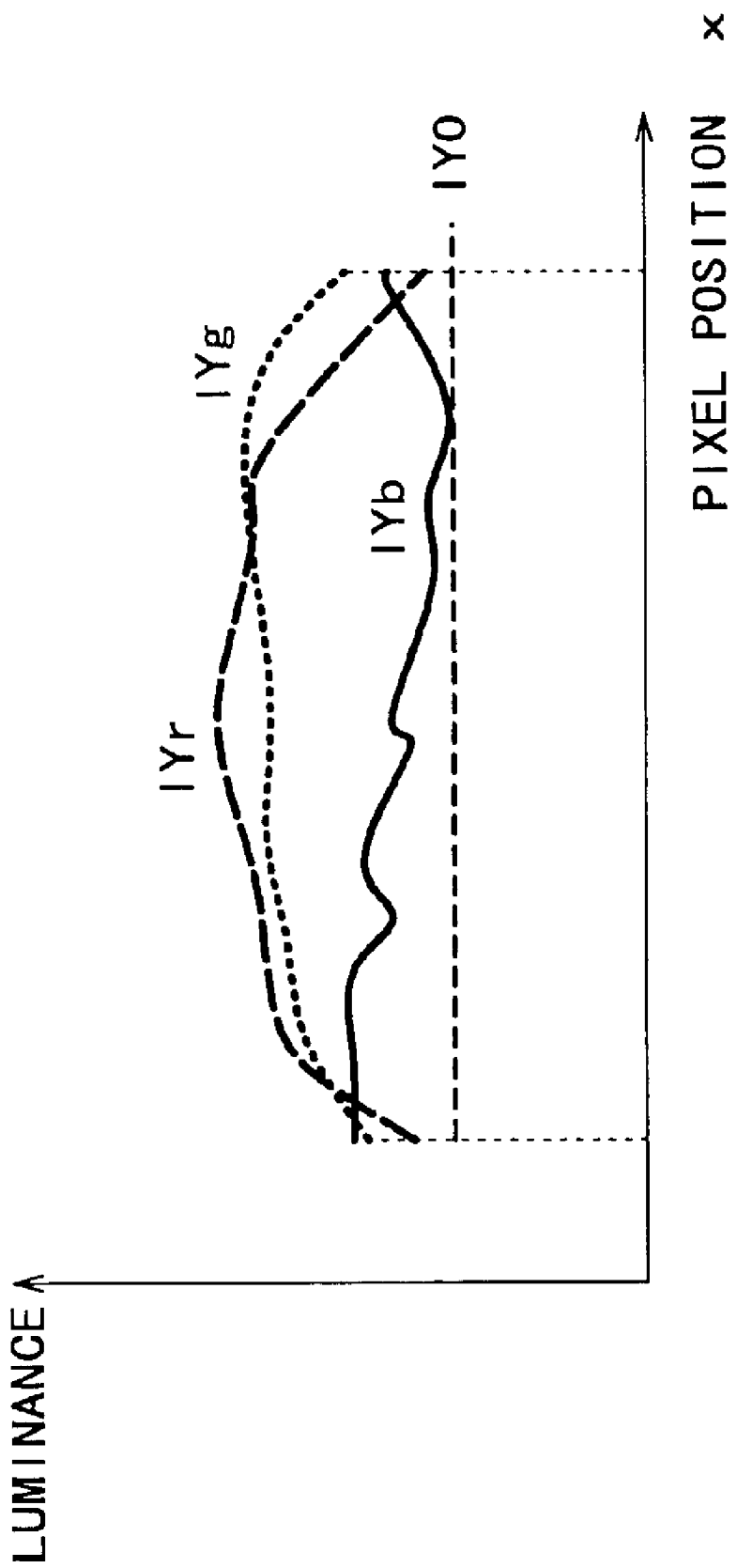
FIG. 22 is a diagram illustrating a profile of a white luminance which can be realized by the image display apparatus according to the second embodiment.

FIG. 22 illustrates luminance characteristics (or luminance profiles, that is, relationships between the luminance and the pixel position) IYr, IYg and IYb obtained by the voltage/luminance conversion section 81 as a result of such processing of the distributions (light amount-pixel position) of the modulation characteristics illustrated in FIG. 19 when the driving voltage v is v=v1.

Step S33:

The luminance distribution analysis section 82 analyzes the luminance characteristics (luminance-pixel position) IYr, IYg, IYb to search for a common minimum value IY0 of the luminance characteristics IYr(v, x), IYg(v, x), IYb(v, x) for the driving voltages v. Then, the correction circuit section 33 performs correction of the value of the searched out minimum value IY0 to determine the maximum luminance IYmax of the white which can be realized.

This is because a pixel element which cannot realize a luminance of the white higher than the minimum value IY0 is included in the GLV devices 23R, 23G and 23B without fail.

In FIG. 22, the common minimum value IY0 to the luminance characteristics IYr(v, x), IYg(v, x), IYb(v, x) is given by the minimum value of the luminance characteristic IYb(v, x). In other words, the luminance characteristic IYb(v, x) becomes a constraint condition to realize the white, and the minimum value IY0 of the luminance characteristic IYb(v, x) becomes a maximum luminance IYmax of the white which can be realized.

Step S34:

As described hereinabove, owing to the image inputting apparatus, the video image signal VIDEO has a unique γ characteristic, that is, where the input signal is represented by x (0<x<1) and the output signal is represented by y (0<y<1), the relationship of y=xγ is satisfied. For example, in the NTSC television system, γ=2.2.

As a result, the pixel elements of the GLV devices 23R, 23G and 23B have an ideal modulation characteristic in accordance with the γ characteristic of the video image signal VIDEO. Where the modulation characteristics of the GLV devices 23R, 23G and 23B in accordance with the γ characteristic of the video image signal VIDEO are represent by a function IV(t), an ideal modulation characteristic IT(v) of all of the pixel elements is the product of the modulation characteristic IV(t) and the maximum luminance IYmax of the white determined as described hereinabove. In other words, IT(v)=IYmax×IV(v). The ideal modulation characteristic IT(v) is hereinafter referred to as target modulation characteristic. The modulation characteristic IV(t) in accordance with the γ characteristic can be designated by a user.

In the correction value calculator 64, the luminance distribution analysis section 82 outputs the maximum luminance IYmax of the white which can be realized, and the ideal modulation characteristic function production section 83 outputs the ideal modulation characteristic function IV(t) designated by the user. The multiplier 84 multiplies the function IYmax and the function IV(t). A result of the multiplication makes a target modulation characteristic IT(v).

Figure 23:
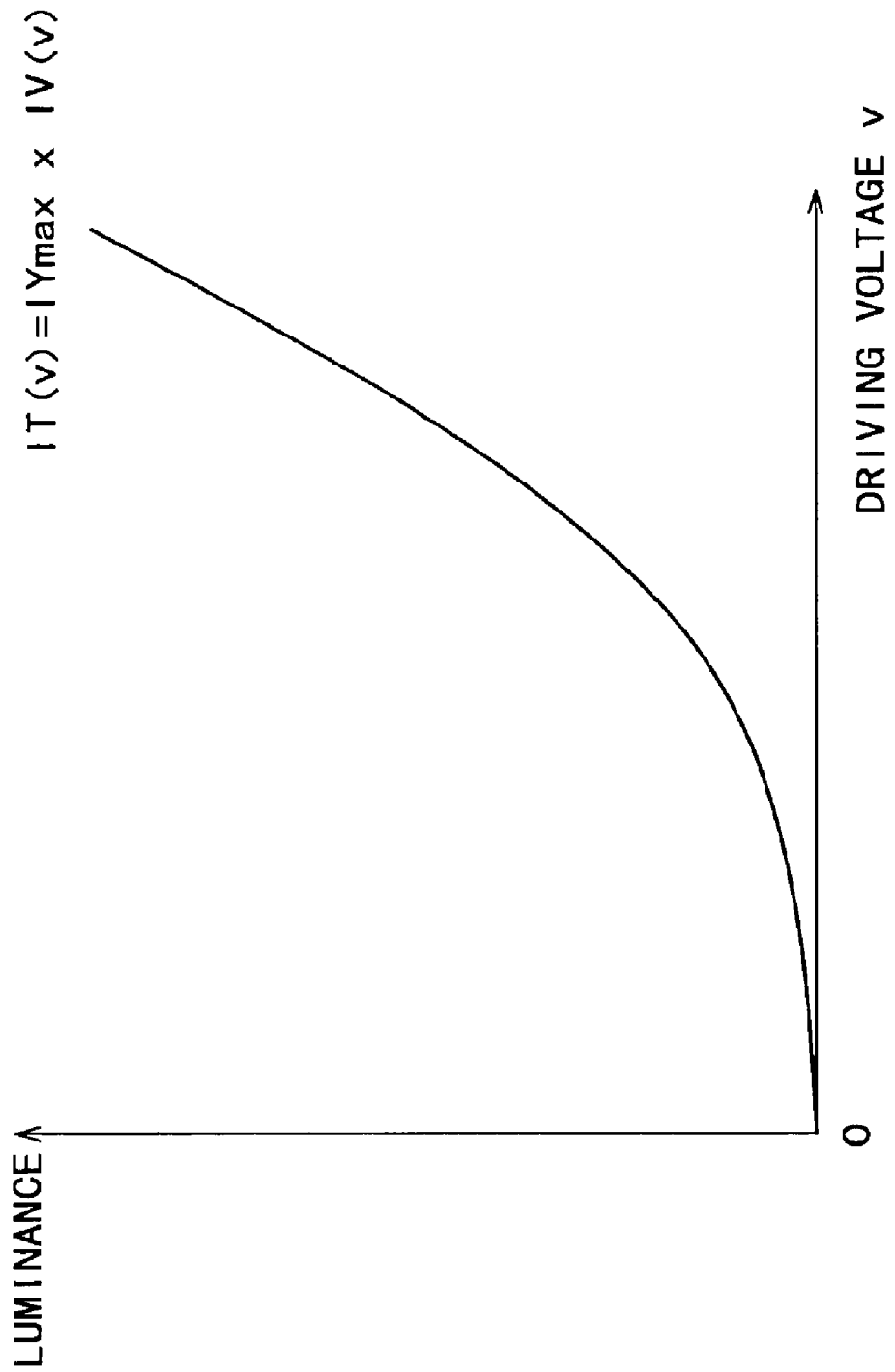
FIG. 23 is a diagram illustrating a target modulation characteristic obtained from the profile of the white luminance illustrated in FIG. 22.

FIG. 23 illustrates an example of the target modulation characteristic IT(v) determined in this manner.

Step S35:

The correction table production sections 85a, 85b and 85c perform correction of the driving signals and generate a correction table of the driving signals for the individual illuminations of R, G and B and for the individual pixels based on the target modulation characteristic IT(v) calculated as described above and illustrated in FIG. 23 and the luminance (modulation) characteristics IYr(v, x), IYg(v, x), IYb(v, x) (FIGS. 17B and 19) of the individual pixels actually measured so that the ununiformity in luminance and color may be eliminated.

FIGS. 24A and 24B illustrate a method of correcting the ununiformity in display in the present embodiment.

FIG. 24A illustrates the target modulation characteristic IT(v) calculated as described above, and FIG. 24B illustrates the luminance (modulation) characteristic IYr(v), IYg(v) or IYb(v) actually measured. In FIGS. 24A and 24B, the axis of abscissa indicates the driving voltage and the axis of ordinate indicates the luminance of a modulated light.

In order to correct the ununiformity in display, the correction table production sections 85a, 85b and 85c determine a corresponding target luminance value Y on a curve of the target modulation characteristic IT(v) shown in FIG. 24A to a predetermined initial driving voltage Vin to be applied to each pixel element when no ununiformity in display exists.

Then, the correction table production sections 85a, 85b and 85c determine, for each pixel, a driving voltage Vout to be applied in order to generate the target luminance value Y on a curve of a measured modulation characteristic, for example, on a curve of the luminance characteristic IYr(v).

Driving voltages Vout_n, Vout_m, Vout_l, . . . for the pixel elements N, M, L, . . . for realizing the target luminance value Y are obtained in this manner.

In particular, the driving voltages to be applied to the pixel elements N, M and L with respect to the predetermined initial driving voltage Vin are corrected to Vout_n, Vout_m and Vout_l as seen in FIG. 25 so that the pixel elements N, M and L may display the same luminance value Y.

The corrected driving voltages for all of the pixel elements of the GLV devices 23R, 23G and 23B obtained in this manner are written into the data table storage sections 86a, 86b and 86c, respectively. The correction process is completed thereby.

When an image signal is inputted later, driving signals are successively corrected for each pixel element and for each driving signal by the data table storage sections 86a, 86b and 86c to correct the ununiformity in luminance and color, and consequently, a video image of a high picture quality is outputted.

Figure 26:
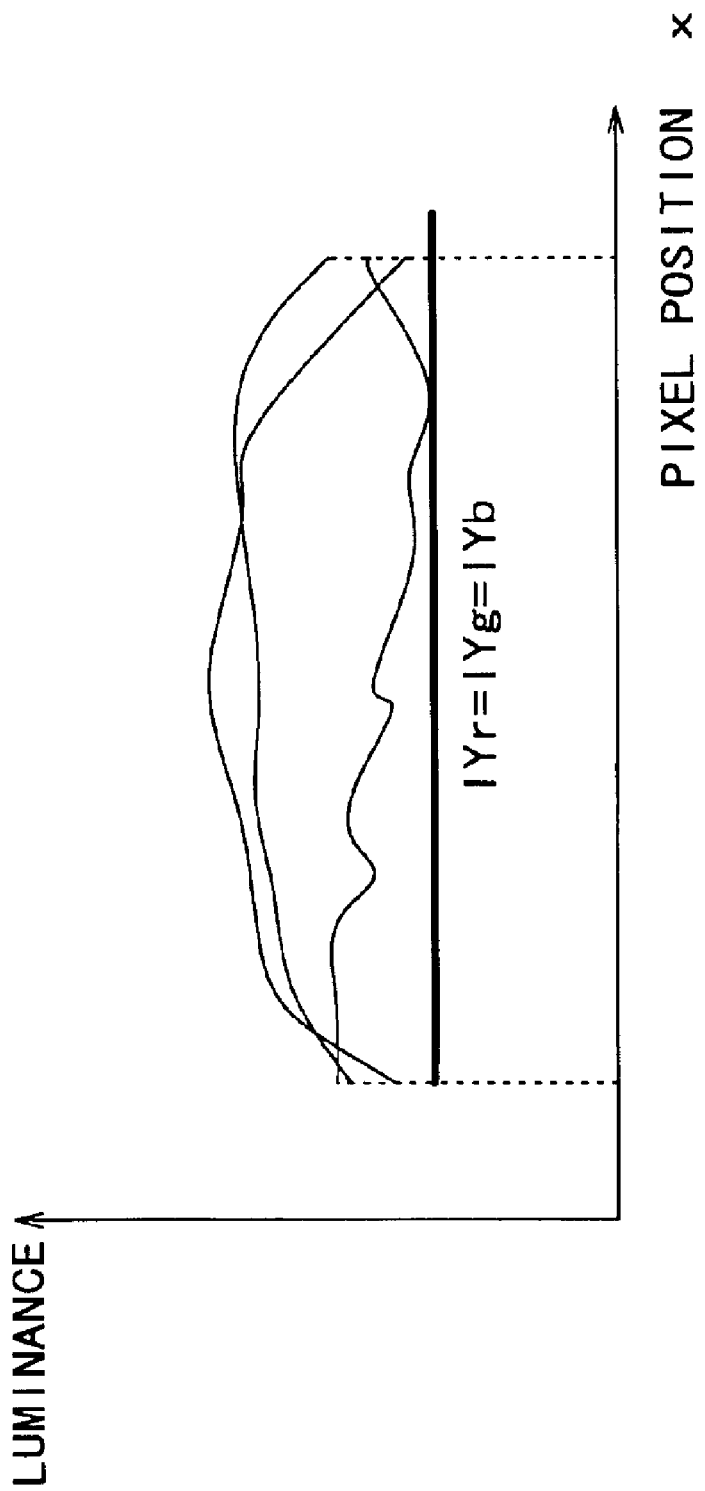
FIG. 26 is a diagram illustrating a profile of a white luminance after the ununiformity in display is corrected by the image display apparatus according to the second embodiment.

FIG. 26 illustrates a luminance profile after the ununiformity in luminance and color is corrected in contrast with FIG. 22.

As seen in FIG. 26, after the corrected driving voltages are applied, the luminance profiles IYr, IYg and IYb of the laser light sources 21R, 21G and 21B become equal to each other, and the white of the color temperature of 6,500 K (IYb lumen) can be realized correctly.

With the present embodiment, since the GLV devices are driven with corrected driving signals whose ununiformity in illumination condition and whose dispersion in pixel element characteristic are corrected for each pixel, a video image of a high picture quality free from the ununiformity in luminance and color on a screen can be provided.

Third Embodiment

An image display apparatus according to a third embodiment of the present invention has a basic configuration similar to that of the second embodiment described hereinabove with reference to FIGS. 12, 13 and 15. However, in the present embodiment, the method of correcting the ununiformity in color and luminance is different from that in the second embodiment. Consequently, the correction value calculator for calculating a correction value for a driving voltage is different from that of the correction value calculator 64 in the second embodiment. The correction value calculator in the present embodiment is denoted by reference character 64b.

In the present embodiment, the dispersion (which does not include the ununiformity in illumination condition) in modulation characteristic of each pixel element in the GLV devices 23R, 23G and 23B is measured in advance, and the ununiformity in illumination condition of each of the laser light sources 21R, 21G and 21B is measured immediately before the projector is rendered operative. A correction data table for a driving voltage is produced based on results of the two measurements.

A unique offset between ribbon electrodes of a GLV device arises, for example, from the instability of a manufacturing step or an error of a driving signal and is independent of a secular change or a temperature variation. Meanwhile, a light source is subject to a secular change or a temperature variation in terms of the ununiformity in illumination condition thereof, and there is the possibility that a result of a measurement performed in advance may not be applied after time passes. Therefore, a method wherein they are measured independently of each other, that is, a method wherein a modulation characteristic of a device which does not include an influence of illumination is measured first and then the ununiformity in illumination is measured immediately before the device is used can cope with a secular change of an operation condition of a light source.

The figures used for the description of the image display apparatus of the first and second embodiments are similarly used for description of the image display apparatus of the present third embodiment although overlapping description is omitted herein to avoid redundancy.

Figure 27:
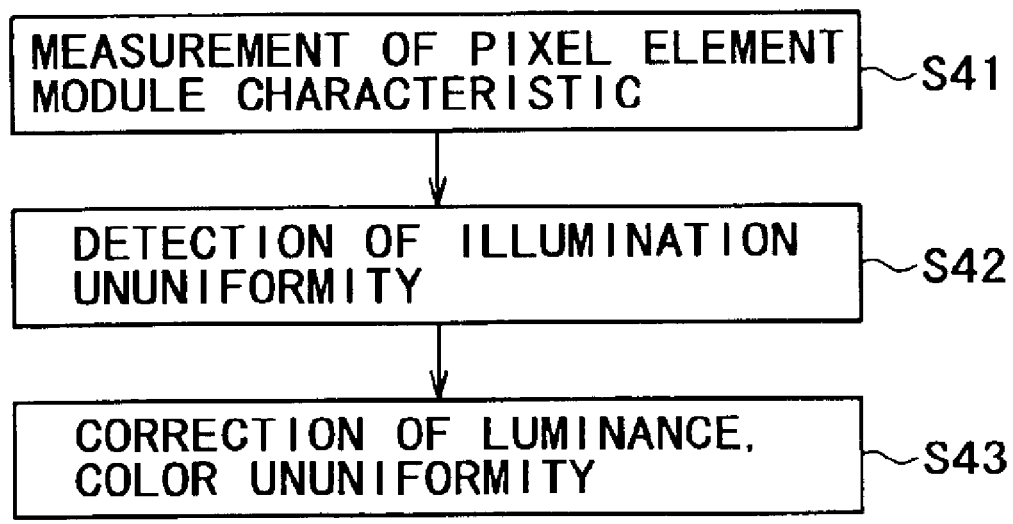
FIG. 27 is a flow chart illustrating a process of detecting and correcting the ununiformity in display by an image display apparatus according to a third embodiment of the present invention.

FIG. 27 is a flow chart illustrating a general flow of processing when the image display apparatus of the present embodiment measures the dispersion in modulation characteristic of the pixel elements and the ununiformity in illumination condition to perform correction of a driving voltage.

Individual steps of the process illustrated in FIG. 27 are described below.

Step S41:

For example, a separate adjustment apparatus is used in advance to illuminate laser light upon the individual pixel elements of the GLV devices 23R, 23G and 23B to measure the modulation characteristic (which does not include the ununiformity in illumination condition) of the individual pixel elements.

Step S42:

Immediately before an image is displayed by the image display apparatus of the present embodiment, the laser light sources 21R, 21G and 21B of the image display apparatus are successively turned on to successively illuminate the GLV devices 23R, 23G and 23B. In particular, the test signal production section 31 successively applies a high level test signal as a driving signal to the individual pixel elements of the GLV devices, and the light detection apparatus 15 measures the amount of modulated light emitted from the pixel element to which the test signal is applied to obtain the ununiformity in illumination condition (an illumination profile).

Step S43:

The correction circuit section 33 processes the measured modulation characteristics of the pixel elements and the illumination profiles to determine optimum driving voltages to be applied to the individual pixel elements for the different colors with respect to a predetermined initial driving voltage. Then the correction circuit section 33 produces a data table of the determined optimized driving voltage data and stores the data table into the memory.

Then, before an image is displayed, the stored driving voltage data table is used to apply the optimized driving voltages to the individual pixel elements of the GLV devices.

A flow of later processing for the image display is similar to that in the first and second embodiments.

Figure 28:
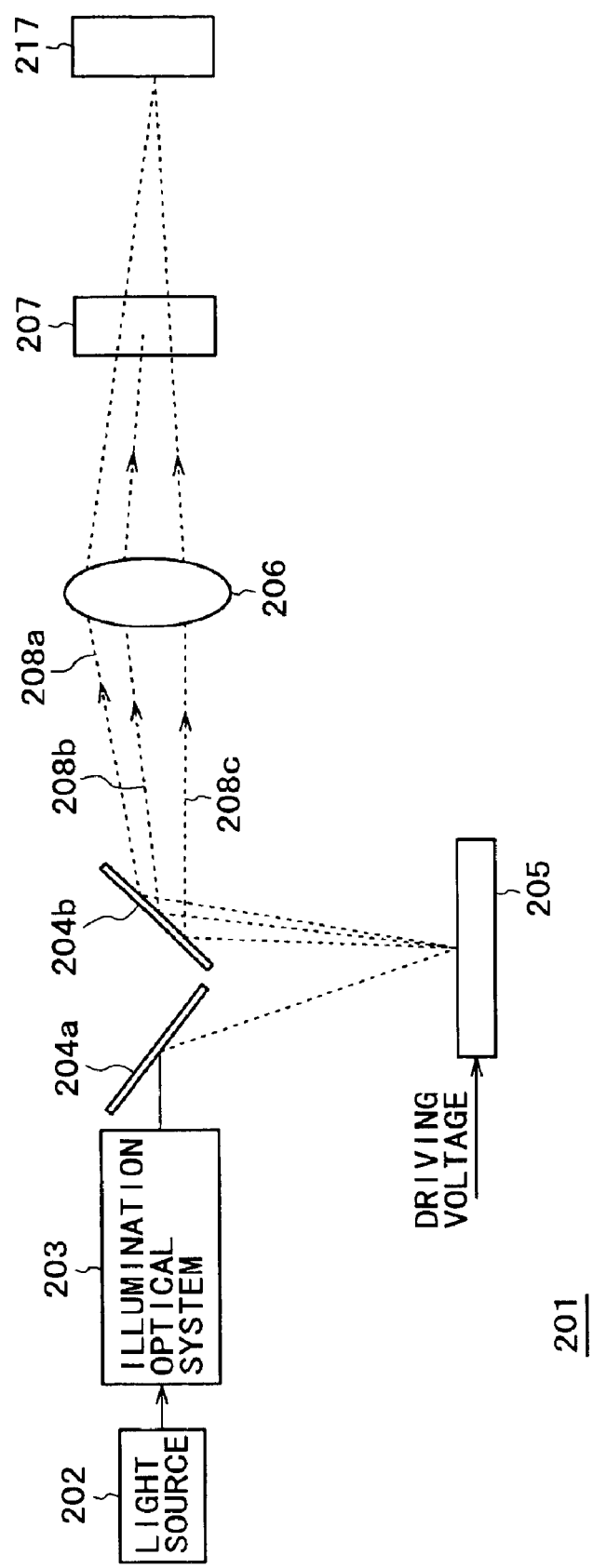
FIG. 28 is a schematic diagrammatic view showing a configuration of a measuring instrument for measuring a modulation characteristic of a modulation device in advance in the image display apparatus according to the third embodiment.

FIG. 28 shows an example of a configuration of a modulation device adjustment apparatus 201 for measuring the modulation characteristic (which does not include the ununiformity in illumination condition) of the individual pixel elements of the GLV devices 23R, 23G and 23B in advance.

The modulation device adjustment apparatus 201 includes a light source 202, an illumination optical system 203, a mirror 204a, another mirror 204b, a projection lens 206, a spatial filter 207, and an optical sensor 217. The light source 202 includes R, G and B laser light sources. The illumination optical system 203 shapes the laser lights from the light source 202. The mirror 204a deflects the laser lights so as to be inputted to a GLV device 205 for each pixel. The mirror 204b deflects modulated lights emitted from the pixel element upon which the laser lights are illuminated. The projection lens 206 projects the modulated lights to form an image. The spatial filter 207 extracts first order diffracted lights included in the modulated lights but removes diffracted lights of the other order numbers.

In the modulation device adjustment apparatus 201, the illumination optical system 203 shapes single-color laser lights emitted from the light source 202 so that they may form dot-like beam spots and illuminates the beam spots on the GLV device 205 for each pixel. A test signal illustrated in FIG. 17A is applied to the pixel element being illuminated to modulate the incoming lights. The modulated lights emitted from the pixel element are measured by the optical sensor 217. In particular, the optical sensor 217 measures the intensity of the modulated lights of the pixel element to determine a modulation characteristic of the pixel element. Here, it is assumed that there is no intensity variation of the illumination lights within the range of the one pixel.

The spatial filter 207 is similar to the spatial filter 5 described hereinabove in connection with the first and second embodiments. Meanwhile, the GLV device 205 includes three GLV devices for red, green and blue which are hereinafter referred to as GLV devices 205R, 205G and 205B, respectively.

Though not shown, the modulation device adjustment apparatus 201 includes a position fixation apparatus for fixing a GLV device to adjust the illumination position pixels, for one by one.

The GLV device has a positioning mark provided thereon so that the optimum positions when the GLV device is incorporated in the modulation device adjustment apparatus 201 and when it is incorporated in the image display apparatus may coincide with each other. When the modulation device adjustment apparatus 201 is used to perform a measurement, the position of the GLV device relative to the illumination is adjusted in accordance with the mark by the position fixation apparatus.

The light source 202 and the illumination optical system 203 serve as a second illumination section.

Now, a method of measuring the modulation characteristic (which does not include the ununiformity in illumination condition) of the pixel elements in advance is described.

Figure 29:
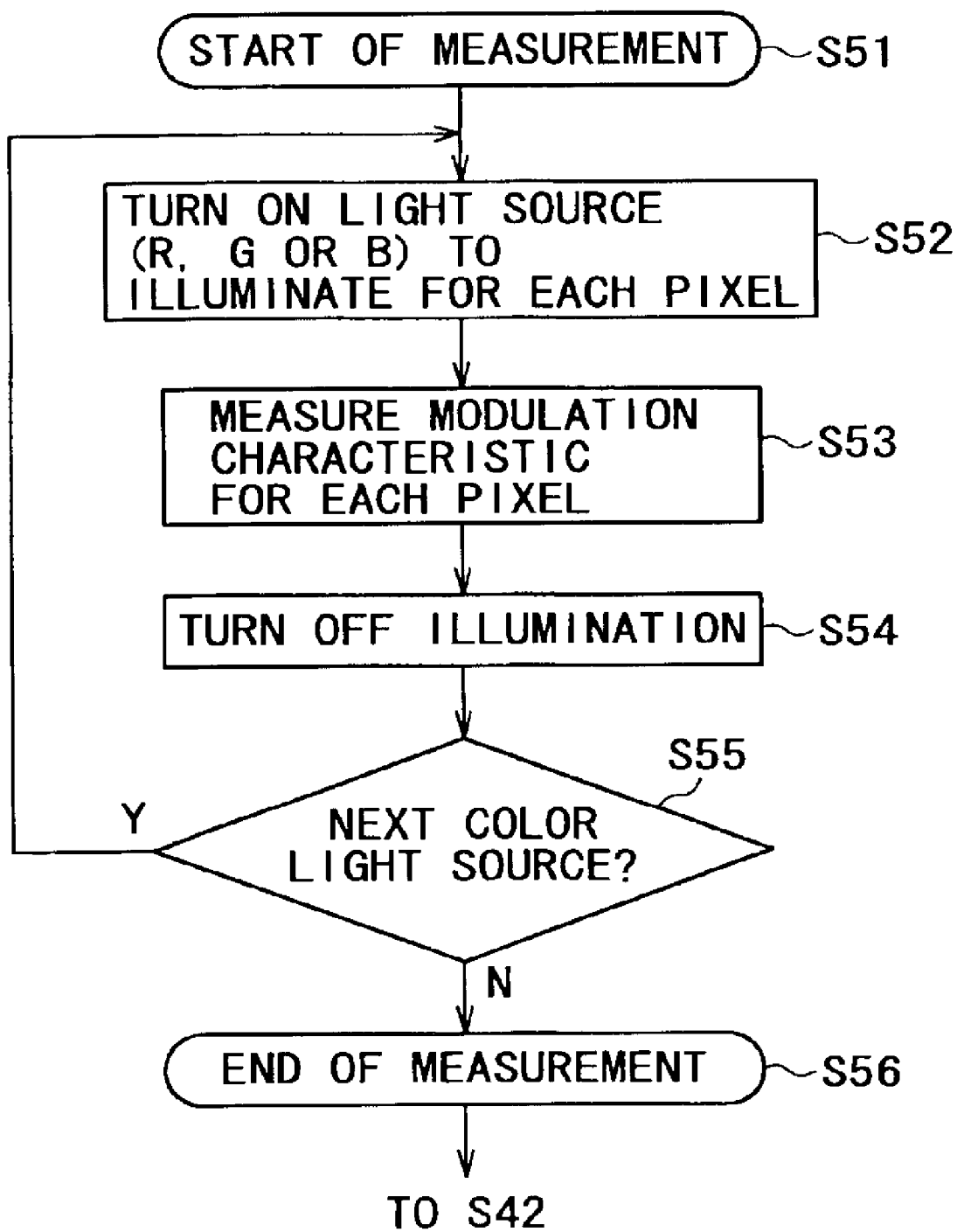
FIG. 29 is a flow chart illustrating a process of detecting a modulation characteristic of the modulation device in advance in the image display apparatus according to the third embodiment.

FIG. 29 is a flow chart illustrating a process of measuring the modulation characteristic (which does not include the ununiformity in illumination condition) of the pixel elements in advance.

Step S51:

For example, before the GLV device is incorporated into the projector, the modulation characteristic thereof including a driving circuit characteristic is measured. After the GLV device 205 is set and adjusted in position as described above, the optical sensor 217 is moved to an image forming position of a pixel of an object of measurement and a measurement is started.

Step S52:

The light source 202, for example, the red laser light source, is turned on to emit laser light. The laser light thus emitted is shaped by the illumination optical system 203 and illuminated upon the GLV device 205R.

As described hereinabove, the representative dimensions of one pixel element (including six ribbon electrodes) of the GLV device 205 are such that the width is approximately 25 µm and the length is approximately 200 to 400 µm. Accordingly, if the size of the beam spot to be illuminated upon one pixel element of the GLV device 205 is set to, for example, 25 µm×500 µm, then the GLV device 205 can be illuminated for each single pixel.

The position fixation apparatus shifts the illumination position of the light beam on the GLV device 205 and adjusts it to each pixel, one by one.

Step S53:

The modulation characteristic of the pixel elements of the GLV device 205, that is, the relationship between the driving voltage and the luminance of the modulated light, is successively measured.

Figure 30A:
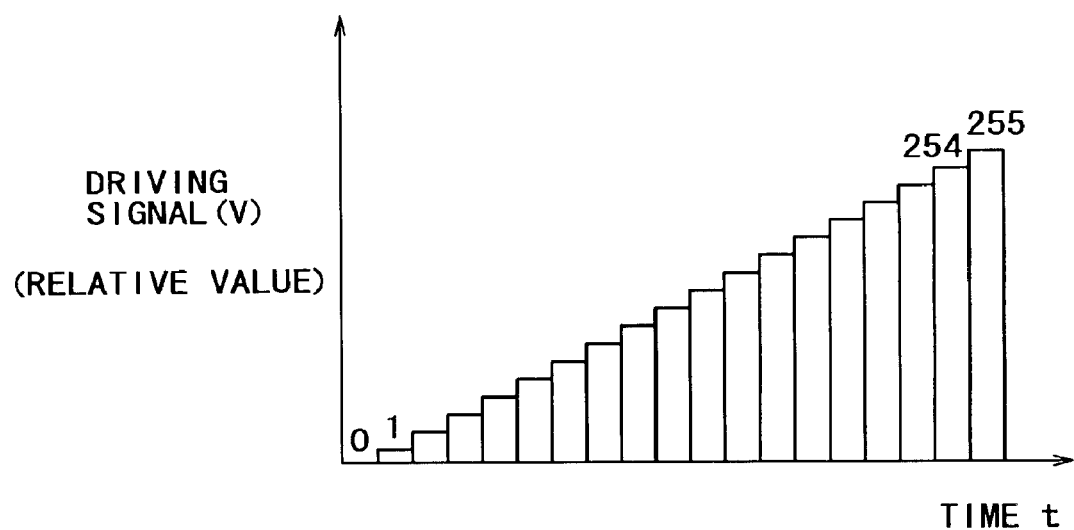
FIGS. 30A and 30B are diagrams illustrating a test signal and a modulation characteristic of a modulation device measured in advance in the image display apparatus according to the third embodiment, respectively.

In order to measure the modulation characteristic of a pixel element, a test signal which successively varies as illustrated in FIG. 30A is inputted as a driving voltage signal to the driving circuit for the pixel element so as to be applied to the ribbon electrodes in a similar manner as in the second embodiment.

The pixel element modulates the laser light inputted thereto and emits diffracted light (modulated light) of an intensity corresponding to the level of the driving voltage applied thereto.

Figure 30B:
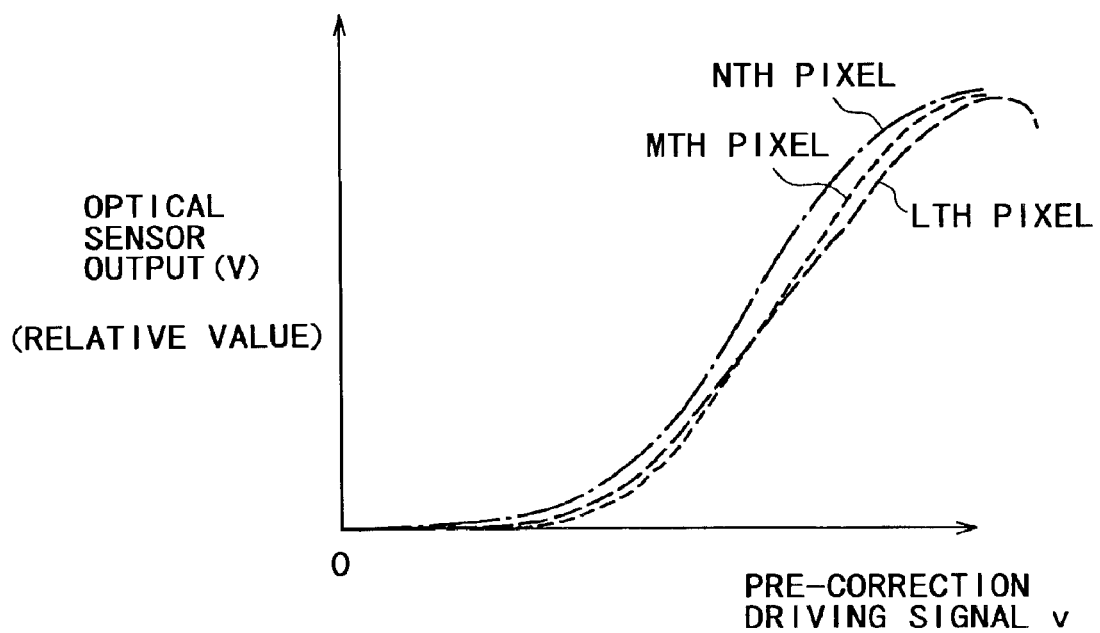

The optical sensor 217 measures the intensity of the modulated light emitted from the pixel element. FIG. 30B illustrates a modulation characteristic measured in this manner.

Then, the gain adjustment circuit 61 in the detection signal processing section 32 described hereinabove in connection with the second embodiment performs a gain adjustment process for the output signal of the optical sensor 217. Then, the A/D conversion circuit 62 converts an analog signal outputted from the gain adjustment circuit 61 into digital data. Thus, a measured modulation characteristic formed from totaling 256 data for one pixel element is stored into a memory 282 (FIG. 34) of the correction value calculator 64b.

In order for the GLV device 205, particularly the GLV device 205R, to display, for example, 1,080 pixels, the measurement procedure described above is repetitively performed by 1,080 times with the position of the detector shifted successively to measure the modulation characteristic of each of the 1,080 pixels of the GLV device 205R. The 1,080×256 data obtained by the measurement are stored into the memory 282.

Step S54:

After the modulation characteristic of all of the pixel elements of, for example, the GLV device 205R is measured, the lit red laser is turned off.

Step S55:

A similar process is performed also for the green laser light source and the blue laser light source to measure the modulation characteristic of all of the pixel elements of the GLV devices 205G and 205B.

Also the measured data of the modulation characteristic of all of the pixel elements of the GLV devices 205G and 205B are stored into the memory 282.

The modulation characteristic data of all of the pixel elements of the GLV devices 205R, 205G and 205B are collectively represented by functions $Isr(v, x)$, $Isg(v, x)$ and $Isb(v, x)$, respectively. Here, the variable v represents the driving voltage, and the variable x represents the position of each pixel element and is used for identification of the pixel element. Reference characters r, g and b represent the primary colors of red, green and blue, respectively.

Figure 31:
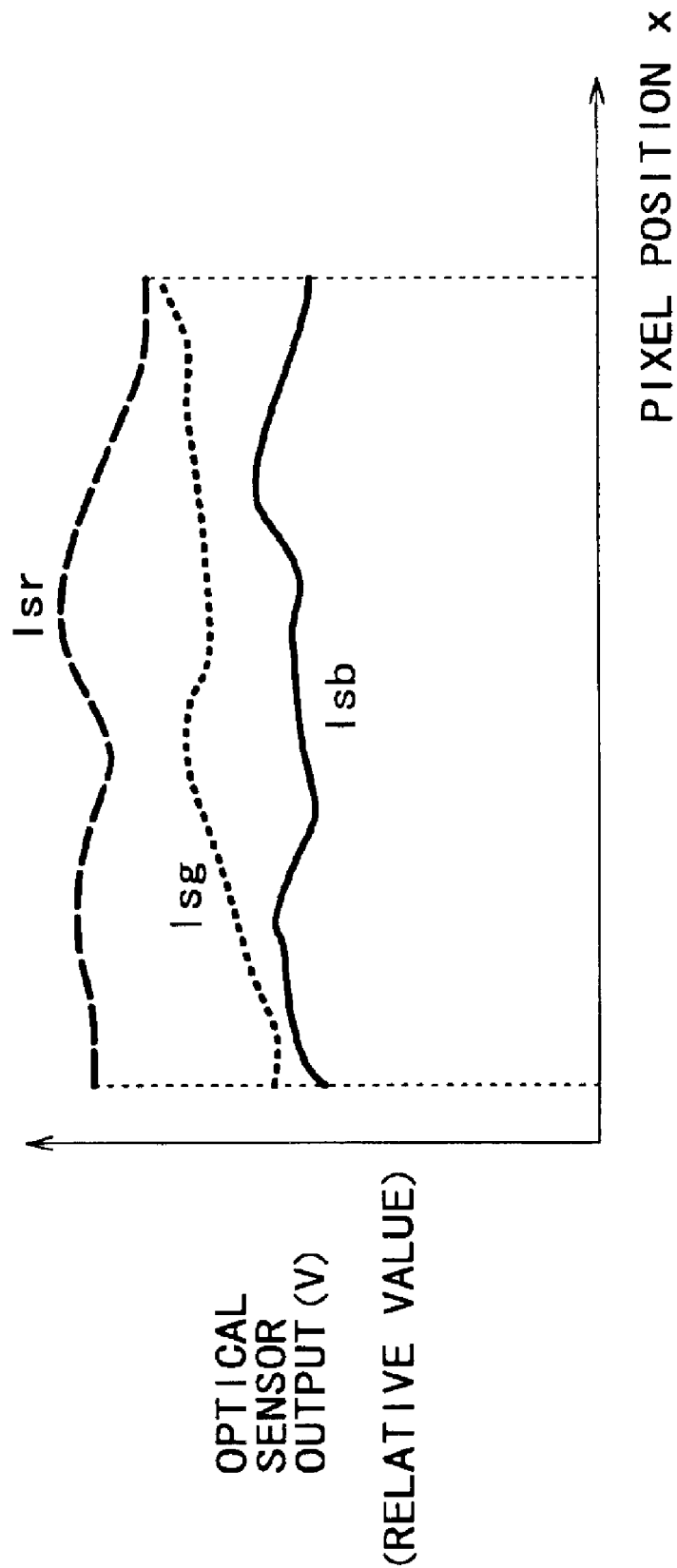
FIG. 31 is a diagram illustrating a position distribution of the modulation characteristics of the modulation devices measured in advance in the image display apparatus according to the third embodiment.

FIG. 31 illustrates an example of the modulation characteristics $Isr(v1, x)$, $Isg(v1, x)$ and $Isb(v1, x)$ of the GLV devices 205R, 205G and 205B at a certain level v1 of the test signal and illustrates variations of the intensity of modulated lights emitted from the pixel elements of the GLV devices.

As seen from FIG. 31, the intensities of the modulated lights of the GLV devices 205R, 205G and 205B exhibit significant variations along the direction of arrangement of the pixel elements due to a dispersion in pixel element modulation characteristic.

The variations of the modulation characteristics $Isr(v1, x)$, $Isg(v1, x)$ and $Isb(v1, x)$ shown herein arise from unique dispersions of the pixel elements and the driving circuits but include no influence of the illumination profile of the light source 202.

Subsequently, a method of detecting an illumination profile solely immediately before an image is displayed is described. In this instance, the GLV device is incorporated into the image display apparatus, and the light detection apparatus 15 is provided in the image display apparatus as shown in FIG. 12 to measure the illumination profiles of the light sources 21R, 21G and 21B arranged in the image display apparatus.

The illumination profiles measured here do not include an influence of the dispersions of the modulation characteristics (including an influence of the driving circuits) unique to the pixel elements.

However, while the modulation characteristic of a pixel element can be measured solely, it is not easy to measure an illumination profile solely. This is because, if the entire GLV device is illuminated, then an influence of the illumination ununiformity exists together with an influence of the dispersions of the modulation characteristics (including an influence of the driving circuits) unique to the pixel elements without fail. Accordingly, as far as the ununiformity in display by a pixel element exists, an illumination file cannot be measured solely.

However, a method of approximately measuring an illumination profile solely is available.

As described hereinabove, the maximum displacement amount of a movable ribbon electrode is $\lambda/4$. Here, $\lambda$ is the wavelength of the incoming light. For example, in the R, G and B light sources used in the present embodiment, $\lambda=650$ nm for red (R): $\lambda=532$ nm for green (G): and $\lambda=460$ nm for blue (B). Therefore, for the illumination lights of red, green and blue, the maximum displacement amount $\lambda/4$ of the movable ribbon element is 162.5 nm, 133 nm and 115 nm, respectively.

Meanwhile, the dispersion of the position of the ribbon electrode surface by unevenness unique to the surface of the ribbon electrode and the driving circuit normally is approximately several nm. Accordingly, where the movable ribbon element is displaced over the maximum distance, it is considered that the influence of the unevenness of the ribbon electrode itself and the unevenness by the driving signal upon the modulation effect of the GLV device is sufficiently low and can be ignored.

Accordingly, if a test signal whose level varies within the range of 240 to 255 as seen in FIG. 32 is applied as a driving signal to a GLV device to operate the GLV device and the modulated light is measured by means of the optical sensor 17, then an illumination profile of each pixel element, that is, relationships $Pr(x)$, $Pg(x)$ and $Pb(x)$ between the luminance and the pixel (position), can be measured.

Actually, where the test signal ranges from 240 to 255, the amount of the modulated light does not increase monotonously. Therefore, a maximum value of the luminance measured within the range of the test signal from 240 to 255 is determined as a value of an illumination profile.

Figures 32A, 32B:
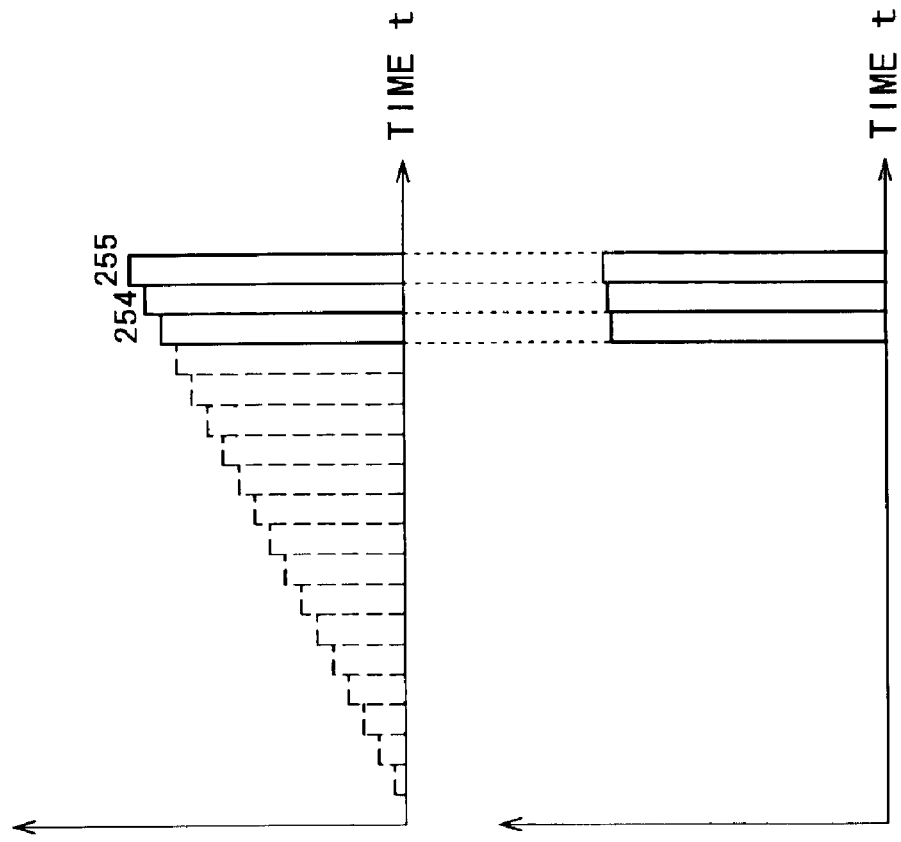
FIGS. 32A and 32B are diagrams illustrating a test signal to be applied to an optical modulation device in order to detect an illumination profile in the image display apparatus according to the third embodiment and an output signal of a light sensor, respectively.

The test signal illustrated in FIG. 32A, whose level varies within the range of 240 to 255 serves as a second test signal which varies within a second range.

Figure 33:
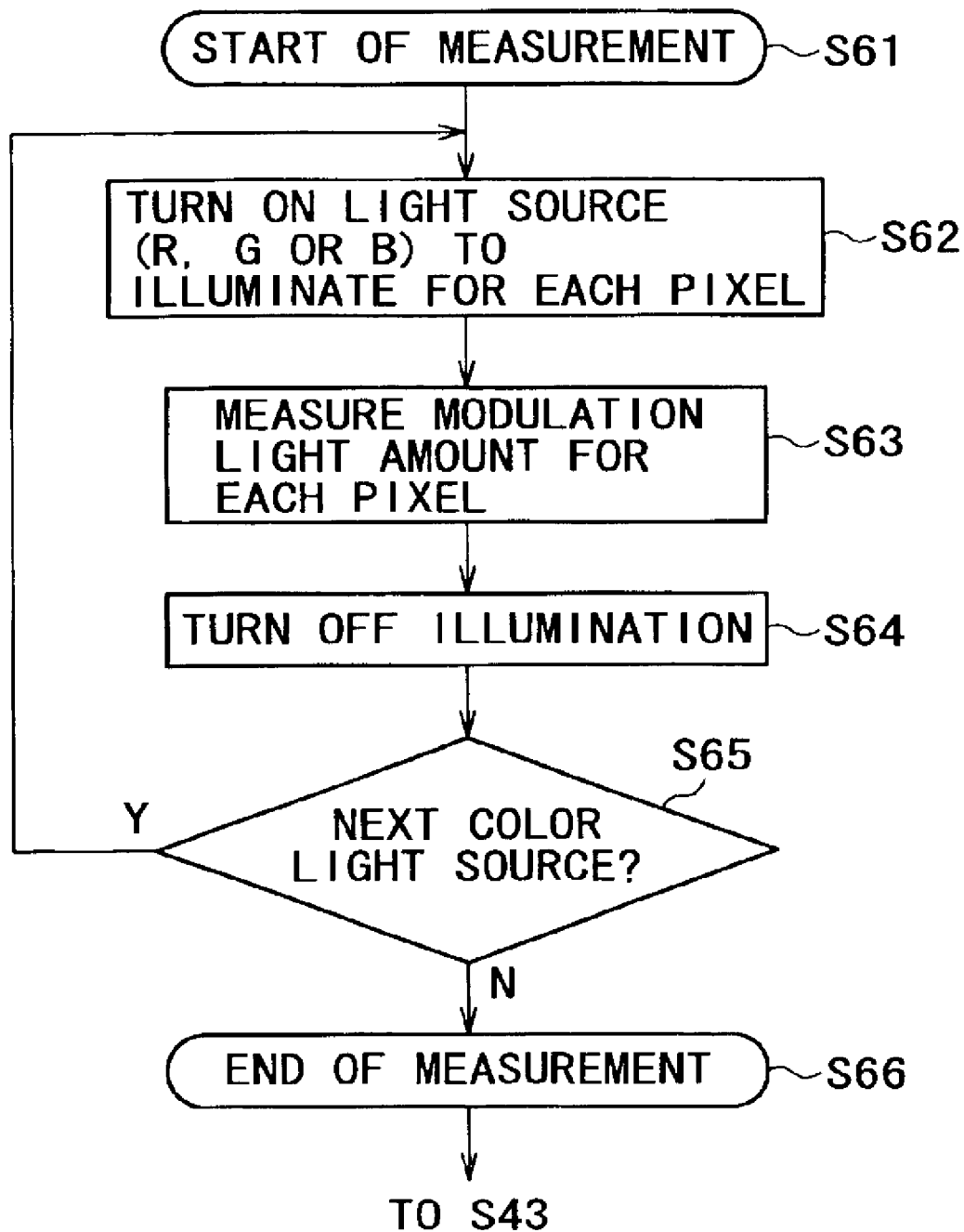
FIG. 33 is a flow chart illustrating a process of detecting only an illumination profile by the image display apparatus according to the third embodiment.

FIG. 33 is a flow chart illustrating a process of detecting an illumination profile solely immediately before an image is displayed.

Step S61:

Immediately before an image is displayed, the reflecting mirror 16 and the optical sensor 17 shown in FIG. 12 are set in position to measure an illumination profile.

Step S62:

A laser light source, for example, the red laser light source 21R, is turned on. The laser light emitted from the red laser 21R then is shaped linearly by the red illumination optical system 22R and illuminates the overall GLV device 23R.

Step S63:

The intensity of the modulated light is measured for the individual pixel elements of the GLV device 23R.

To this end, the test signal production section 31 produces such a test signal as illustrated in FIG. 32 and inputs the test signal as a driving voltage signal to the driving circuit for a pixel element of an object of measurement through the selection circuit 66 so as to be applied to the ribbon electrodes of the pixel element of the object of measurement.

The test signal illustrated in FIG. 32 has the level (relative value) which varies within the range from 240 to 255.

The pixel element of the object of measurement modulates the red laser light inputted thereto, and the GLV device 23R emits the modulated light. The optical sensor 17 measures the intensity of the modulated light corresponding to each of the levels of the test signal.

The gain adjustment circuit 61 in the detection signal processing section 32 shown in FIG. 15 performs a gain adjustment process in order to correct the output signal of the optical sensor 17 against a variation of the wavelength sensitivity of the optical sensor 17. The A/D conversion circuit 62 converts the signal from the gain adjustment circuit 61 into digital data. Consequently, data corresponding to the levels of 240 to 255 of the test signal are stored as illumination profile data of the pixel element into the memory 63 of the correction circuit section 33.

For example, where the GLV device 23R includes 1,080 pixel elements, the measurement procedure described above is repetitively performed by 1,080 times to perform a measurement for the 1,080 pixel elements of the GLV device 23R in a similar manner. Then, resulting illumination profile data are stored into the memory 63.

It is to be noted that the other pixel elements other than the measured pixel element are masked from the light.

Step S64:

After the measurement is completed for all of the pixels of, for example, the GLV device 23R, the laser light source 21R is extinguished.

Step S65:

A similar process is successively performed for the laser light sources 21G and 21B to perform a measurement for all of the pixel elements of the GLV devices 23G and 23B.

Also measured illumination profile data of the pixel elements of the GLV devices 23G and 23B are stored into the memory 63.

The illumination profile data of all of the pixel elements of the GLV devices 23R, 23G and 23B are represented collectively as functions IQr(v, x), IQg(v, x) and IQb(v, x), respectively. Here, the variable v represents the driving voltage, and the variable x represents the position of each pixel element and is used for identification of the pixel element. Reference characters r, g and b represent the primary colors of red, green and blue, respectively.

Step S66:

After the measurement for all of the pixel elements of the GLV devices 23R, 23G and 23B using the laser light sources 21R, 21G and 21B is performed, the measurement of an illumination profile is ended.

The illumination profile data of all of the pixel elements of the GLV devices 23R, 23G and 23B stored in the memory 63 are analyzed by the correction value calculator 64b of the correction circuit section 33.

Figure 34:
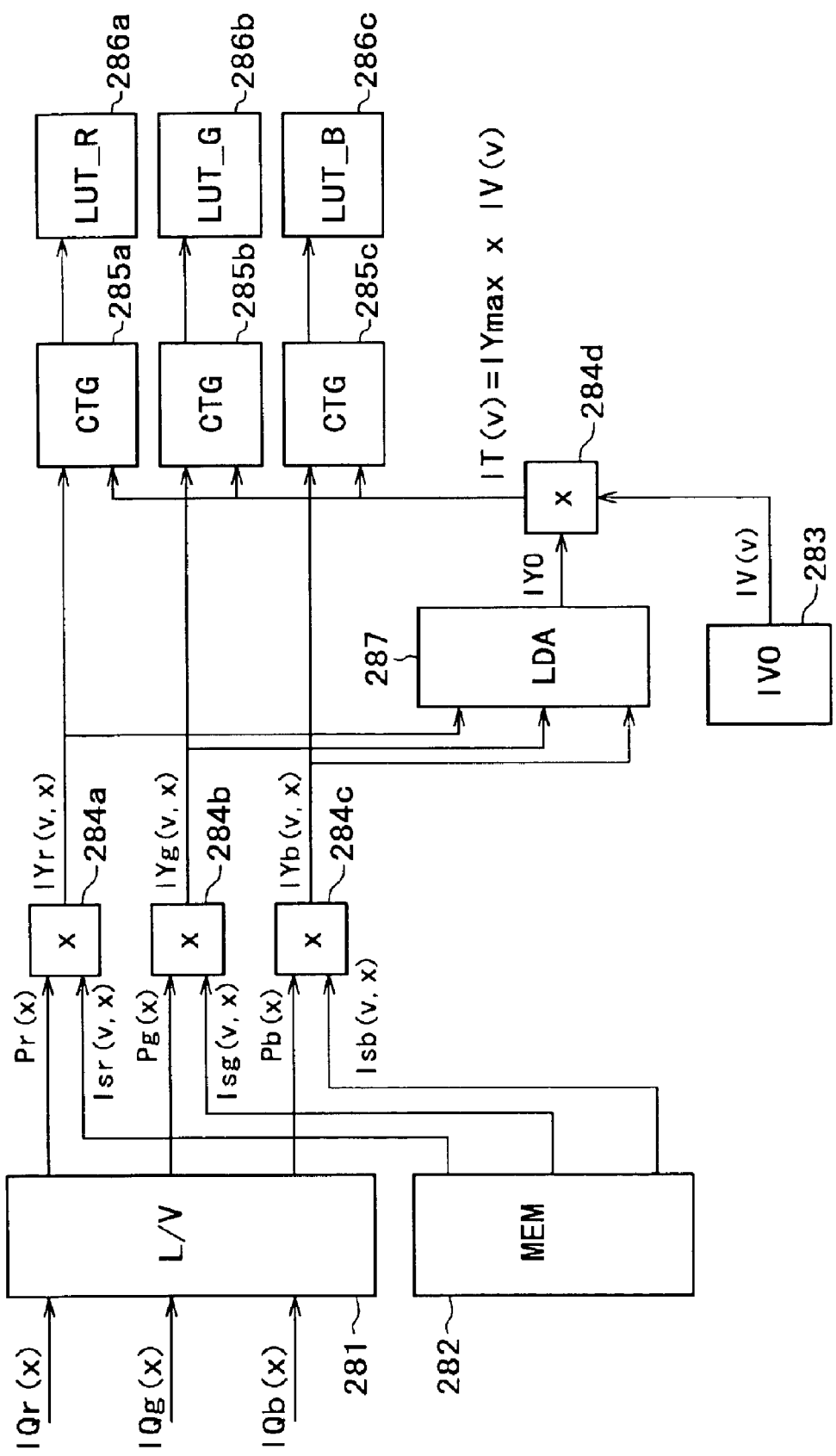
FIG. 34 is a block diagram showing a configuration of a correction arithmetic operation section of the image display apparatus according to the third embodiment.

FIG. 34 shows a configuration of the correction value calculator 64b.

Referring to FIG. 34, the correction value calculator 64b includes a voltage/luminance conversion section (L/V) 281, a memory 282, an ideal modulation characteristic function production section (IVO) 283, multipliers 284a, 284b, 284c and 284d, a luminance distribution analysis section (LDA) 287, correction table production sections (CTG) 285a, 285b and 285c, and data table storage sections (LUT_R, LUT_G, LUT_B) 286a, 286b and 286c. The memory 282 stores modulation characteristic data of the pixel elements. The ideal modulation characteristic function production section 283 produces a desired modulation characteristic function.

Figure 35:
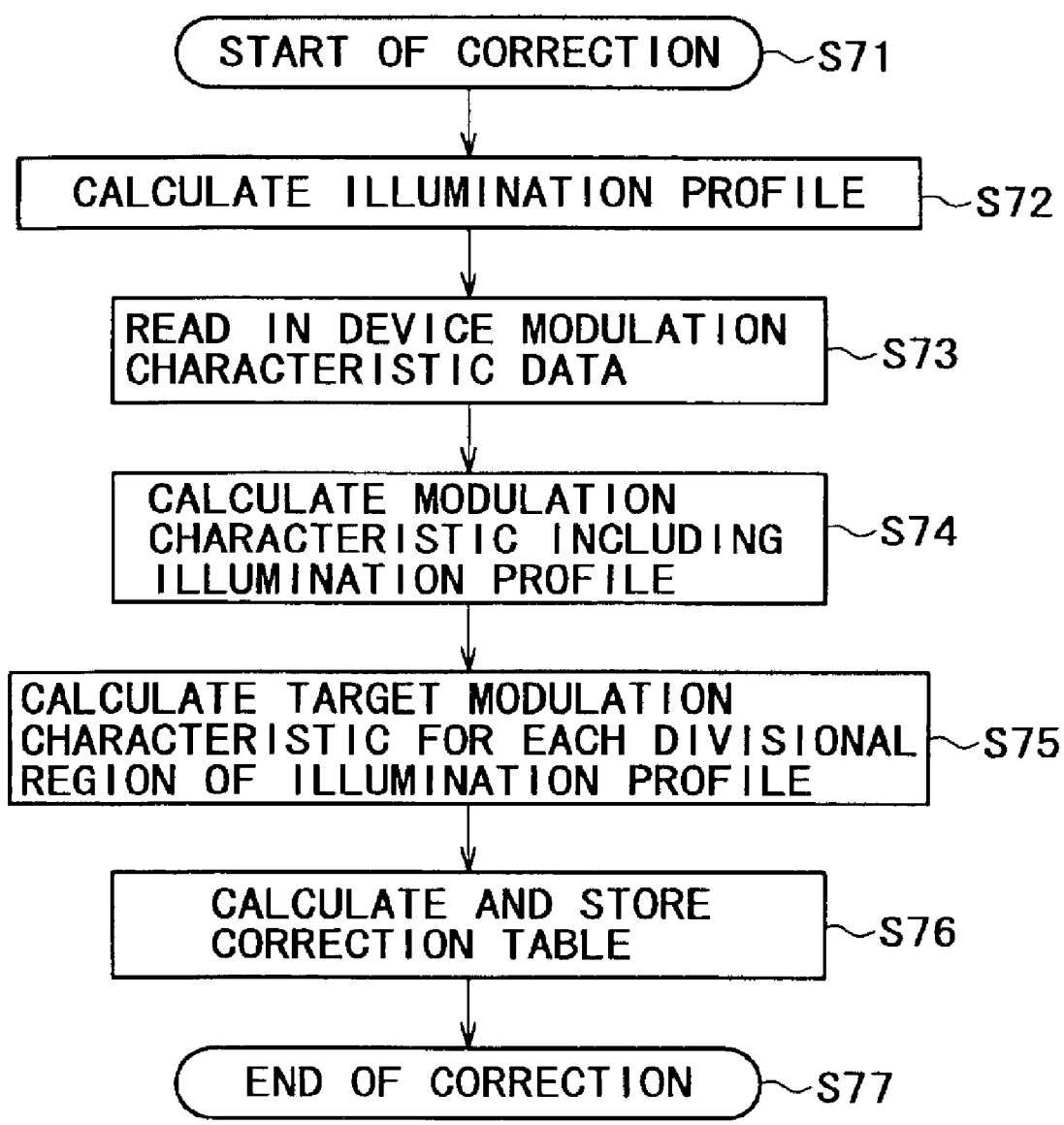
FIG. 35 is a flow chart illustrating a process of correcting a detected ununiformity in display by the image display apparatus according to the third embodiment.

Now, operation of the correction value calculator 64b is described with reference to a flow chart of FIG. 35.

Step S71:

Illumination profile data IQr(v, x), IQg(v, x) and IQb(v, x) of all of the pixels of the GLV devices 23R, 23G and 23B are measured with respect to the R, G and B laser light sources and stored into the memory 63. Then, the correction circuit section 33 processes the measurement data to correct them.

Step S72:

The voltage/luminance conversion section 281 analyzes the illumination profile data IQr(v, x), IQg(v, x) and IQb(v, x) to extract a maximum value of the illumination profile data with regard to each of the pixel elements and set the maximum value as a value of the illumination profile of the pixel element to lead out illumination profiles IPr(x), IPg(x) and IPb(x) of the light sources 21R, 21G and 21B.

Further, the voltage/luminance conversion section 281 converts the voltage values IPr(x), IPg(x) and IPb(x) into luminance values Pr(x), Pg(x) and Pb(x), respectively. A method similar to that used in the second embodiment can be applied for the particular conversion method here.

Figure 36:
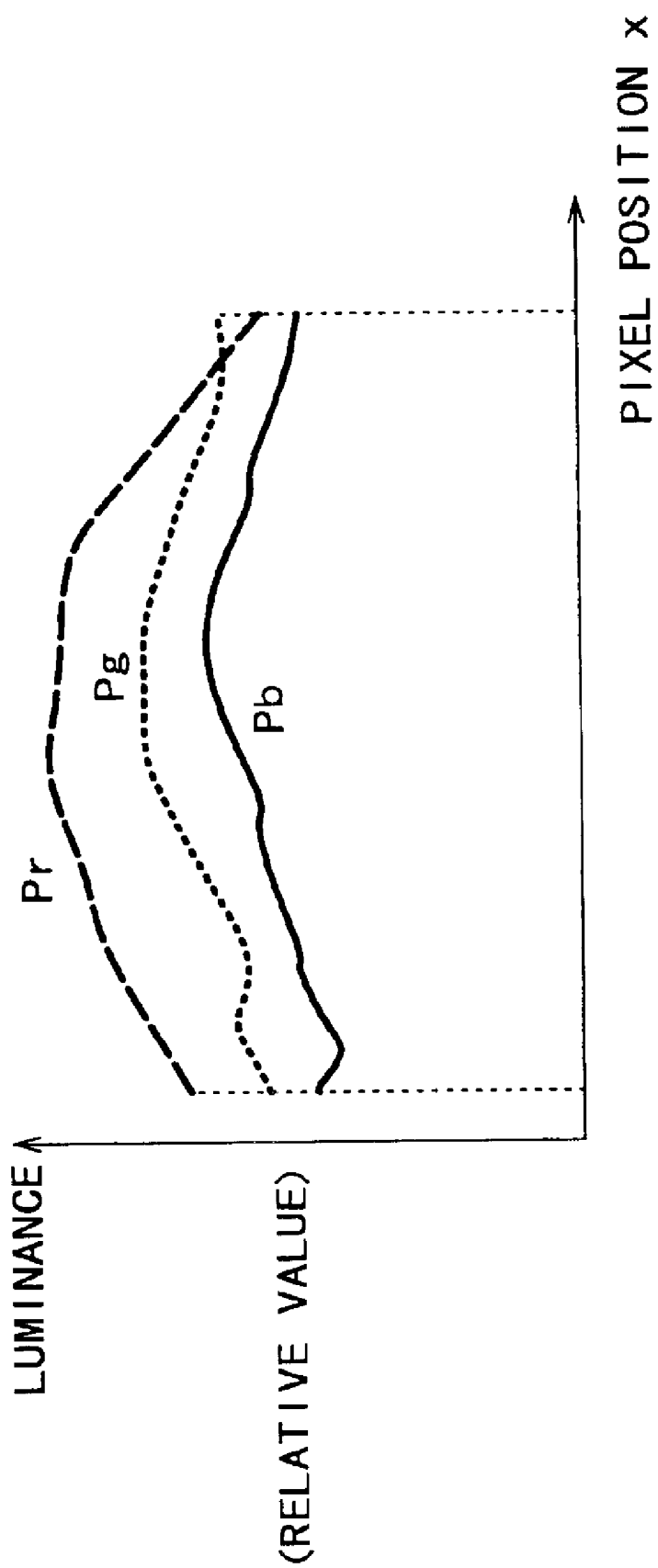
FIG. 36 is a diagram illustrating illumination profiles which do not include any characteristic of the modulation devices measured immediately prior to display by the image display apparatus according to the third embodiment.

FIG. 36 illustrates an example of the measured illumination profiles Pr(x), Pg(x) and Pb(x).

As seen in FIG. 36, each of the illumination profiles of the light sources 21R, 21G and 21B exhibits a great variation.

Step S73:

The modulation characteristic data Isr(v, x), Isg(v, x), Isb(v, x) of all of the pixel elements of the GLV devices 23R, 23G and 23B are read out from the memory 282.

Step S74:

The multipliers 284a, 284b and 284c multiply the illumination profiles Pr(x), Pg(x) and Pb(x) and the modulation characteristic data Isr(v, x), Isg(v, x), Isb(v, x) of the pixel elements to calculate modulation characteristics IYr(v, x), IYg(v, x), IYb(v, x) each including an illumination light distribution.

Figure 37:
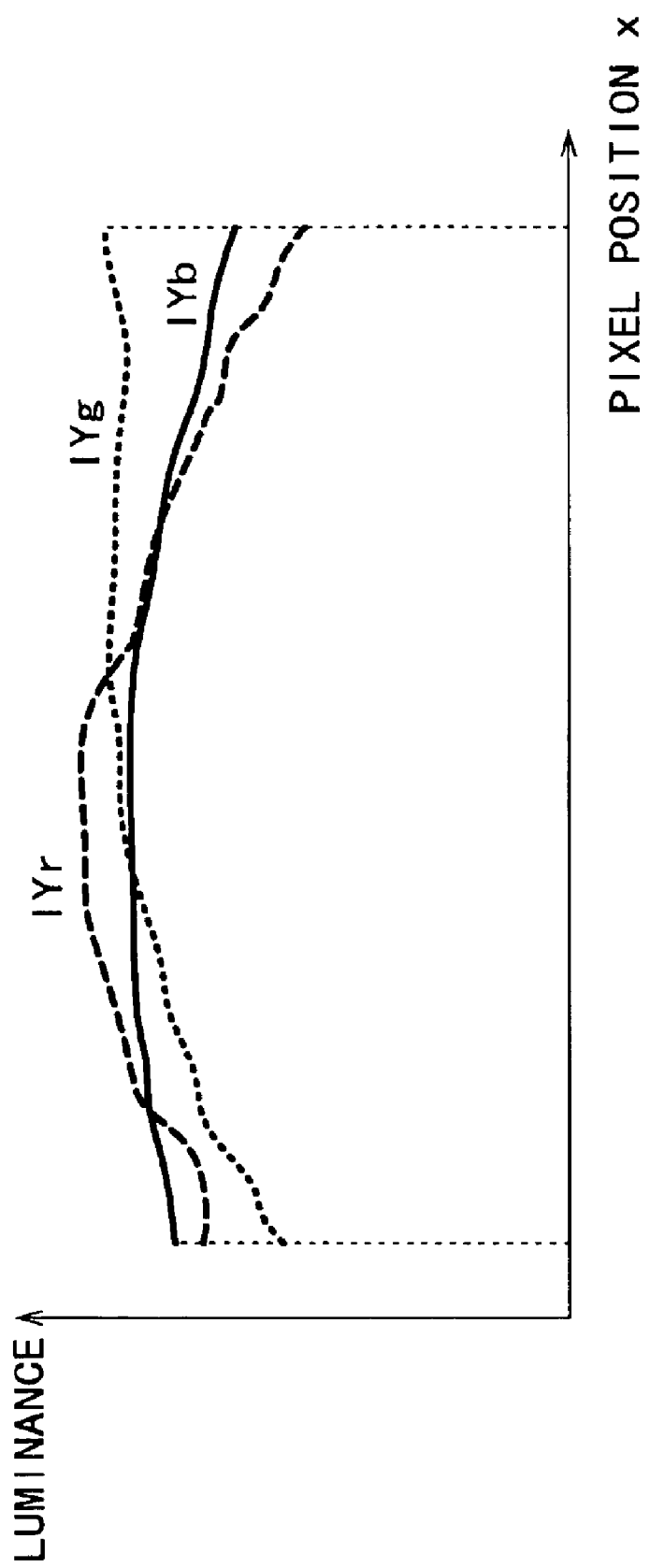
FIG. 37 is a diagram illustrating a profile of a white luminance which can be realized by the image display apparatus according to the third embodiment.

FIG. 37 illustrates modulation characteristics IYr(v1, x), IYg(v1, x), IYb(v1, x) each including an illumination light distribution and calculated when the level v of the test signal is v=v1.

Step S75:

The luminance distribution analysis section 287 analyzes the luminance characteristics IYr, IYg, IYb, for example, illustrated in FIG. 37, divides them into several portions in the direction of the pixel arrangement and determines a maximum luminance function IYmax(v, x) of the white which can be realized for each divisional portion.

Figure 38:
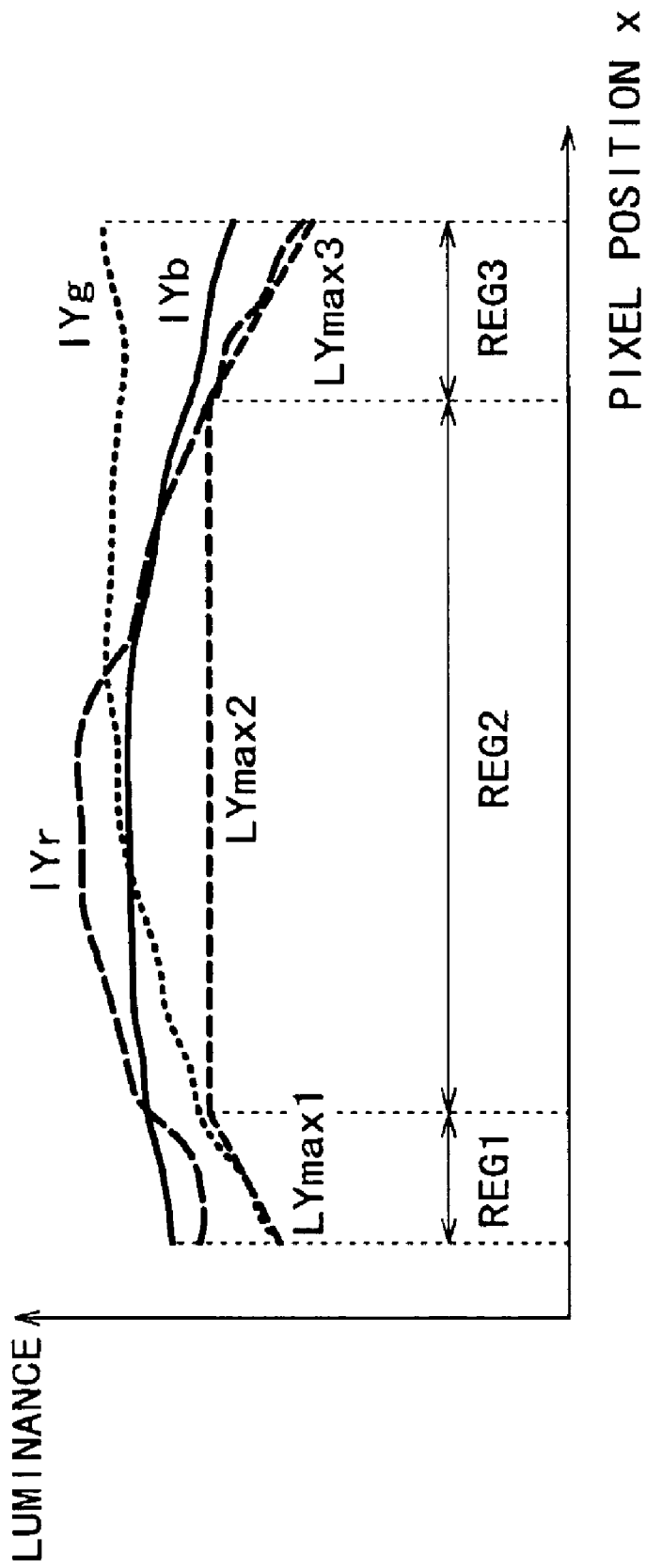
FIG. 38 is a diagram illustrating a method of dividing a profile of a white luminance into a plurality of regions and determining target modulation characteristics in the divisional regions by the image display apparatus according to the third embodiment.

The division may not be uniform division, and, for example, as shown in FIG. 38, the pixel region is divided into three portions. Then, a common minimum value IY0 is determined for each of the divisional regions to determine a maximum luminance function IYmax(v, x) of the white which can be realized as given below:

region 1: $IYmax\ (v, x)=ax+b$, region 2: $IYmax\ (v, x)=c$, and region 3: $IYmax\ (v, x)=f-dx$ where x indicates the position of the pixel.

The luminance distribution analysis section 287 outputs the maximum luminances IYmax of the white which can be realized, and the ideal modulation characteristic function production section 283 outputs an ideal modulation characteristic function IV(t) designated by the user. The multiplier 284d multiplies the function IYmax and the function IV(t) and sets results of the multiplication as target modulation characteristics IT (v)

Step S76:

The correction table production sections 285a, 285b and 285c correct the driving signals for the individual R, G and B illuminations and for the individual pixel elements based on the calculated target modulation characteristics IT(v) and the modulation characteristics (see FIG. 37) IYr(v, x), IYg(v, x), IYb(v, x) for the individual pixels obtained actually by the measurement so that the ununiformity in luminance and color displayed may be eliminated. The correction table production sections 285a, 285b and 285c thus produce individual correction tables for the driving signals.

A similar method to that described hereinabove with reference to FIG. 24 in connection with the second embodiment may be used as the particular correction method in this instance.

In particular, the driving voltages to be applied to the pixel elements are corrected so that the pixel elements may display with an equal luminance value Y with respect to a predetermined initial driving voltage Vin.

The corrected driving voltages for all of the pixel elements of the GLV devices 23R, 23G and 23B obtained in this manner are written into the data table storage sections 286a, 286b and 286c, respectively, thereby completing the correction process.

When an image signal is inputted later, the driving signal is corrected suitably for each pixel element and for each driving signal level by the data table storage sections 286a, 286b and 286c to correct the ununiformity in luminance and color, and consequently, a video image of a high quality is outputted.

Figure 39:
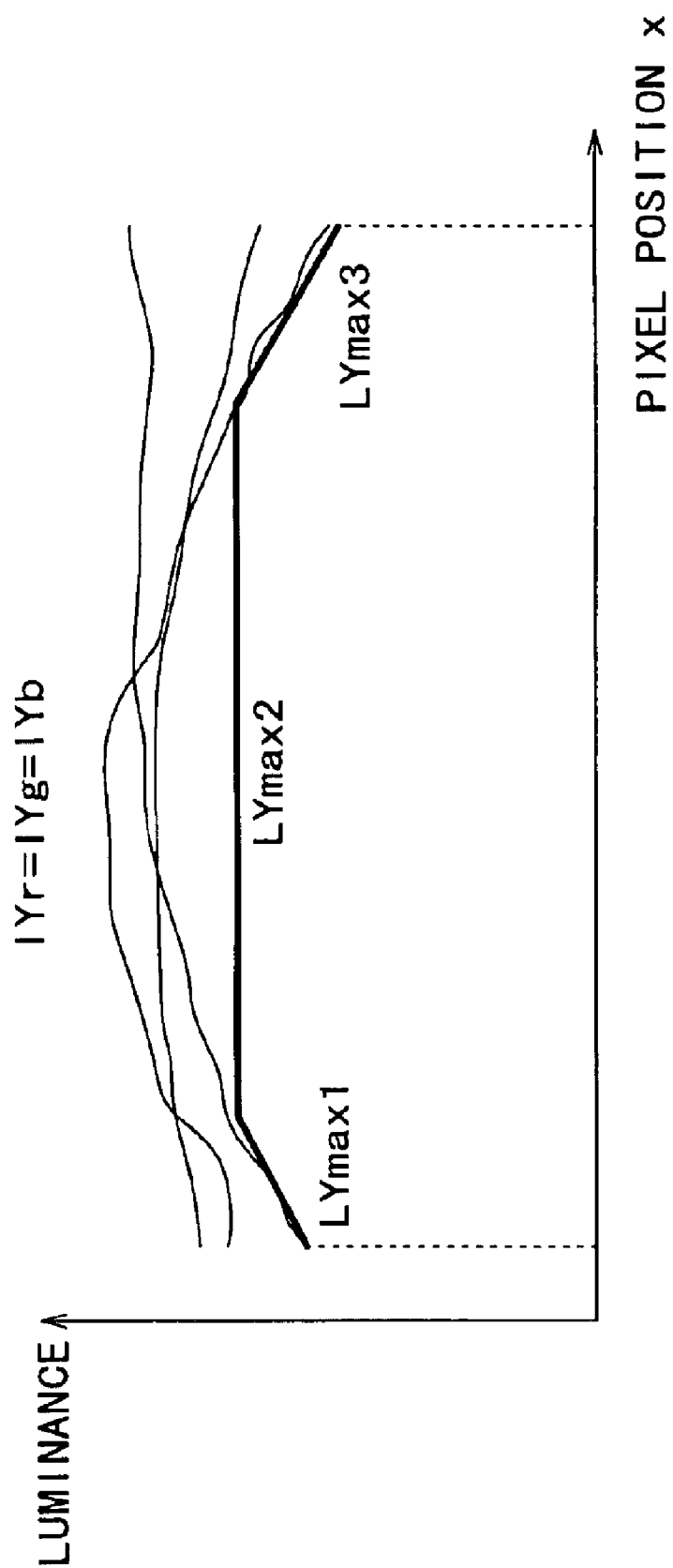
FIG. 39 is a diagram illustrating a profile of a white luminance after the ununiformity in display is corrected by the image display apparatus according to the third embodiment.

FIG. 39 illustrates luminance profiles after the ununiformity in luminance and color is corrected.

As seen in FIG. 39, when the corrected driving voltages are applied, the luminance profiles IYr, IYg and IYb of the laser light sources 21R, 21G and 21B are equal to each other, and therefore, the white can be displayed correctly.

According to the present embodiment, since the GLV devices are driven with corrected driving signals wherein the ununiformity in illumination condition and the dispersion in pixel element characteristic are corrected for each pixel, a video image of a high quality free from the ununiformity in luminance and color can be provided on a screen.

Further, since the illumination ununiformity which is liable to be influenced by an environment or secular change can be corrected suitably, a video image which is normally free from the color ununiformity can be provided.

Furthermore, since a maximum luminance function is set for each of a plurality of divisional illumination regions, the luminance can be utilized effectively without being wasted. Further, since the luminance ratio of R, G and B is fixed in each divisional illumination region, the color ununiformity which deteriorates the picture quality does not occur.

Further, since only an illumination profile is measured immediately before an image is displayed, the measurement time can be reduced significantly. Therefore, the waiting time of the user can be reduced.

Fourth Embodiment

An image display apparatus according to a fourth embodiment of the present invention has a basic configuration similar to that of the second embodiment described hereinabove with reference to FIGS. 12, 13 and 15. However, in the present embodiment, the image display apparatus additionally includes a processing circuit for reducing the influence of a quantization error which appears when driving voltage correction data stored in the data table storage section are inputted to the driving circuits.

Figure 40:
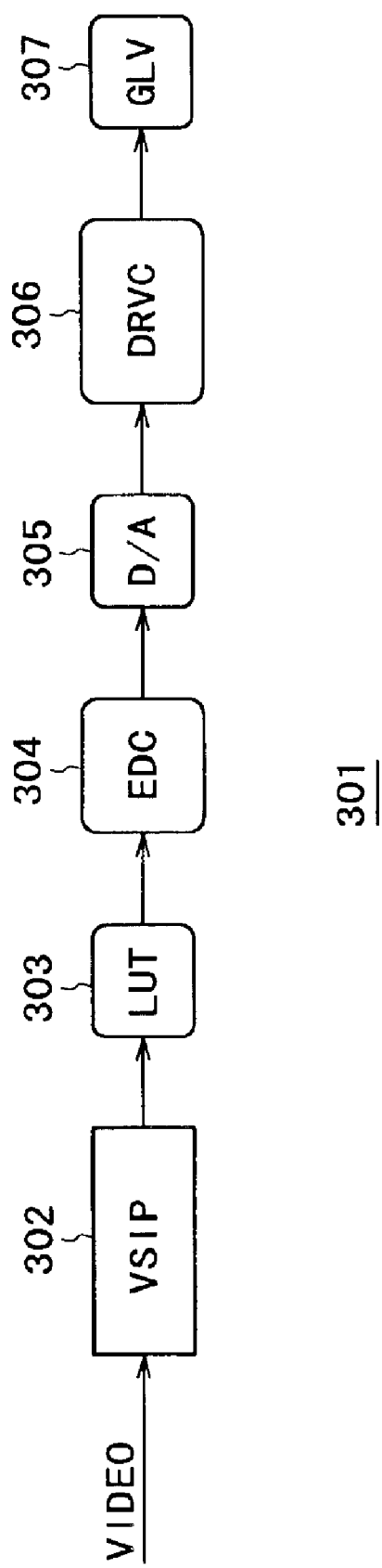
FIG. 40 is a block diagram showing a partial configuration of a signal processing section of an image display apparatus according to a fourth embodiment of the present invention.

FIG. 40 is a block diagram showing a configuration of part of the signal processing section 301 in the image display apparatus according to the present embodiment.

Referring to FIG. 40, the signal processing section 301 shown includes a video signal input processing section (VSIP) 302, a data table storage section (LUT) 303, an error diffusion circuit (EDC) 304, a D/A conversion circuit 305 and a driving circuit (DRVC) 306.

In FIG. 40, the video signal input processing section 302 processes a video signal VIDEO in the form of RGB signals. For example, the video signal input processing section 302 converts color difference signals YCbCr (YPbPr) inputted from a video image reproduction apparatus such as a DVD reproduction apparatus into RGB signals and converts the RGB signals to which a nonlinear characteristic (γ characteristic) is applied into those of a linear characteristic through an inverse gamma correction process. Further, the video signal input processing section 302 carries out a color space conversion process for the RGB signals in order that the RGB signals may correspond to a color reproduction range of the illumination light source. The video signal VIDEO processed in this manner is inputted to the data table storage section 303.

Corrected driving voltage data of all of the pixel elements of the GLV devices 23R, 23G and 23B are stored in the data table storage section 303. When the video signal VIDEO is inputted to the data table storage section 303, using a driving voltage corresponding to the video signal VIDEO as an initial driving voltage, the corrected driving voltage data of all of the pixel elements of a corresponding one of the GLV devices 23R, 23G and 23B are read out from the data table storage section 303. The driving voltage data are supplied through the error diffusion circuit 304 to the D/A conversion circuit 305, by which they are D/A converted, whereafter they are applied to the driving circuits for the pixel elements of the GLV device.

Since the corrected driving voltages are applied, the ununiformity in luminance and color on the screen is eliminated, and an image of a high picture quality is displayed on the screen.

The D/A conversion circuit 305 converts the digital driving signal inputted thereto into an analog signal. The driving circuit 306 applies the analog signal to the ribbon electrodes of a predetermined pixel element of the GLV devices 23R, 23G and 23B. The GLV devices 23R, 23G and 23B operate in response to the driving signal and modulate the laser lights emitted from the red laser 21R, green laser 21G and blue laser 21B, respectively.

A D/A converter and a driving circuit placed on the market and used as the D/A conversion circuit 305 and the driving circuit 306 have a bit width of 8 bits.

Meanwhile, as described in the description of the second and third embodiments above, when a correction table is determined based on a target modulation characteristic and a modulation characteristic for each pixel measured actually, measurement and correction processes are accurate processes. Thus, in order to secure a measurement accuracy, a correction accuracy, and an arithmetic operation accuracy, it is necessary, for example, to use an interpolation process or a like process to perform the processes described above using a data format of a great bit number and produce a correction data table for a driving voltage with a great bit number. For example, the bit number of data of the corrected driving voltage is 10, that is, the bit number of corrected driving voltage data of all of the pixel elements stored in the data table storage section 303 is 10.

However, if data of the data table storage section 303 are inputted to the D/A conversion circuit 305 and the driving circuit 306, then the data of the data table storage section 303 which are comparatively continuous to each other are sampled out, or in other words, quantized (digitized) into 256 values.

The quantization makes the gradation of the driving voltage rougher and gives rise to an error when compared with the corrected data of the driving voltage stored in the data table storage section 303. The error is represented as quantization error.

If some discontinuity between pixels appears on the screen due to such a quantization error, then this cannot be eliminated even if the correction methods of the second and third embodiments are used. Besides, since the sensitivity of the eyes of the human being is high, such a small discontinuity between pixels as mentioned above is recognized as an unnatural display by the human being. Particularly in a display apparatus wherein modulated lights from GLV devices are scanned to display a two-dimensional image, since a one-dimensional image is scanned on the screen, an abnormal point on the one-dimensional image appears as a horizontal stripe on the screen and can be recognized further readily by the human being.

Therefore, in the present embodiment, the error diffusion circuit 304 is interposed between the data table storage section 303 and the D/A conversion circuit 305 and driving circuit 306 to allocate a quantization error appearing at one pixel on the screen to a plurality of pixels around the pixel and further allocate the quantization error to a plurality of pixels in a predetermined region of a next frame. Further, also with regard to all pixels in one screen, a quantization error of a pixel of an object of processing is diffused to a plurality of pixels in a predetermined region of a current frame and a next frame. As a result, errors over an overall video image are minimized to make the displayed image more natural.

Although a method of diffusing a quantization error in a single stationary screen, called two-dimensional quantization error diffusion method, is known, the image display apparatus according to the present embodiment is an apparatus for displaying a video image and a plurality of frames displayed successively have contents of the screen also which are almost continuous to each other. Therefore, in the present embodiment, in order to reduce the discontinuity on the screen caused by quantization errors of the driving voltage to the utmost, a quantization error diffusion process is performed also between frames (such quantization error diffusion process is hereinafter referred to as three-dimensional error diffusion).

Figure 41:
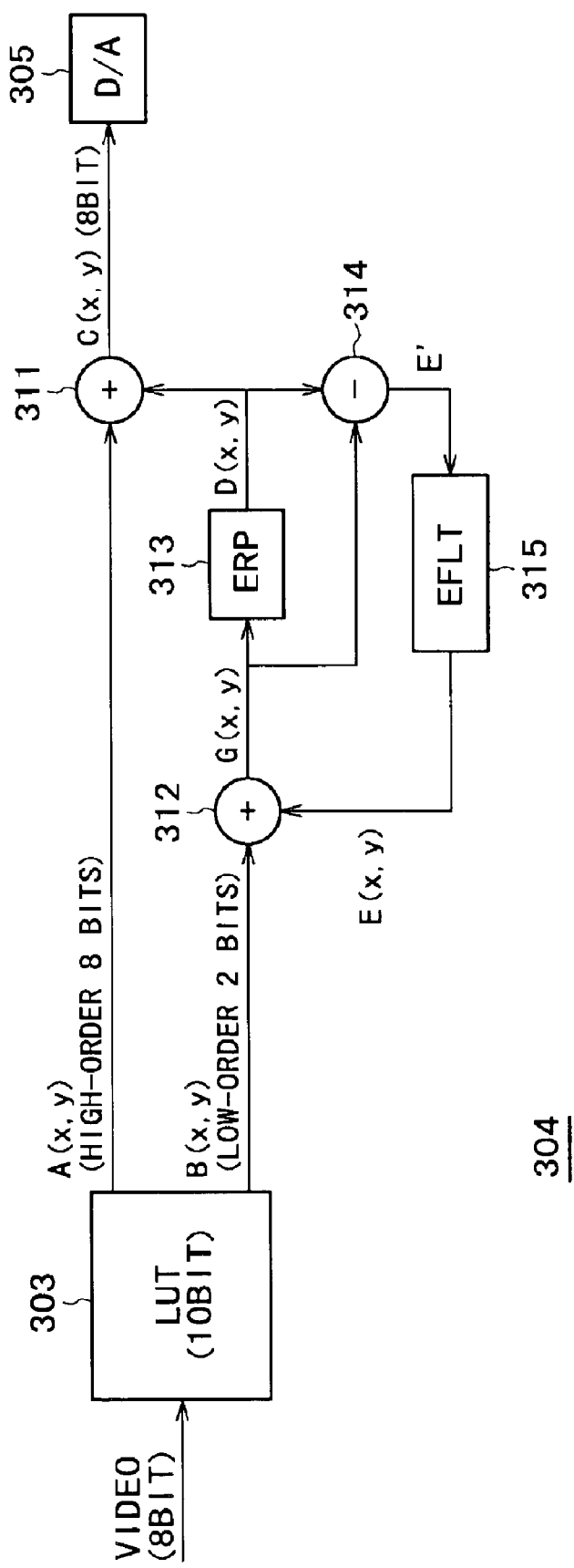
FIG. 41 is a block diagram showing a configuration of an error diffusion circuit of the image display apparatus according to the fourth embodiment.

FIG. 41 is a block diagram showing an example of a configuration of the error diffusion circuit 304 in the image display apparatus according to the present embodiment.

The error diffusion circuit 304 includes an adder 311, another adder 312, an error rounding processing section (ERP) 313, a subtractor 314, and an error filter (EFLT) 315.

The data table storage section 303 divides driving voltage correction data of 10 bits stored therein into high order 8 bits and low order 2 bits and outputs the driving voltage correction data as such.

The high order 8 bits $A(x, y)$ are inputted to the adder 311 while the low order 2 bits $B(x, y)$ are inputted to the adder 312 and processed as an error.

More particularly, the adder 312 adds the low order 2 bits B and an error $E(x', y')$ of 2 bits appearing with a pixel in an immediately preceding line or in a predetermined region $(x', y')$ in an immediately preceding frame. A result $G(x, y)$ of the 2-bit addition is processed by the error rounding processing section (ERP) 313.

The error rounding processing section 313 has a predetermined threshold value UO set therein and receives data of 2 bits as an input thereto. The error rounding processing section 313 compares the inputted data with the threshold value UO and outputs, for example, 1 when the inputted data is equal to or higher than the threshold value UO (that is, $D(x, y)=1$ in FIG. 41), but outputs 0 when the inputted data is lower than the threshold value UO (that is, $D(x, y)=0$ in FIG. 41). For example, if 1 is outputted when the inputted data is equal to or higher than the threshold value UO, then the data is referred to as first data, but if 0 is outputted when the inputted data is lower than the threshold value UO, the data is referred to as second data.

The adder 311 adds the data $D(x, y)$ outputted from the error rounding processing section 313 to the low order 2 bits of the high order 8 bits $A(x, y)$ and outputs resulting data as corrected driving voltage data $C(x, y)$.

The error filter 315 sets a difference E' between the input data $G(x, y)$ and the output data $D(x, y)$ of the error rounding processing section 313 as a newly appearing quantization error $E(x, y)$ and allocates the quantization error $E(x, y)$ to surrounding pixels with weighting coefficients corresponding to the surrounding pixels applied thereto.

The error diffusion circuit 304 operates in the following manner to diffuse a quantization error.

The high order 8 bits $A(x, y)$ and the low order 2 bits $B(x, h)$ outputted from the data table storage section 303 are inputted to the adders 311 and 312, respectively. The low order 2 bits $B(x, y)$ are added by the adder 312 to an error component $E(x', y')$ preceding by one line or by one frame determined by the error filter 315, and a value $G(x, y)$ is obtained by the addition. The value $G(x, y)$ is inputted to the error rounding processing section 313, by which it is compared with the threshold value UO. The error rounding processing section 313 outputs a value $D(x, y)$ as a result of the comparison.

The value $D(x, y)$ is added to the high order 8 bits $A(x, y)$ by the adder 311, and a quantization error then is inputted as processed driving voltage data to the driving circuit D/A conversion circuit 305.

The subtractor 314 subtracts the input data $G(x, y)$ from the output data $D(x, y)$ of the error rounding processing section 313 and sets the difference as an error E' newly occurring with the pixel $(x, y)$. The error filter 315 multiplies the newly occurring error E' by weighting values corresponding to individual surrounding pixels to allocate the newly occurring error E' to the surrounding pixels such as, for example, predetermined pixels in a next line or a next frame.

The error diffusion circuit 304 serves as a driving signal supplying section or a second driving signal supplying section.

The data table storage section 303 serves as a first driving signal supplying section.

Figure 42:
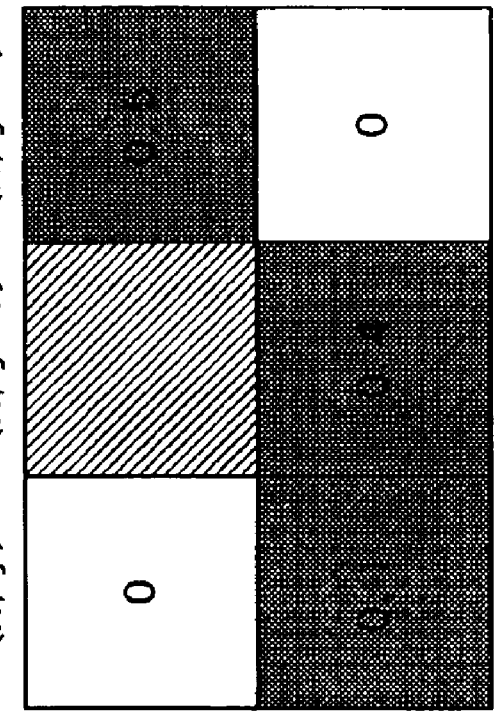
FIG. 42 is a diagrammatic view showing an example of two-dimensional error diffusion of the image display apparatus according to the fourth embodiment.

FIG. 42 is a view illustrating an example of two-dimensional error diffusion in the image display apparatus according to the present embodiment.

Referring to FIG. 42, for example, at a pixel (x+1, y+1), the low order 2 bits B(x, y) which become an error of a driving voltage are 1. The quantization error is diffused in an X direction (pixel element arrangement direction of the GLV device) and a Y direction (scanning direction) by the error diffusion circuit 304. Thus, errors of 0.1 and 0.5 are distributed to another pixel (x+1, y+1) and a further pixel (x, y+2), respectively. Here, it is assumed that the error E(x, y) in the preceding cycle is zero for the convenience of description.

The foregoing is two-dimensional quantization error diffusion.

Figure 43:
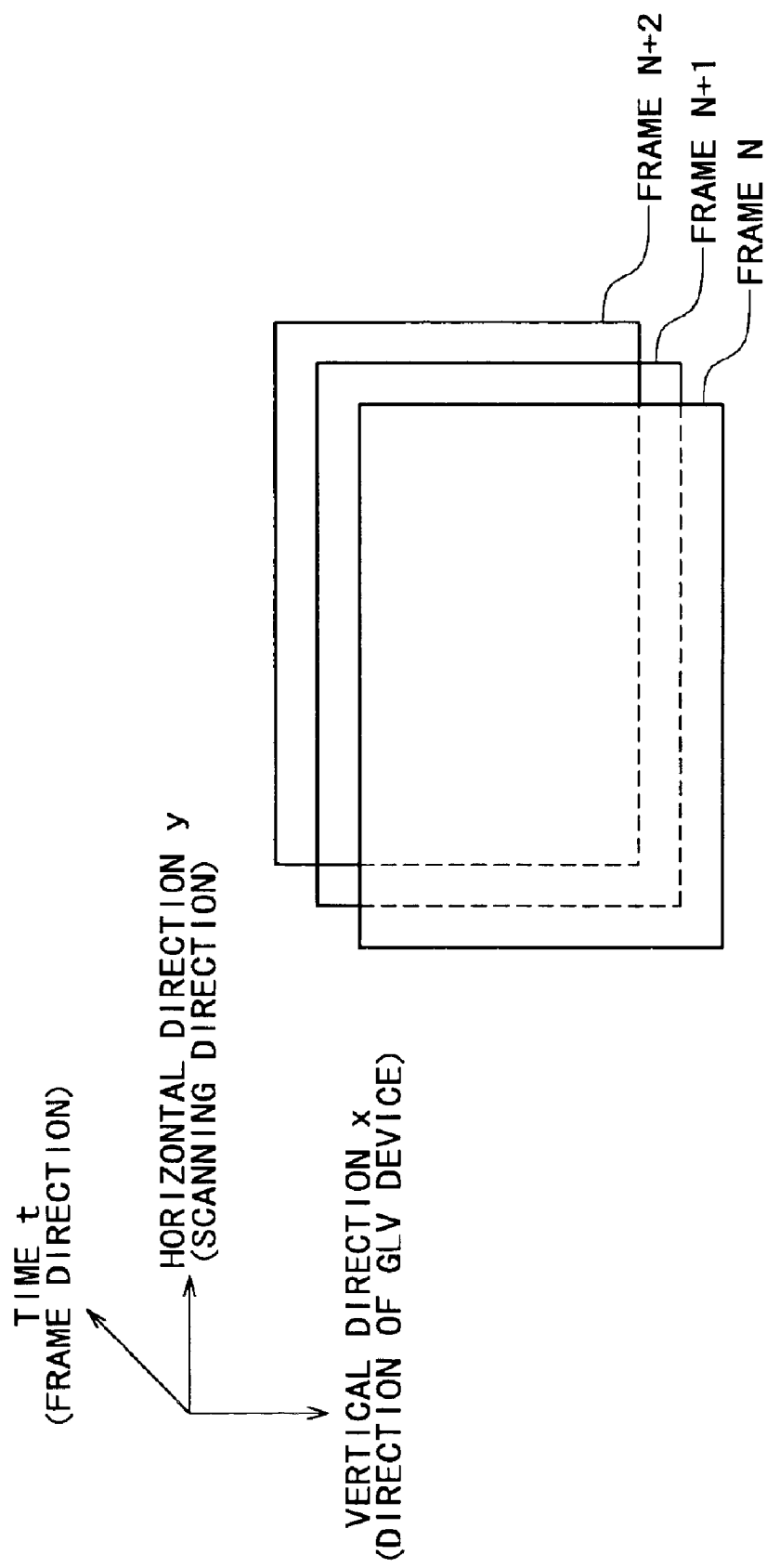
FIG. 43 is a diagrammatic view showing a structure of an image by the image display apparatus according to the fourth embodiment.

FIG. 43 is a view illustrating a structure of an image in the image display apparatus according to the present embodiment.

As seen in FIG. 43, the image display apparatus according to the present embodiment displays a video image. Since a plurality of frames displayed successively have screen contents substantially continuous to each other, some discontinuity on the screen arising from an quantization error of a driving voltage is likely to be recognized.

Therefore, in the present embodiment, in order to reduce the display discontinuity between frames, an error diffusion process including interframe quantization error diffusion, that is, three-dimensional error diffusion, is performed.

Figure 44:
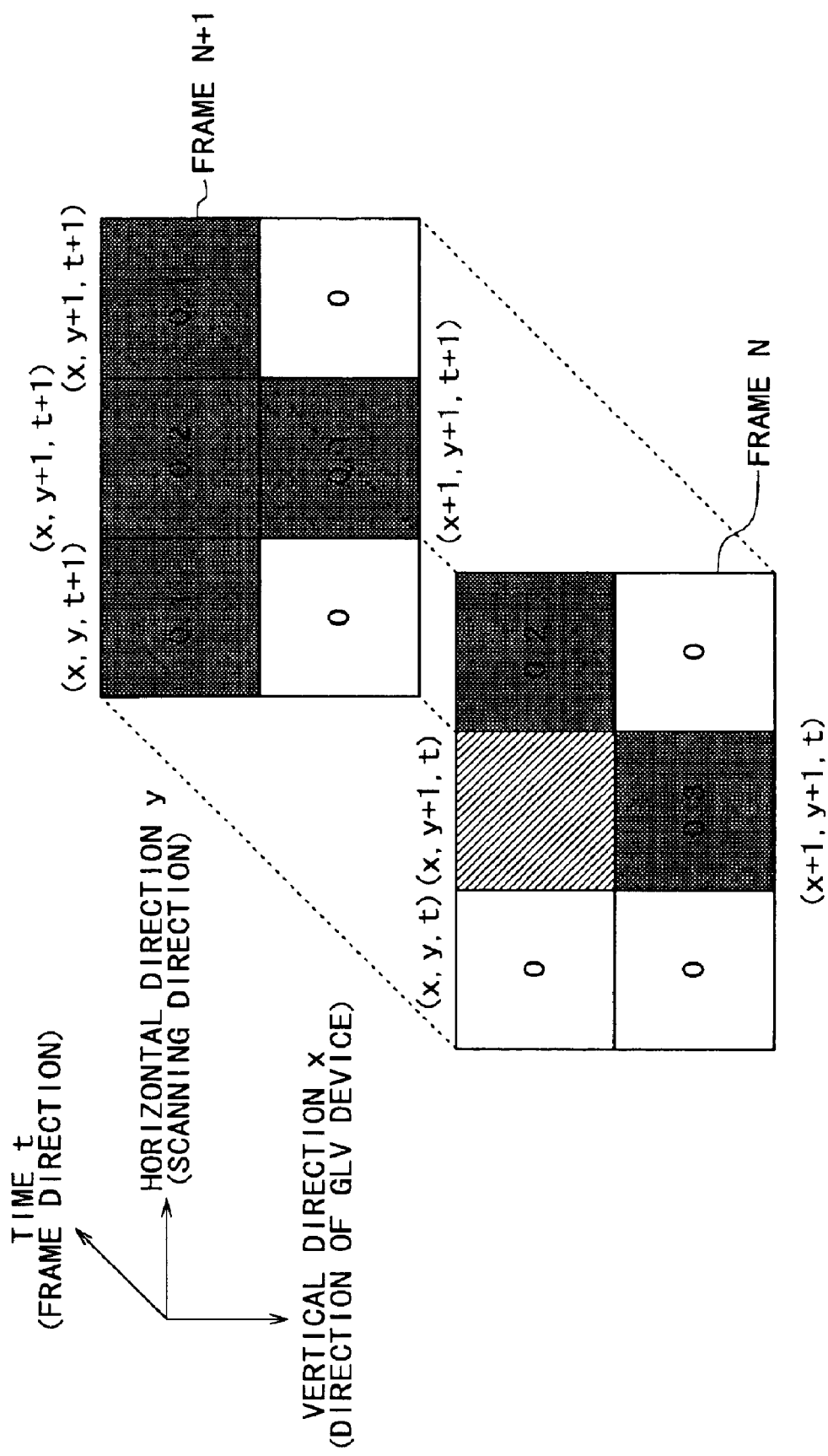
FIG. 44 is a diagrammatic view showing an example of three-dimensional error diffusion of the image display apparatus according to the fourth embodiment.

FIG. 44 is a view illustrating an example of three-dimensional error diffusion in the image display apparatus according to the present embodiment.

As seen in FIG. 44, it is possible to apply a three-dimensional error filter 315 which diffuses an error not only in the XY directions but also in a frame direction.

As seen in FIG. 44, for example, at a pixel (x+1, y+1, t) in a frame N, the value of the low order 2 bits B(x, y) which make an error of a driving voltage is 1. The quantization error is diffused in the X direction (pixel element arrangement direction of the GLV device), Y direction (scanning direction) and t direction (frame direction) by the signal processing section 301. Thus, 0.2 is distributed to another pixel (x, y+2, t) in the same frame N; 0.1 is distributed to a further pixel (x, y, t+1) in a next frame N+1; 0.2 is distributed to a still further pixel (x, y+1, t+1) in the next frame N+1; 0.1 is distributed to a yet further pixel (x+1, y+1, t+1) in the next frame N+1; and 0.1 is distributed to a yet further pixel (x, y+1, t+1) in the next frame.

Similarly, it is assumed here that the error E(x, y) in the preceding cycle is zero for the convenience of description.

According to the present embodiment, since a circuit which diffuses a quantization error is additionally provided, a quantization error component can be reflected uniformly on a correction signal for a driving signal. Consequently, also where a low bit driving circuit is used, correction against stripe-like unevenness similar to that by a high bit driving circuit can be achieved.

Fifth Embodiment

Figure 45:
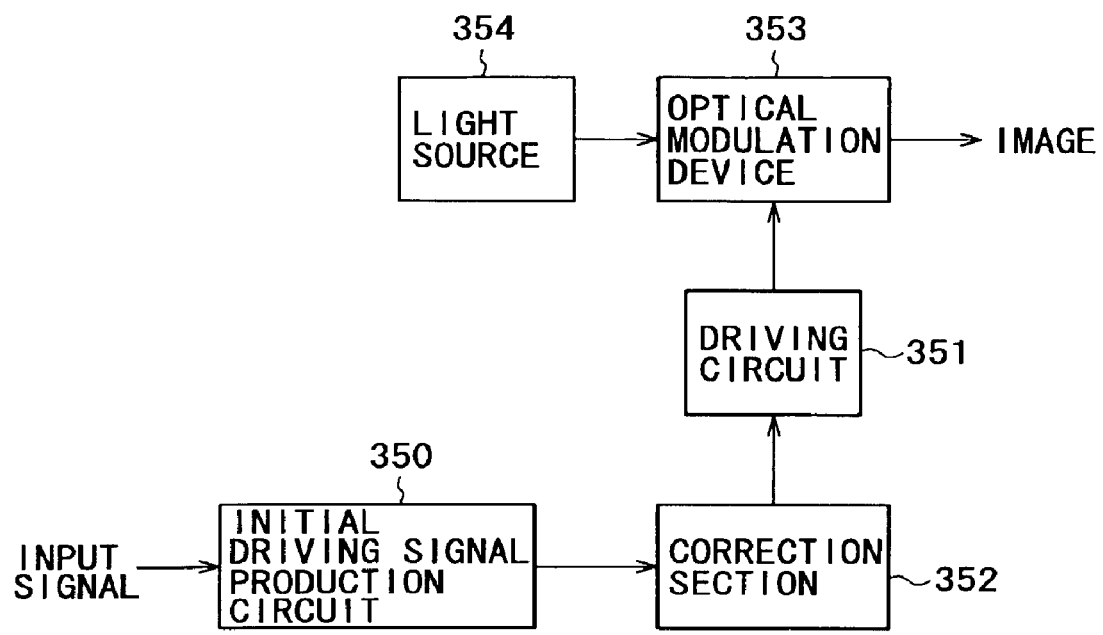
FIG. 45 is a block diagram showing a configuration of an image production apparatus according to a fifth embodiment of the present invention.

A basic configuration of an image production apparatus according to a fifth embodiment is shown in FIG. 45. The image production apparatus includes several common components to those of the image display apparatus described hereinabove, and overlapping description of them is omitted herein to avoid redundancy. The optical modulation device in the present embodiment may be formed from a GLV device or a DMD (Digital Mirror Device).

FIG. 45 is a block diagram schematically showing the image production apparatus according to an application of the present invention.

Referring to FIG. 45, the image production apparatus shown includes an initial driving signal production circuit 350, a driving circuit 351, a correction section 352, and an optical modulation device 353.

The initial driving signal production circuit 350 produces an initial driving signal for driving the optical modulation device 353 from an input signal inputted thereto.

The driving circuit 351 drives the optical modulation device 353 in response to an input signal thereto.

The correction section 352 determines a target light intensity of modulated light to be emitted from the optical modulation device 353 in response to the initial driving signal. Further, the correction section 352 determines a value of the driving signal for the optical modulation device 353 corresponding to the target light intensity from an intensity of modulated light emitted from the optical modulation device 353 in accordance with the driving signal. Further, the correction section 352 inputs the determined driving signal to the driving circuit 351.

The optical modulation device 353 modulates light inputted thereto and emits the modulated light.

The image production apparatus implemented with the configuration described above may be applied to a projector, a display unit, a printer, a CTP (Computer To Plate) apparatus and so forth.

Now, operation of the image production apparatus according to the present embodiment is described. Operation of the image production apparatus according to the present embodiment substantially corresponds to that of the image display apparatus according to the various embodiments described hereinabove.

First, light emitted from a light source 354 illuminates the optical modulation device 353. Further, the driving circuit 351 applies a voltage successively changing from a predetermined minimum voltage to a predetermined maximum voltage to all of such optical modulation devices 353. An optical detection apparatus individually detects the amount of modulated light emitted from each of the optical modulation devices.

Then, the correction section 352 performs an initial process including gain adjustment, A/D conversion and so forth for the signal of the modulated light measured by the light detection apparatus. Further, the correction section 352 uses the amounts of modulated light measured by the light detection apparatus to analyze and detect the ununiformity in luminance and color of an image produced from the image pixel elements of the optical modulation devices to determine an optimum driving voltage to be applied to each pixel element of each color with respect to a predetermined initial driving voltage. The correction section 352 produces a data table of the thus determined optimized driving voltage data and stores the data table into a memory of the production apparatus.

When an image is to be displayed actually, the stored driving voltage data table is used to apply suitable driving voltages to the individual pixel elements of the optical modulation device.

When the driving voltages optimized in such a manner as described above are applied to the optical modulation devices, the optical modulation devices modulate light emitted from the light source to produce an image. At this time, for example, the modulated light is scanned by means of a scanning section similarly as in the embodiments described hereinabove to produce an image. The light source may include a plurality of different single-color lights. Or, if necessary, a color filter, a projection lens or a condenser lens may be used in combination.

With the image production apparatus described above, the ununiformity in luminance and color of an image to be produced can be reduced.

While the present invention is described in connection with preferred embodiments thereof, the present invention is not limited to the embodiments described above but allows various modifications without departing from the spirit and the scope of the present invention.

While, in the embodiments described above, an example of configurations of an image production apparatus, an image display apparatus and a modulation device adjustment apparatus according to the present invention is described, the configurations can be modified in various manners.

Further, the method of dividing an illumination region described in connection with the third embodiment can be applied also to the second embodiment.

Further, while, in the image display apparatus according to the present invention described above, one pixel of a GLV device includes six ribbon electrodes, the present invention is not limited to the specific configuration.

The application of the three-dimensional error diffusion method described hereinabove in connection with the fourth embodiment is not limited to an image display apparatus which uses a GLV device.

What is claimed is:

1. An image production apparatus, comprising:
   an optical modulation device for modulating light;
   a driving circuit for driving said optical modulation device in response to an input signal;
   an initial driving signal production circuit for producing an initial driving signal for deriving said optical modulation device in response to the input signal; and
   correction means for determining, from a target light intensity of modulated light to be emitted from said optical modulation device in response to the initial driving signal and an intensity of the modulated light emitted from said optical modulation device in response to the driving signal, a value of the driving signal for said optical modulation device corresponding to the target light intensity and inputting the determined driving signal to said driving circuit.

2. An image display apparatus, comprising:
   a light source;
   a plurality of optical modulation devices each including a plurality of fixed electrodes and a plurality of displaceable electrodes positioned adjacent said fixed electrodes and individually displaced or deformed in response to a driving signal applied thereto to form offsets from said fixed electrodes so that illumination light from said light source incoming to one of faces of said fixed and displaceable electrodes is modulated in accordance with the offsets such that the modulated lights from said optical modulation devices are arrayed linearly to form a one-dimensional image;
   image display means for being illuminated with the modulated lights to form an image;
   a driving circuit for applying the driving signals to the electrodes of said optical modulation devices in response to an input signal thereto;
   an initial driving signal production circuit for producing an initial driving signal for driving said optical modulation devices from the input signal; and
   correction means interposed between said initial driving signal production circuit and said driving circuit for determining, from a target light intensity for the modulated lights to be emitted from said optical modulation devices in response to the initial driving signal and intensities of the modulated lights emitted from said optical modulation devices in response to the driving signals, values of the driving signals for said optical modulation devices corresponding to the target light intensity and inputting the driving signals of the determined values to said driving circuit.

3. An image display apparatus according to claim 2, further comprising measurement means removably placed at a position at which said measurement means can measure the modulated lights emitted from said optical modulation devices for measuring the intensities of the modulated lights emitted from said optical modulation devices and determining a modulation characteristic of each of said optical modulation devices representative of a relationship between the driving signal applied to the optical modulation device and the intensity of the modulated light emitted from the optical modulation device in response to the driving signal.

4. An image display apparatus according to claim 2, further comprising measurement means removably placed at a position at which said measurement means can measure the modulated lights emitted from said optical modulation devices for measuring the intensities of the modulated lights emitted from said optical modulation devices and determining a modulation characteristic of each of said optical modulation devices representative of a relationship between the driving signal applied to the optical modulation device and the intensity of the modulated light emitted from the optical modulation device in response to the driving signal,
   wherein said correction means determines, from the determined modulation characteristic of each of said optical modulation devices, the value of the driving signal for the optical modulation device corresponding to the target light intensity emitted in response to the initial driving signal.

5. An image display apparatus according to claim 4, wherein said correction means determines a target modulation characteristic representative of a relationship between the initial driving signal and the target light intensity of the modulated light emitted in response to the initial driving signal to set the target light intensity for the driving signals.

6. An image display apparatus according to claim 2, wherein said light source includes single-color light sources for red, green and blue, and
   said optical modulation devices include a first optical modulation element array, a second optical modulation element array and a third optical modulation element array which individually include a plurality of optical modulation elements for modulating single-color illumination lights emitted from said single-color light sources.

7. An image display apparatus according to claim 6, wherein said measurement means determines modulation characteristics of said optical modulation devices from the intensities of the modulated lights emitted from said optical modulation element arrays including the optical modulation elements for modulating the single-color illumination lights illuminated from said single-color light sources, and
   said correction means determines, from the modulation characteristics of the optical modulation elements which form said optical modulation element arrays, the values of the driving signals corresponding to the target light intensities for the optical modulation elements, which form said optical modulation element arrays, set in response to the initial driving signal.

8. An image display apparatus according to claim 7, wherein said correction means determines the target modulation characteristics for the optical modulation elements, which form said optical modulation element arrays, to set the target light intensities.

9. An image display apparatus according to claim 7, wherein said light source includes first illumination means for illuminating, for each of said optical modulation element arrays, the single-color illumination lights simultaneously on the optical modulation elements which form the optical modulation element array, and said correction means varies a voltage value within a first variation range to produce a first test signal and applies the first test signal to said optical modulation devices through said driving circuit.

10. An image display apparatus according to claim 7, wherein said measurement means measures the intensities of the modulated lights emitted in response to the voltage value of the first test signal from the optical modulation elements, which form each of said optical modulation element arrays, illuminated by said first illumination means for illuminating, for each of said optical modulation element arrays, the single-color illumination lights to determine the modulation characteristics of said optical modulation devices, and said correction means uses the determined modulation characteristics of said optical modulation devices to determine an illumination profile for each color representative of a relationship between the light intensities of the modulated lights emitted from the optical modulation elements which form said optical modulation element arrays and the positions of the optical modulation elements.

11. An image display apparatus according to claim 10, wherein said correction means determines target modulation characteristics for the optical modulation elements which form said optical modulation element arrays from the illumination profiles for the individual colors.

12. An image display apparatus according to claim 11, wherein said correction means determines a luminance distribution of white which can be realized by said red, green and blue single-color light sources from the illumination profiles of the individual colors, and determines a minimum value of the white luminance distributions of the optical modulation element arrays as a target maximum luminance of the white to be realized by said optical modulation elements which form said optical modulation element arrays, and determines the target modulation characteristics of said optical modulation devices from a predetermined modulation characteristic function and the target maximum luminance of the white.

13. An image display apparatus according to claim 11, wherein said correction means divides the optical modulation elements which form each of said optical modulation element arrays into a plurality of groups depending upon positions of said optical modulation elements, and individually determines the target modulation characteristics of the optical modulation elements of the groups from the illumination profiles for the individual colors.

14. An image display apparatus according to claim 13, wherein said correction means determines a luminance distribution of white which can be realized by said red, green and blue single-color light sources from the illumination profiles of the individual colors, and determines a minimum value of the white luminance distributions of the optical modulation elements of the groups as a target maximum luminance of the white of the optical modulation elements, and determines the target modulation characteristics of the optical modulation elements of each of the optical modulation element groups from a predetermined modulation characteristic function and the target maximum luminance of the white.

15. An image display apparatus according to claim 7, wherein said light source includes first illumination means for illuminating, for each of the optical modulation element arrays, the single-color illumination lights simultaneously upon the optical modulation elements which form the optical modulation element array, and second illumination means for illuminating, for each of said optical modulation devices, the single-color illumination lights upon the optical modulation elements which form the optical modulation element array, and said correction means determines the modulation characteristics of the optical modulation elements which form the optical modulation element array and illumination profiles of said optical modulation element arrays separately from each other using said first and second illumination means.

16. An image display apparatus according to claim 15, wherein, when said second illumination means illuminates the optical modulation elements of the optical modulation element arrays, said correction means produces a first test signal whose voltage value varies within a first variation range and applies the first test signal to said optical modulation devices through said driving circuit, and said measurement means measures the intensities of the modulated lights emitted in response to the voltage value of the first test signal by any of said optical modulation devices illuminated by said second illumination means to determine the modulation characteristics of said optical modulation devices.

17. An image display apparatus according to claim 15, wherein, when said first illumination means illuminates the optical modulation elements which form the optical modulation element arrays, said correction means produces a second test signal whose voltage value varies within a second variation range and applies the second test signal to said optical modulation devices through said driving circuit.

18. An image display apparatus according to claim 17, wherein said measurement means measures the intensities of the modulated lights emitted from the optical modulation elements of the optical modulation element arrays illuminated by said first illumination means when the optical modulation elements of the optical modulation element arrays are deformed or displaced in response to the voltage value of the second test signal, and said correction means determines illumination profiles of the optical modulation elements which form the optical modulation element arrays.

19. An image display apparatus according to claim 18, wherein said correction means determines target modulation characteristics for the optical modulation elements which form said optical modulation element arrays from the modulation characteristics of said optical modulation devices determined individually and the illumination profiles for the individual colors.

20. An image display apparatus according to claim 19, wherein said correction means determines a luminance distribution of white which can be realized by said red, green and blue single-color light sources from the modulation characteristics of said optical modulation devices and the illumination profiles of the individual colors, and determines a minimum value of white luminance distributions of the optical modulation element arrays as a target maximum luminance of the white to be realized by said optical modulation elements which form said optical modulation element arrays, and determines the target modulation characteristics of said optical modulation devices from a predetermined modulation characteristic function and the target maximum luminance of the white.

21. An image display apparatus according to claim 19, wherein said correction means divides the optical modulation elements which form each of said optical modulation element arrays into a plurality of groups depending upon positions of said optical modulation elements, and individually determines the target modulation characteristics of the optical modulation elements of the groups from the modulation characteristics of said optical modulation devices and the illumination profiles for the individual colors.

22. An image display apparatus according to claim 21, wherein said correction means determines a luminance distribution of white which can be realized by said red, green and blue single-color light sources from the modulation characteristics of said optical modulation devices and the illumination profiles of the individual colors, and determines a minimum value of the white luminance distributions of the optical modulation elements of the groups as a target maximum luminance of white to be realized by the optical modulation elements, and determines the target modulation characteristics of the optical modulation elements of each of the optical modulation element groups from a predetermined modulation characteristic function and the target maximum luminance of the white.

23. An image display apparatus according to claim 6, wherein the illumination light emitted from said red light source is emitted in a direction perpendicular to that of the illumination light emitted from said green light source and that of the illumination light emitted from said blue light source.

24. An image display apparatus according to claim 6, further comprising illumination optical systems for individually changing shapes of cross sections of the single-color illumination lights from said single-color light sources into linear shapes and illuminating the single-color illumination lights of the linear cross sections individually upon said first, second and third optical modulation element arrays.

25. An image display apparatus according to claim 24, wherein each of said illumination optical systems includes:

first shaping means for shaping the cross section of a corresponding one of the illumination lights;

a first converging lens provided rearward of said first shaping means for converging the illumination light shaped by said first shaping means; and a first deflecting mirror for deflecting the illumination light converged by said first converging lens to a corresponding one of said optical modulation element arrays.

26. An image display apparatus according to claim 6, further comprising color synthesis means for synthesizing the red modulated light modulated by the optical modulation elements of said first optical modulation element array, the green modulated light modulated by the optical modulation elements of said second optical modulation element array and the blue modulated light modulated by the optical modulation elements of said third optical modulation element array.

27. An image display apparatus according to claim 26, wherein said color synthesis means includes:

a first color synthesis filter for synthesizing the red modulated light modulated by the optical modulation elements of said first optical modulation element array and the green modulated light modulated by the optical modulation elements of said second optical modulation element array, and a second color synthesis filter for synthesizing the blue modulated light modulated by the optical modulation elements of said third optical modulation element array and the light emitted from said first color synthesis filter.

28. An image display apparatus according to claim 6, further comprising display light separation means for separating the modulated lights modulated by said optical modulation devices into display light to be used to display a one-dimensional image and non-display light not to be used to display an image.

29. An image display apparatus according to claim 28, wherein the optical modulation devices diffract the illumination lights from an illumination optical system and emit modulated lights including diffracted lights of a plurality of order numbers, and said display light separation means separates ±first order diffracted lights as the display light from within the modulated lights.

30. An image display apparatus according to claim 28, wherein said display light separation means includes:

a concave reflecting mirror for reflecting the modulated lights including the diffracted lights of the plurality of order numbers; and a convex reflecting mirror disposed in an opposing relationship to said concave reflecting mirror and having an opening or openings formed therein through which the non-display lights from among the diffracted lights reflected from said concave reflecting mirror pass so that said convex reflecting mirror reflects the display lights from among the diffracted lights reflected from said concave reflecting mirror back to said concave reflecting mirror.

31. An image display apparatus according to claim 28, further comprising:

second shaping means for changing cross sections of the display lights separated by said display light separation means into linear cross sections; and a second deflecting mirror for deflecting the display light separated by said display light separation means toward said second shaping means.

32. An image display apparatus according to claim 7, further comprising:

second shaping means disposed forward of said measurement means, which measures the intensities of the modulated lights, for changing cross sections of the display lights into linear cross sections; and wherein said measurement means includes:

a light measuring instrument for measuring the modulated lights from said optical modulation devices and producing electric signals corresponding to intensities of the modulated lights from the optical modulation devices;

a third deflecting mirror disposed on an optical axis for deflecting the modulated lights from each of said optical modulation devices toward said light measuring instrument; and a second converging lens interposed between said light measuring instrument and said third deflecting mirror for converging the lights reflected by said third deflecting mirror.

33. An image display apparatus according to claim 7, further comprising:
scanning means for being rotated in response to the input signal to scan the display lights on said image display means to form a two-dimensional image on said image display means; and
a projection optical system for projecting the display lights emitted from said second shaping means, which changes the cross sections of the display lights into linear cross sections, onto said scanning means.

34. An optical modulation device adjustment apparatus, comprising:
a light source;
a plurality of optical modulation devices each including a plurality of fixed electrodes and a plurality of displaceable electrodes positioned adjacent said fixed electrodes and individually displaced or deformed in response to a driving signal applied thereto to form offsets from said fixed electrodes so that illumination light from said light source incoming to one of faces of said fixed and displaceable electrodes is modulated in accordance with the offsets such that the modulated lights from said optical modulation devices are arrayed linearly to form a one-dimensional image;
a driving circuit for applying the driving signals to the electrodes of said optical modulation devices in response to an input signal thereto;
an initial driving signal production circuit for producing an initial driving signal for driving said optical modulation devices from the input signal;
measurement means removably placed at a position at which said measurement means can measure the modulated lights emitted from said optical modulation devices for measuring the intensities of the modulated lights emitted from said optical modulation devices and determining a modulation characteristic of each of said optical modulation devices representative of a relationship between the driving signal applied to the optical modulation device and the intensity of the modulated light emitted from the optical modulation device; and
correction means interposed between said initial driving signal production circuit and said driving circuit for determining, from the measured modulation characteristics of said optical modulation devices and a target light intensity for the modulated lights to be emitted from said optical modulation devices in response to the initial driving signal, values of the driving signals for said optical modulation devices corresponding to the target light intensity and inputting the driving signals of the determined values to said driving circuit.

35. An optical modulation device adjustment apparatus according to claim 34, wherein said correction means determines a target modulation characteristic representative of a relationship between the initial driving signal and the target light intensity of the modulated light emitted from any of said optical modulation devices in response to the initial driving signal to set the target light intensity.

36. An optical modulation device adjustment apparatus according to claim 34, wherein said measurement means includes a light measuring instrument for measuring the intensities of the modulated lights from said optical modulation devices and producing electric signals corresponding to the measured light intensities.

37. An optical modulation device adjustment apparatus according to claim 36, wherein said measurement means further includes a deflecting mirror for deflecting the modulated lights from each of said optical modulation devices toward said light measuring instrument.

38. An optical modulation device adjustment apparatus according to claim 34, wherein said light source includes single-color light sources for red, green and blue, and
said optical modulation devices include a first optical modulation element array, a second optical modulation element array and a third optical modulation element array which individually include a plurality of optical modulation elements arrayed therein for modulating single-color illumination lights emitted from said red, green and blue single-color light sources.

39. An optical modulation device adjustment apparatus according to claim 38, wherein said measurement means determines modulation characteristics of the modulated lights of said optical modulation devices of a plurality of optical modulation element arrays in which a plurality of optical modulation elements are arrayed and modulate single-color illumination lights from said single-color light sources, and
said correction means determines, from the determined modulation characteristics, the values of the driving signal corresponding to the target light intensities of the modulated lights emitted from the optical modulation elements, which form said optical modulation element arrays, in response to the initial driving signal.

40. An optical modulation device adjustment apparatus according to claim 39, wherein said correction means determines the target modulation characteristics for the optical modulation elements, which form said optical modulation element arrays, to set the target light intensities.

41. An optical modulation device adjustment apparatus according to claim 39, wherein said light source includes first illumination means for illuminating, for each of said optical modulation element arrays, the single-color illumination lights simultaneously on the optical modulation elements which form the optical modulation element array, and
said correction means produces a first test signal whose voltage value varies within a first variation range and applies the first test signal to said optical modulation devices through said driving circuit.

42. An optical modulation device adjustment apparatus according to claim 39, wherein said measurement means measures the intensities of the modulated lights emitted in response to the voltage value of the first test signal from the optical modulation elements illuminated by said first illumination means, which illuminates, for each of said optical modulation element arrays, the single-color illumination lights simultaneously upon the optical modulation elements, to determine the modulation characteristics of said optical modulation devices, and
said correction means uses the determined modulation characteristics of said optical modulation devices to determine an illumination profile for each color representative of a relationship between the light intensities of the modulated lights emitted from the optical modulation elements which form said optical modulation element arrays and the positions of the optical modulation elements.

43. An optical modulation device adjustment apparatus according to claim 42, wherein said correction means determines target modulation characteristics for the optical modulation elements which form said optical modulation element arrays from the illumination profiles for the individual colors.

44. An optical modulation device adjustment apparatus according to claim 43, wherein said correction means determines a luminance distribution of white which can be realized by said red, green and blue single-color light sources from the illumination profiles of the individual colors, and determines a minimum value of the white luminance distributions of the optical modulation element arrays as a target maximum luminance of the white to be realized by said optical modulation elements which form said optical modulation element arrays, and determines the target modulation characteristics of said optical modulation devices using a predetermined modulation characteristic function and the target maximum luminance of the white.

45. An optical modulation device adjustment apparatus according to claim 43, wherein said correction means divides the optical modulation elements which form each of said optical modulation element arrays into a plurality of groups depending upon positions of said optical modulation elements, and individually determines the target modulation characteristics of the optical modulation elements of the groups from the illumination profiles for the individual colors.

46. An optical modulation device adjustment apparatus according to claim 45, wherein said correction means determines a luminance distribution of white which can be realized by said red, green and blue single-color light sources from the illumination profiles of the individual colors, and determines a minimum value of the white luminance distributions of the optical modulation elements of the groups as a target maximum luminance of the white of the optical modulation elements, and determines the target modulation characteristics of the optical modulation elements of each of the optical modulation element groups from a predetermined modulation characteristic function and the target maximum luminance of the white.

47. An optical modulation device adjustment apparatus according to claim 39, wherein said light source includes first illumination means for illuminating, for each of the optical modulation element arrays, the single-color illumination lights simultaneously upon the optical modulation elements which form the optical modulation element array, and second illumination means for illuminating, for each of said optical modulation devices, the single-color illumination lights upon the optical modulation elements which form the optical modulation element array, and said correction means determines the modulation characteristics of the optical modulation elements which form the optical modulation element array and illumination profiles of said optical modulation element arrays separately from each other using said first and second illumination means.

48. An optical modulation device adjustment apparatus according to claim 47, wherein, when said second illumination means illuminates the optical modulation elements of the optical modulation element arrays, said correction means produces a first test signal whose voltage value varies within a first variation range and applies the first test signal to said optical modulation devices through said driving circuit, and said measurement means measures the intensities of the modulated lights emitted in response to the voltage value of the first test signal by any of said optical modulation devices illuminated by said second illumination means to determine the modulation characteristics of said optical modulation devices.

49. An optical modulation device adjustment apparatus according to claim 46, wherein, when said first illumination means illuminates the optical modulation elements which form the optical modulation element arrays, said correction means produces a second test signal whose voltage value varies within a second variation range and applies the second test signal to said optical modulation devices through said driving circuit.

50. An optical modulation device adjustment apparatus according to claim 49, wherein said measurement means measures the intensities of the modulated lights emitted from the optical modulation elements of the optical modulation element arrays illuminated by said first illumination means when the optical modulation elements of the optical modulation element arrays are deformed or displaced in response to the voltage value of the second test signal, and said correction means determines illumination profiles of the optical modulation elements which form the optical modulation element arrays.

51. An optical modulation device adjustment apparatus according to claim 50, wherein said correction means determines target modulation characteristics for the optical modulation elements which form said optical modulation element arrays from the modulation characteristics of said optical modulation devices determined individually and the illumination profiles for the individual colors.

52. An optical modulation device adjustment apparatus according to claim 51, wherein said correction means determines a luminance distribution of white which can be realized by said red, green and blue single-color light sources from the modulation characteristics of said optical modulation devices and the illumination profiles of the individual colors, and determines a minimum value of white luminance distributions of the optical modulation element arrays as a target maximum luminance of the white to be realized by said optical modulation elements which form said optical modulation element arrays, and determines the target modulation characteristics of said optical modulation devices from a predetermined modulation characteristic function and the target maximum luminance of the white.

53. An optical modulation device adjustment apparatus according to claim 51, wherein said correction means divides the optical modulation elements which form each of said optical modulation element arrays into a plurality of groups depending upon positions of said optical modulation elements, and individually determines the target modulation characteristics of the optical modulation elements of the groups from the modulation characteristics of said optical modulation devices and the illumination profiles for the individual colors.

54. An optical modulation device adjustment apparatus according to claim 53, wherein said correction means determines a luminance distribution of white which can be realized by said red, green and blue single-color light sources from the modulation characteristics of said optical modulation devices and the illumination profiles of the individual colors, and determines a minimum value of the white luminance distributions of the optical modulation elements of the groups as a target maximum luminance of white to be realized by the optical modulation elements, and determines the target modulation characteristics of the optical modulation elements of each of the optical modulation element groups from a predetermined modulation characteristic function and the target maximum luminance of the white.

55. An image display apparatus for successively displaying a plurality of frames in which a plurality of pixels are disposed in a matrix, comprising:

a plurality of pixel elements for individually forming the pixels;

a driving circuit for applying a driving signal to said pixel elements; and driving signal supply means for allocating, when a predetermined object one of the pixels is to be displayed, a quantization error appearing, when driving signal data is inputted to said driving circuit, in the driving signal of an object pixel element which corresponds to the object pixel to plural ones of said pixels in the proximity of the object pixel in a current frame being displayed and plural ones of the pixels within a predetermined range in a frame displayed next to the current frame, adding the allocated quantization error components to the driving signal data for the plural ones of said pixel elements and inputting the resulting driving signal data to said driving circuit.

56. An image display apparatus according to claim 55, wherein said driving signal supply means includes:

data division means for dividing driving signal data having a bit width of m into a high order bit part having a bit number of n smaller than m and a low order bit part having another bit number of m−n;

first addition means for adding the low order bit part and a preceding error allocated in the immediately preceding error allocation process and outputting a sum total of the errors;

error rounding process means having a predetermined threshold value for comparing the sum total of the errors outputted from said first addition means with the threshold value and outputting first data or second data from a result of the comparison;

second addition means for adding the high order bit part and the first data or the second data outputted from said error rounding process means to produce driving signal data having a bit width of n and inputting the driving signal data to said driving circuit;

subtraction means for subtracting the first data or the second data outputted from said error rounding process means from the sum total of the errors outputted from said first addition means and outputting the difference as a current error; and error allocation means for multiplying the current error outputted from said subtraction means by predetermined weighting coefficients, allocating the weighted errors to the plural ones of said pixels in the proximity of the object pixel in the current frame and the plural ones of the pixels within the predetermined range in the frame displayed next to the current frame and inputting the allocated current error to said first addition means.

57. An image display apparatus for successively displaying a plurality of frames each including a two-dimensional image, comprising:

a light source;

a plurality of optical modulation devices each including a plurality of fixed electrodes and a plurality of displaceable electrodes positioned adjacent said fixed electrodes and individually displaced or deformed in response to a driving signal applied thereto to form offsets from said fixed electrodes so that illumination light from said light source incoming to one of faces of said fixed and displaceable electrodes is modulated in accordance with the offsets such that the modulated lights from said optical modulation devices are arrayed linearly to form a one-dimensional image formed from a string of pixels;

a driving circuit for applying the driving signals to the electrodes of said optical modulation devices;

image display means for being illuminated with the modulated lights to form the two-dimensional image in which strings of the pixels are developed;

first driving signal supply means for outputting driving signal data for said optical modulation devices; and second driving signal supply means for allocating, when a predetermined object one of the pixels is to be displayed, a quantization error appearing, when the driving signal data is inputted to said driving circuit, in the driving signal for said optical modulation devices to plural ones of said pixels in the proximity of the object pixel in a current frame being displayed and plural ones of the pixels within a predetermined range in a frame displayed next to the current frame, adding the allocated quantization error components to the driving signal data for the plural ones of said pixel elements and inputting the resulting driving signal data to said driving circuit.

58. An image display apparatus according to claim 57, wherein said second driving signal supply means includes:

data division means for dividing driving signal data having a bit width of m into a high order bit part having a bit number of n smaller than m and a low order bit part having another bit number of m−n;

first addition means for adding the low order bit part and a preceding error allocated in the immediately preceding error allocation process and outputting a sum total of the errors;

error rounding process means having a predetermined threshold value for comparing the sum total of the errors outputted from said first addition means with the threshold value and outputting first data or second data from a result of the comparison;

second addition means for adding the high order bit part and the first data or the second data outputted from said error rounding process means to produce driving signal data having a bit width of n and inputting the driving signal data to said driving circuit;

subtraction means for subtracting the first data or the second data outputted from said error rounding process means from the sum total of the errors outputted from said first addition means and outputting the difference as a current error; and error allocation means for multiplying the current error outputted from said subtraction means by predetermined weighting coefficients, allocating the weighted errors to the plural ones of said pixels in the proximity of the object pixel in the current frame and the plural ones of the pixels within the predetermined range in the frame displayed next to the current frame and inputting the allocated current error to said first addition means.

* * * * *